Figure 1:
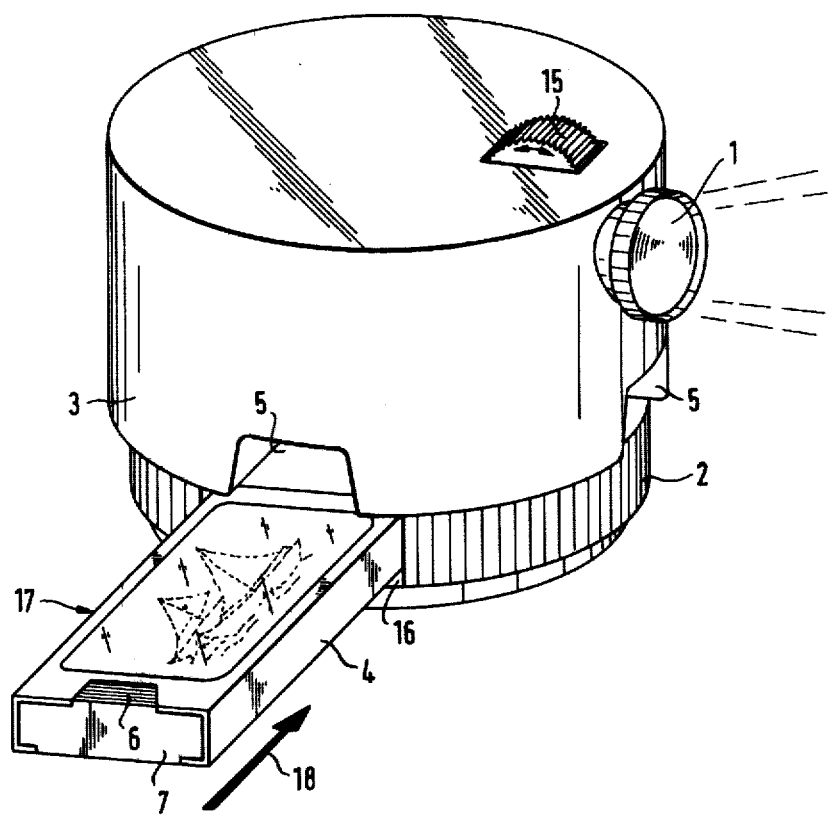

United States Patent [19]

Ackeret

[11] 4,313,675

[45] Feb. 2, 1982

[54] EPISCOPE

[75] Inventor: Peter Ackeret, Kusnacht, Switzerland

[73] Assignee: Licinvest AG, Chur, Switzerland

[21] Appl. No.: 82,772

[22] Filed: Oct. 9, 1979

[30] Foreign Application Priority Data

Oct. 11, 1978 [DE] Fed. Rep. of Germany ....... 2844282
Apr. 9, 1979 [DE] Fed. Rep. of Germany ....... 2914283

[51] Int. Cl.³ ................. G03B 27/52; G03B 23/14
[52] U.S. Cl. ................................. 355/40; 353/114; 353/120; 355/44
[58] Field of Search .............. 353/DIG. 1, 65, 67, 353/74, 114, 120; 355/40–45

[56] References Cited

U.S. PATENT DOCUMENTS 3,094,036 6/1963 Benson .......................... 355/45 X
3,801,201 4/1974 Greenblatt ........................ 355/40
4,204,754 5/1980 Asanuma et al. ................ 355/40 X Primary Examiner—Richard A. Wintercorn
Attorney, Agent, or Firm—H. Dale Palmatier

[57] ABSTRACT

A device for displaying sheet opaque pictures in which images of scenes thereon are transmitted from a housing onto an exterior display. A picture exchange magazine has a display window at the picture scene such that the top of a stack of pictures is confined at the window and the remainder are confined behind it. The magazine includes first and second frame members, the latter being relatively reciprocable parallel to the window and picture scence for cyclic exchange of the top picture in the magazine. A release holder retains the magazine on the housing while allowing the frame members to remain relatively movable to each other.

41 Claims, 102 Drawing Figures

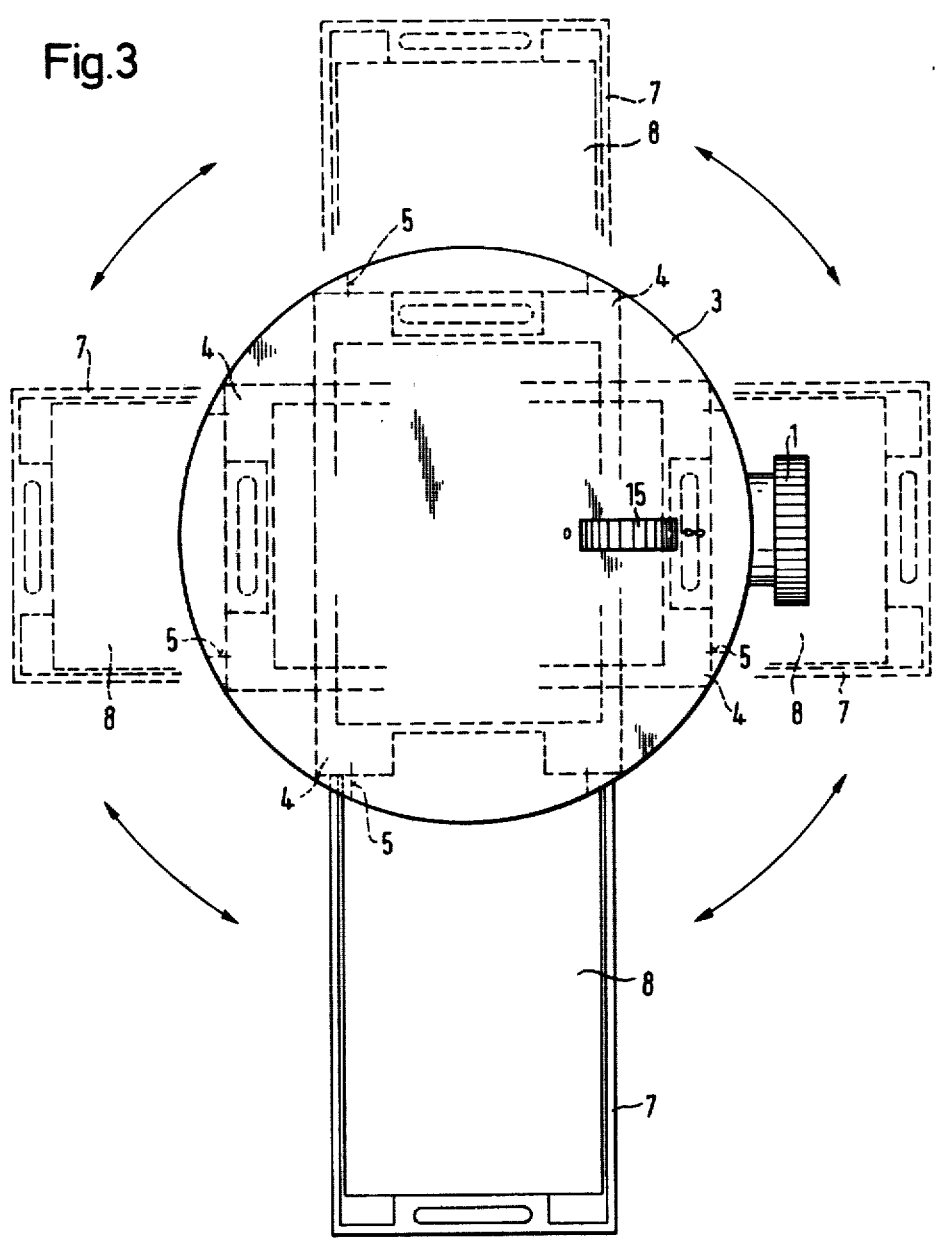

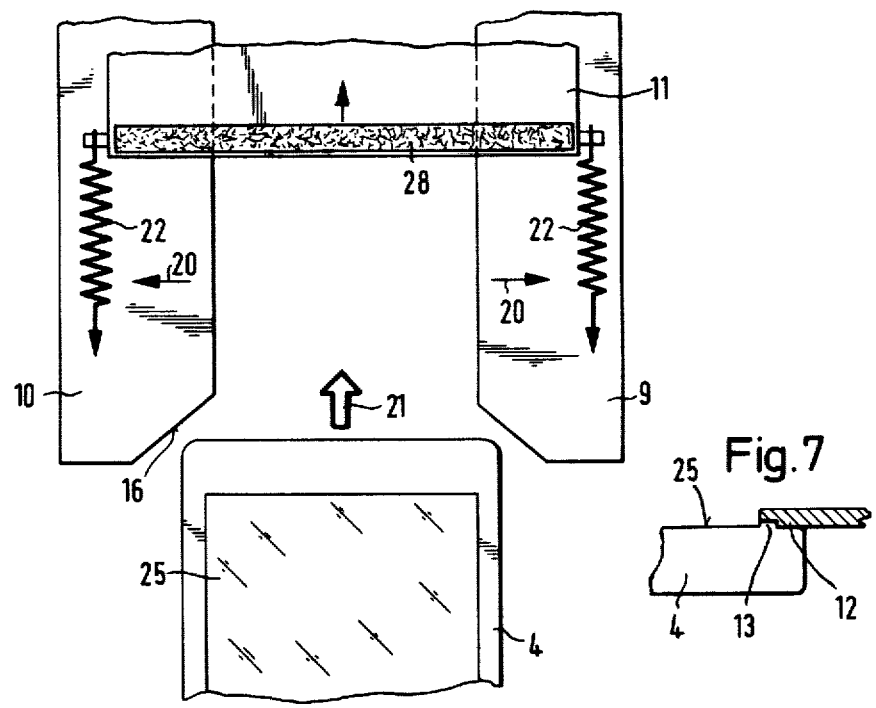
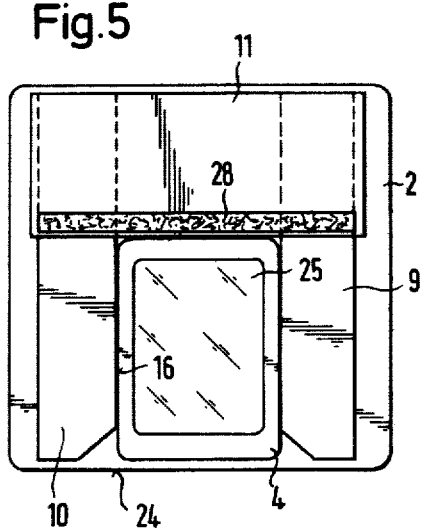
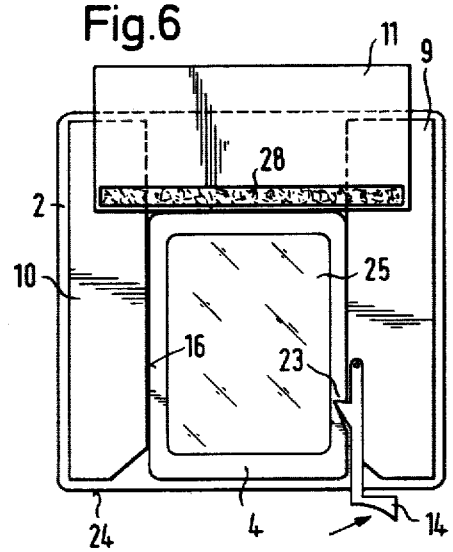

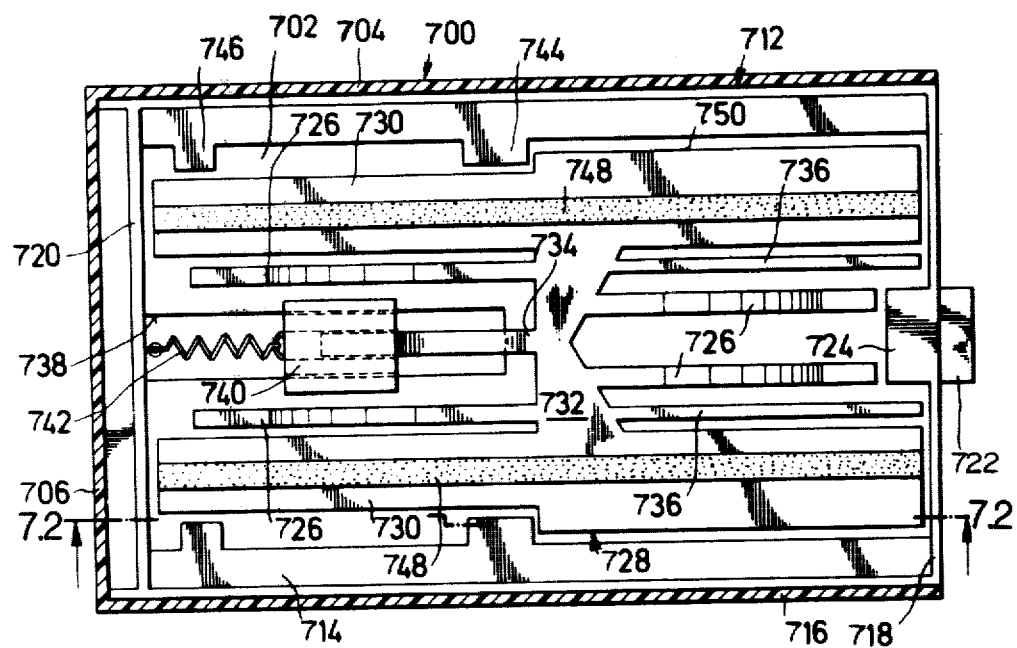
Fig. 7.1

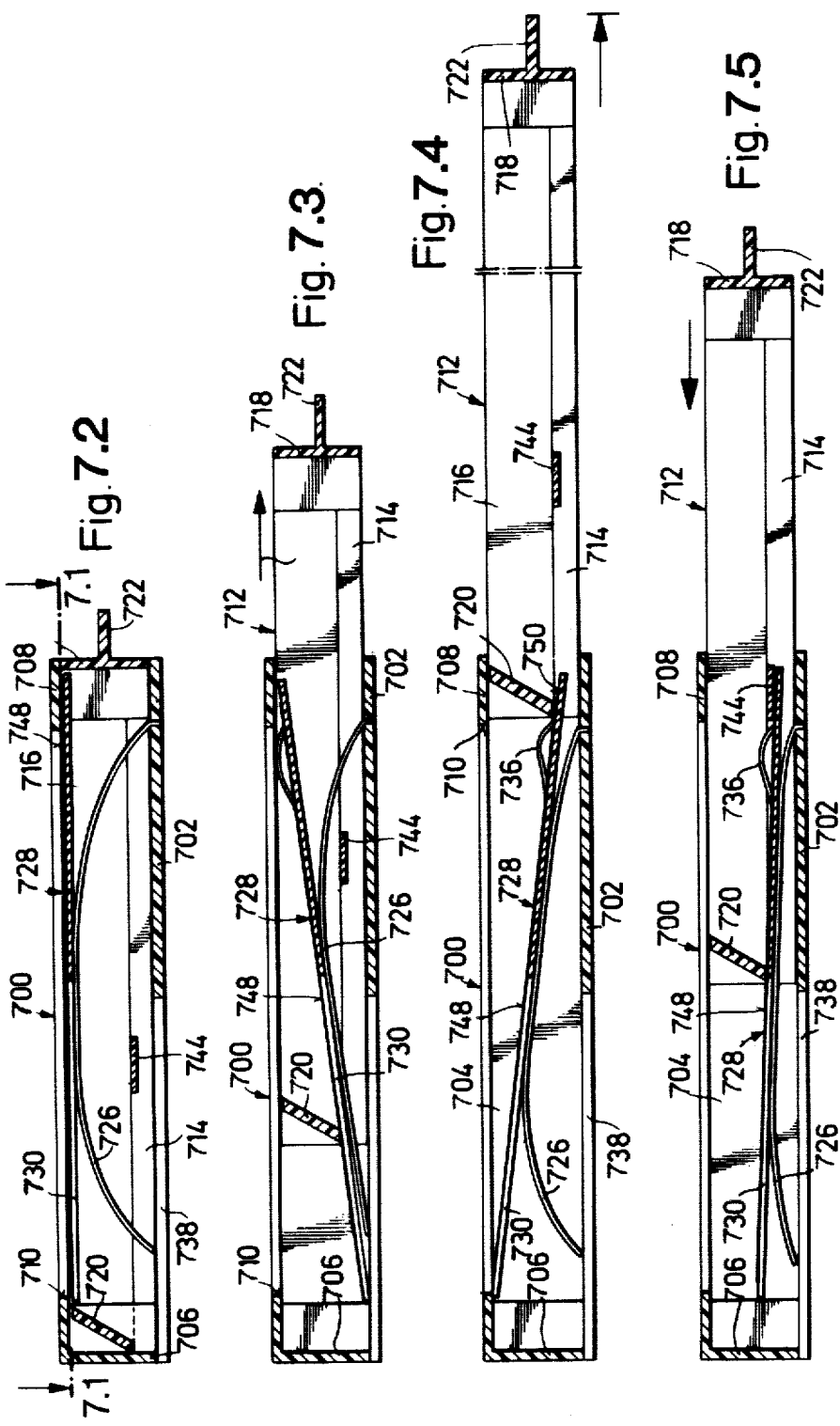

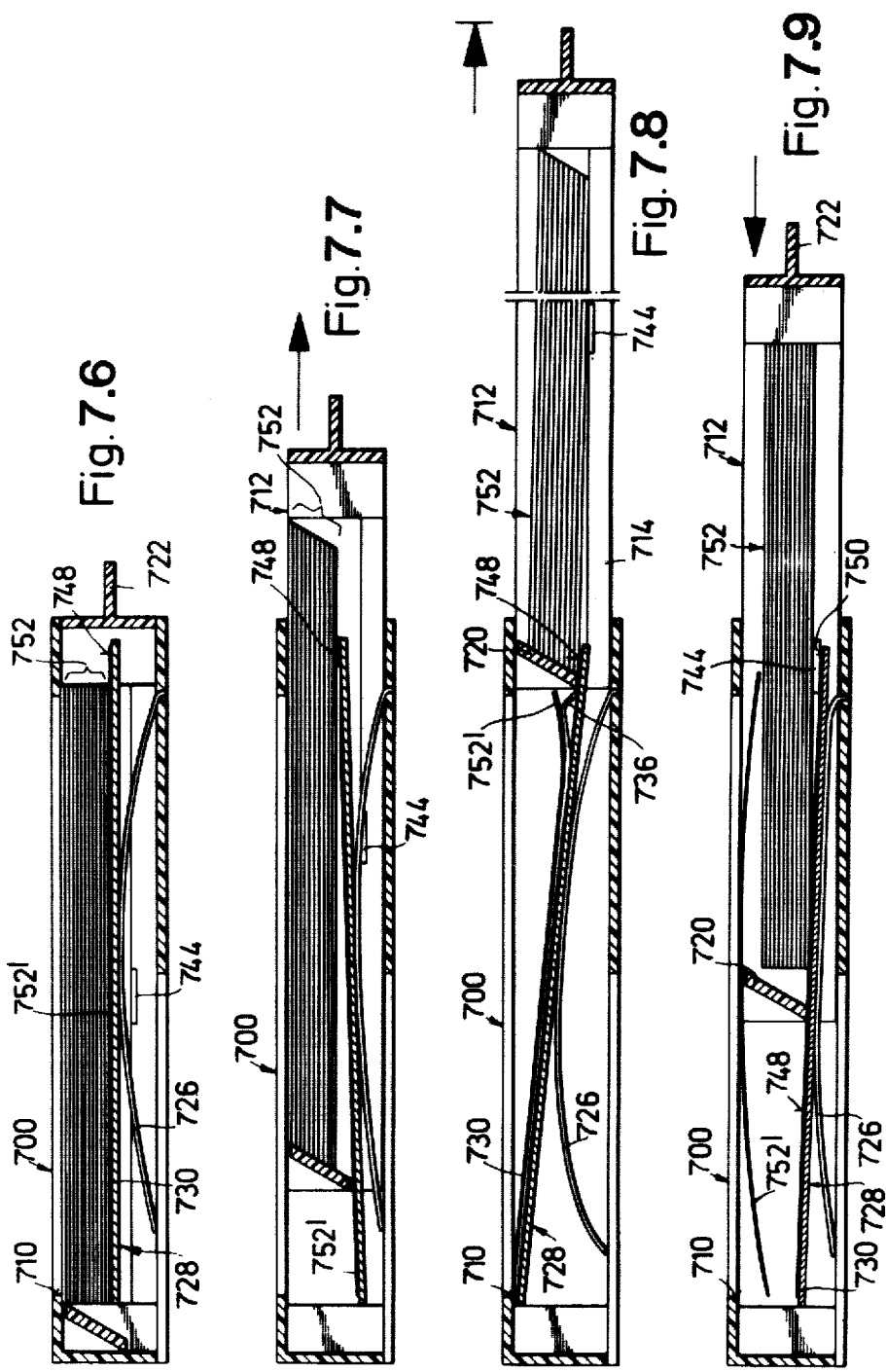

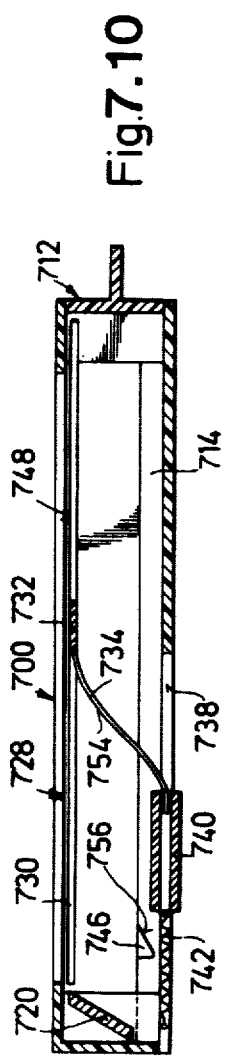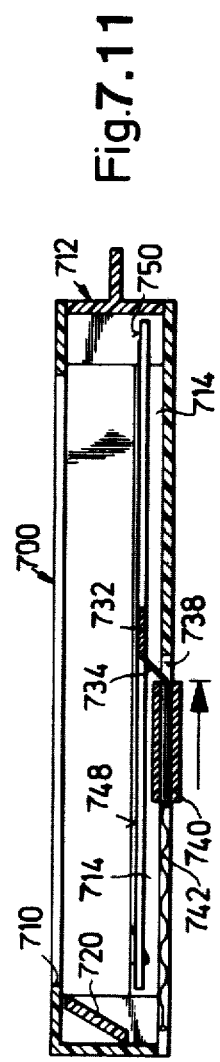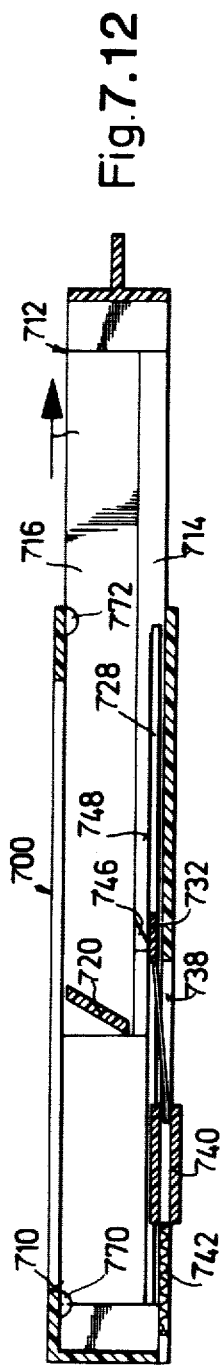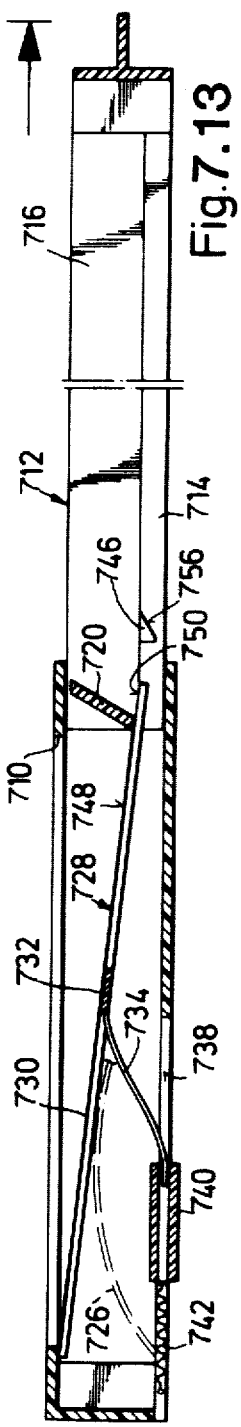

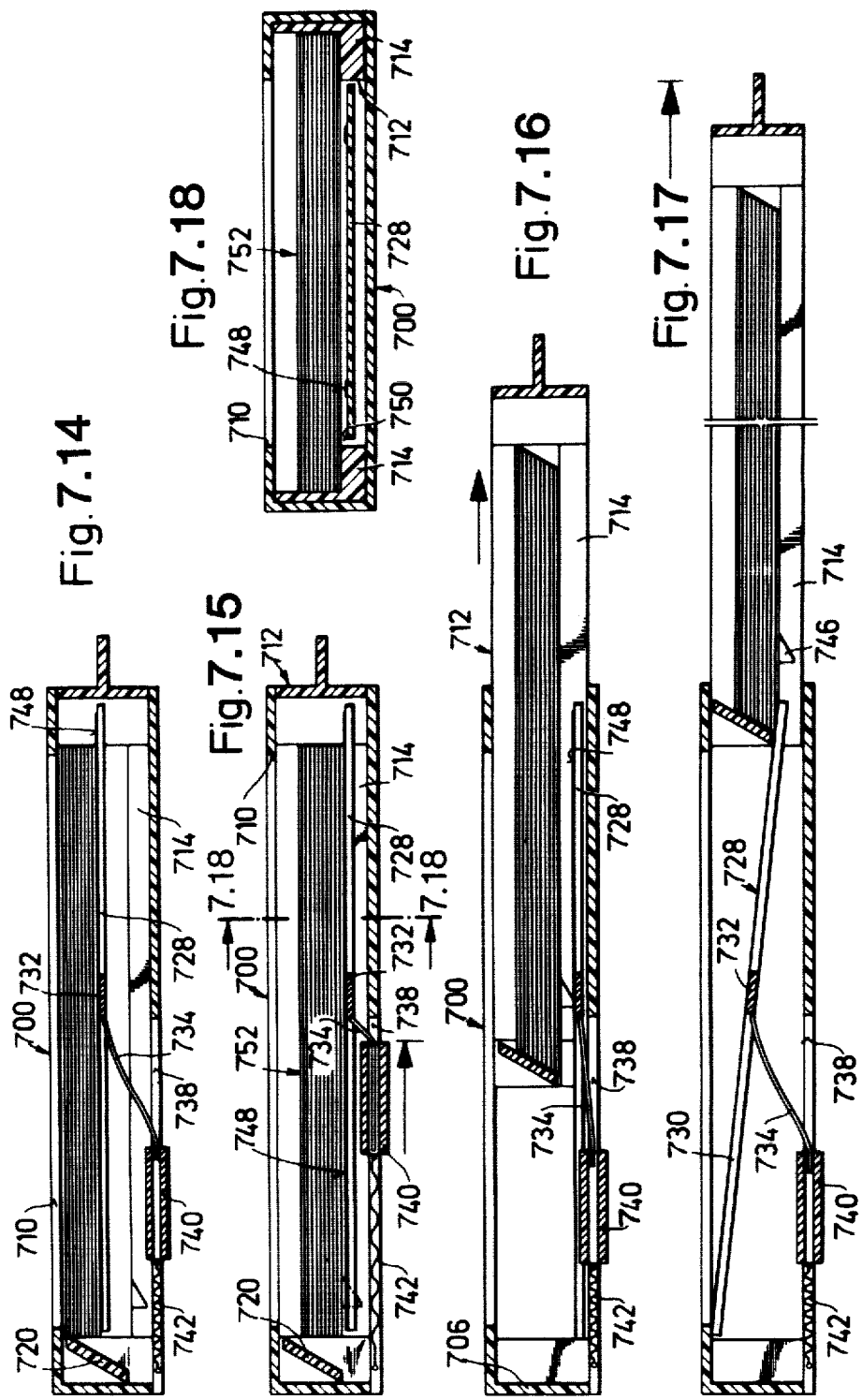

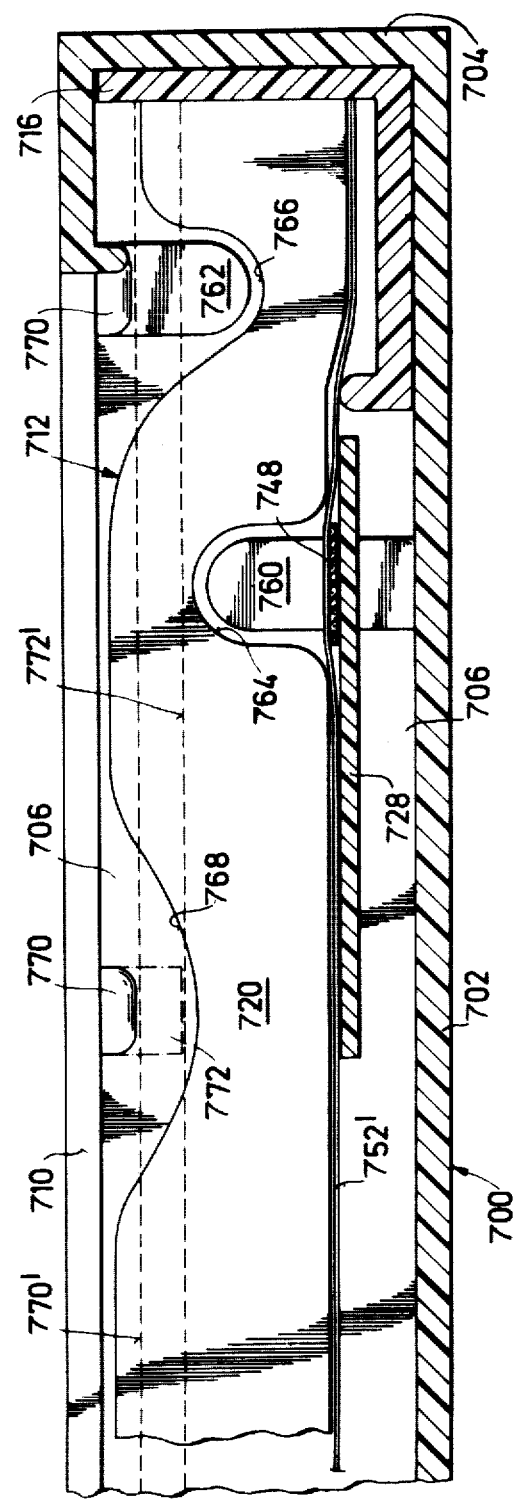
Fig. 7.19

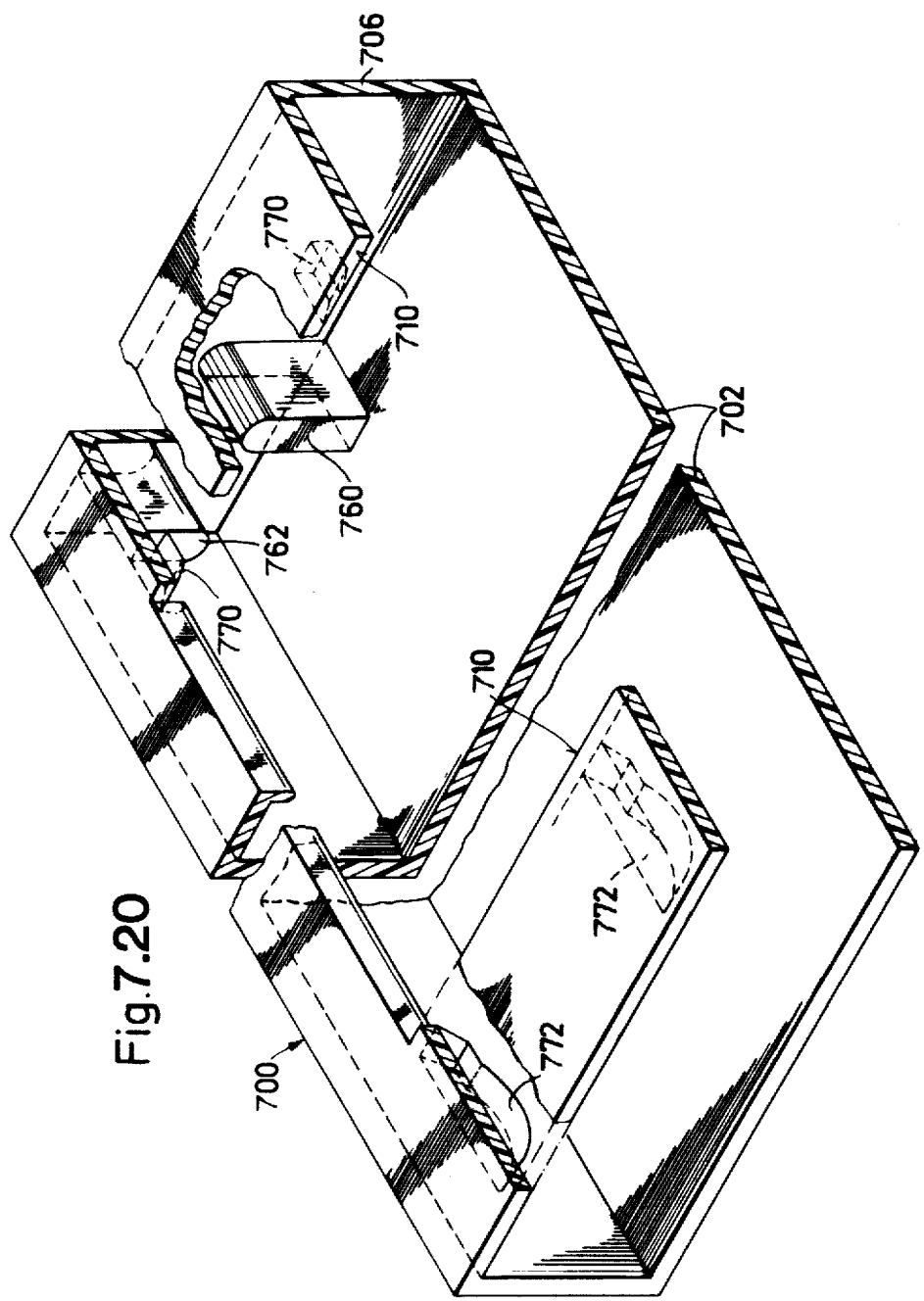
Fig.7.20

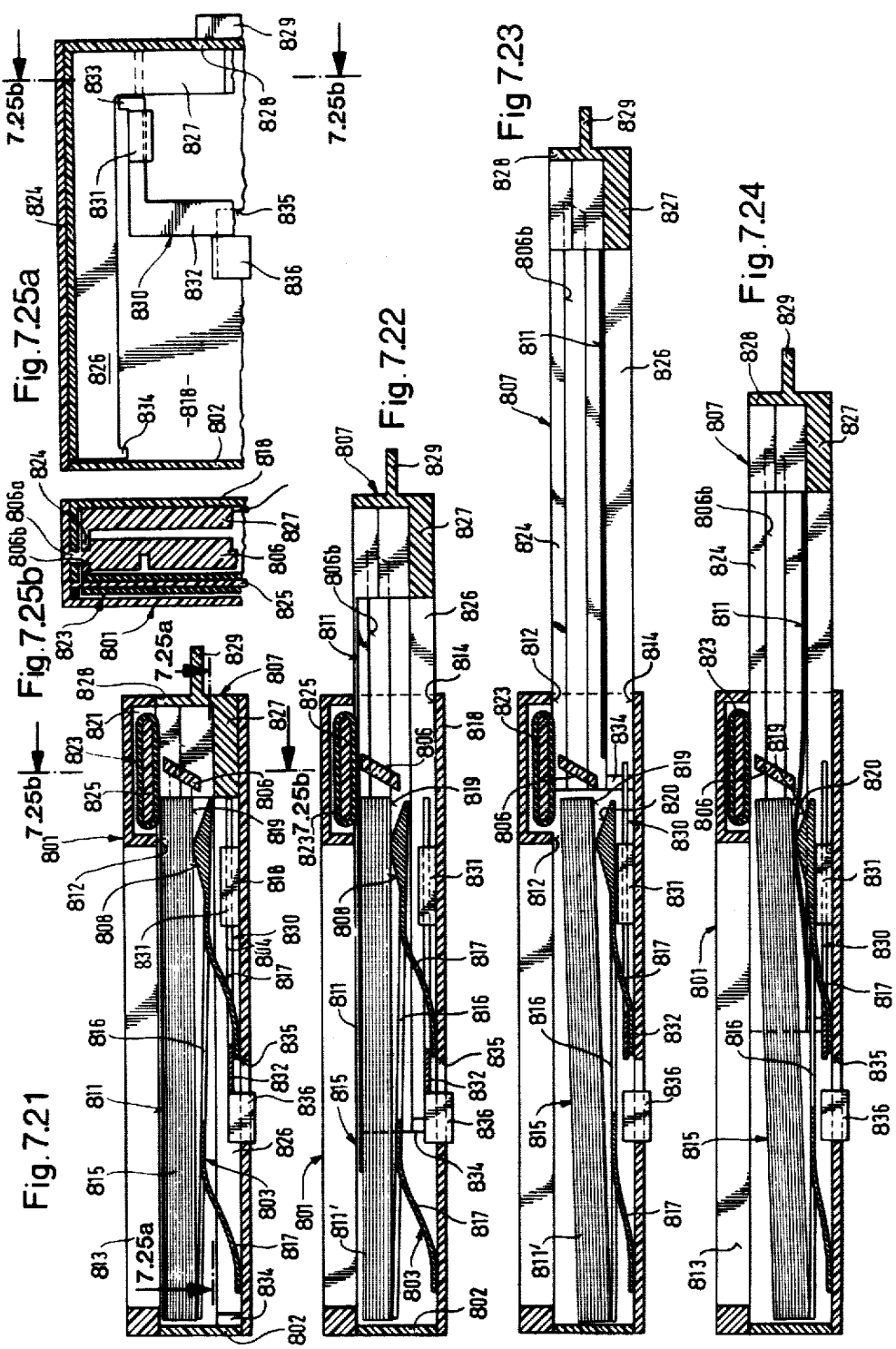

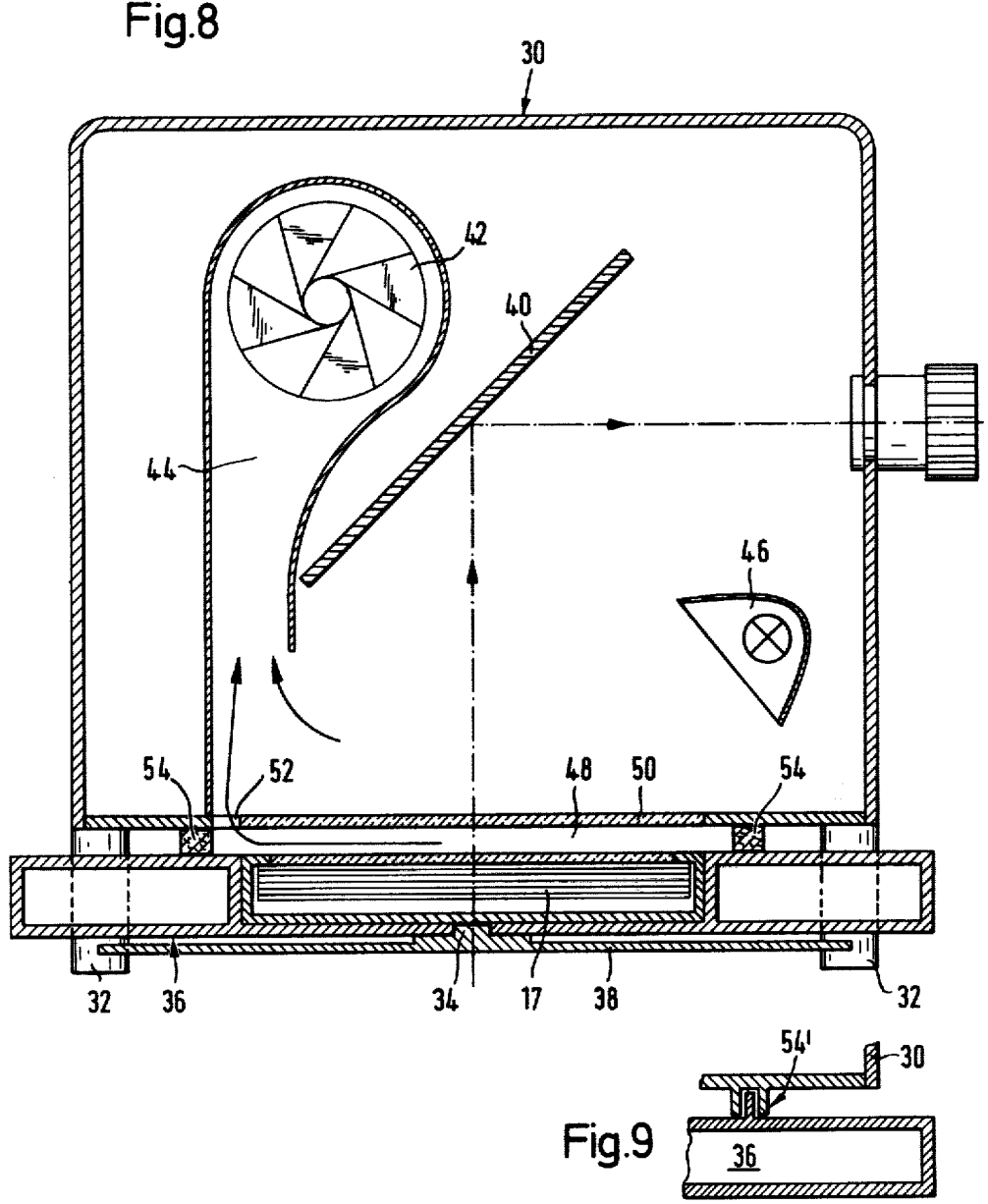

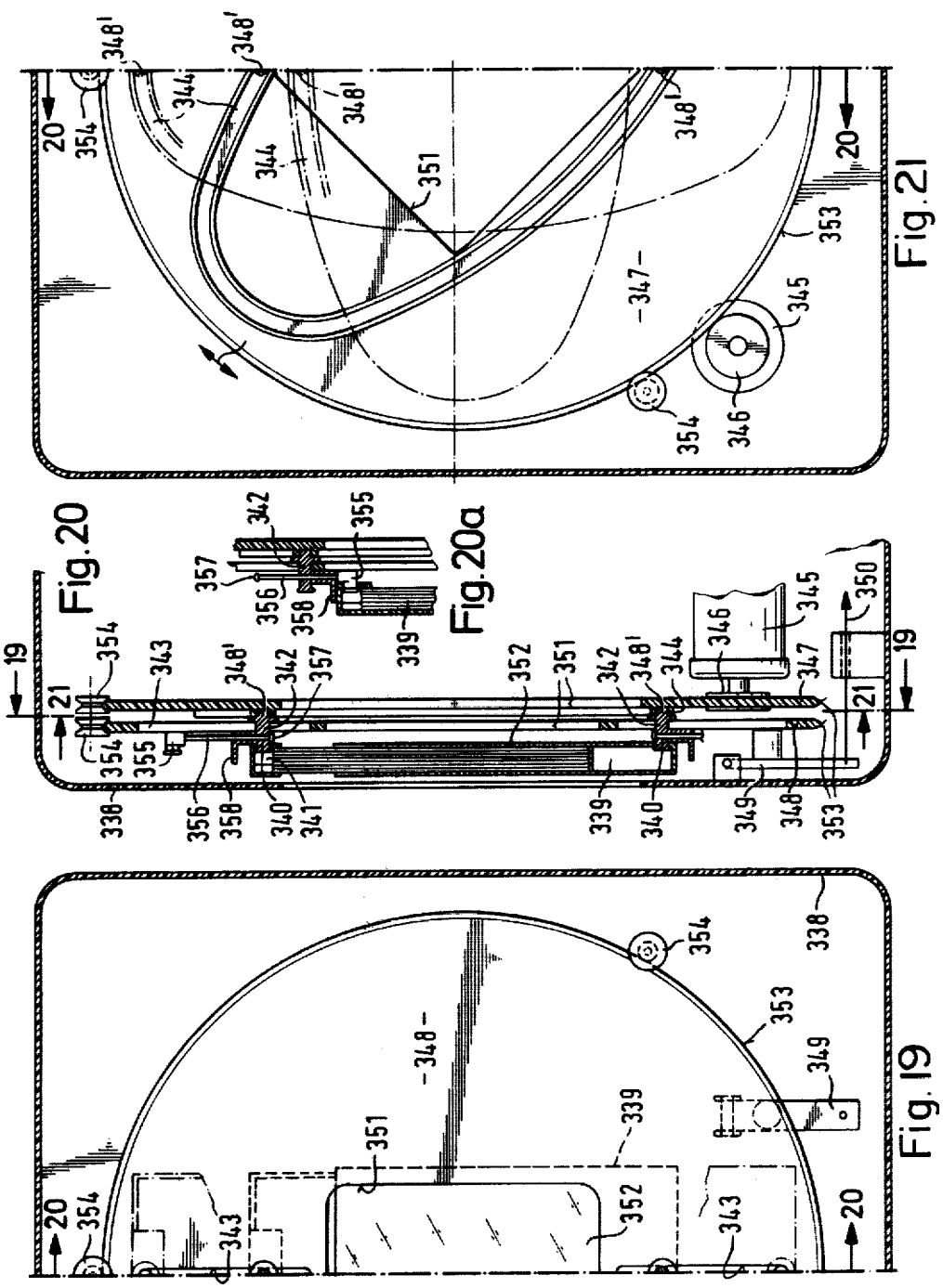

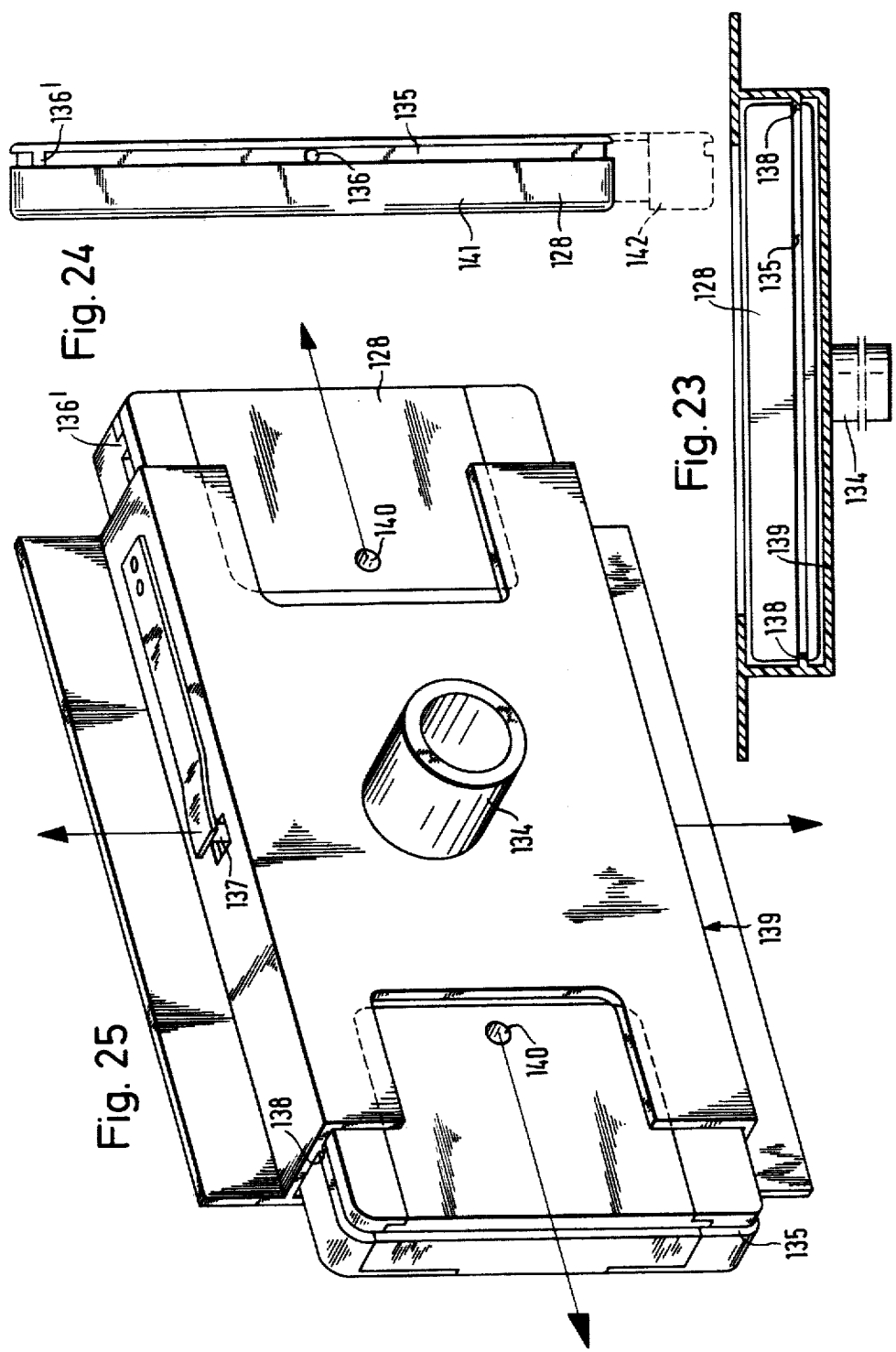

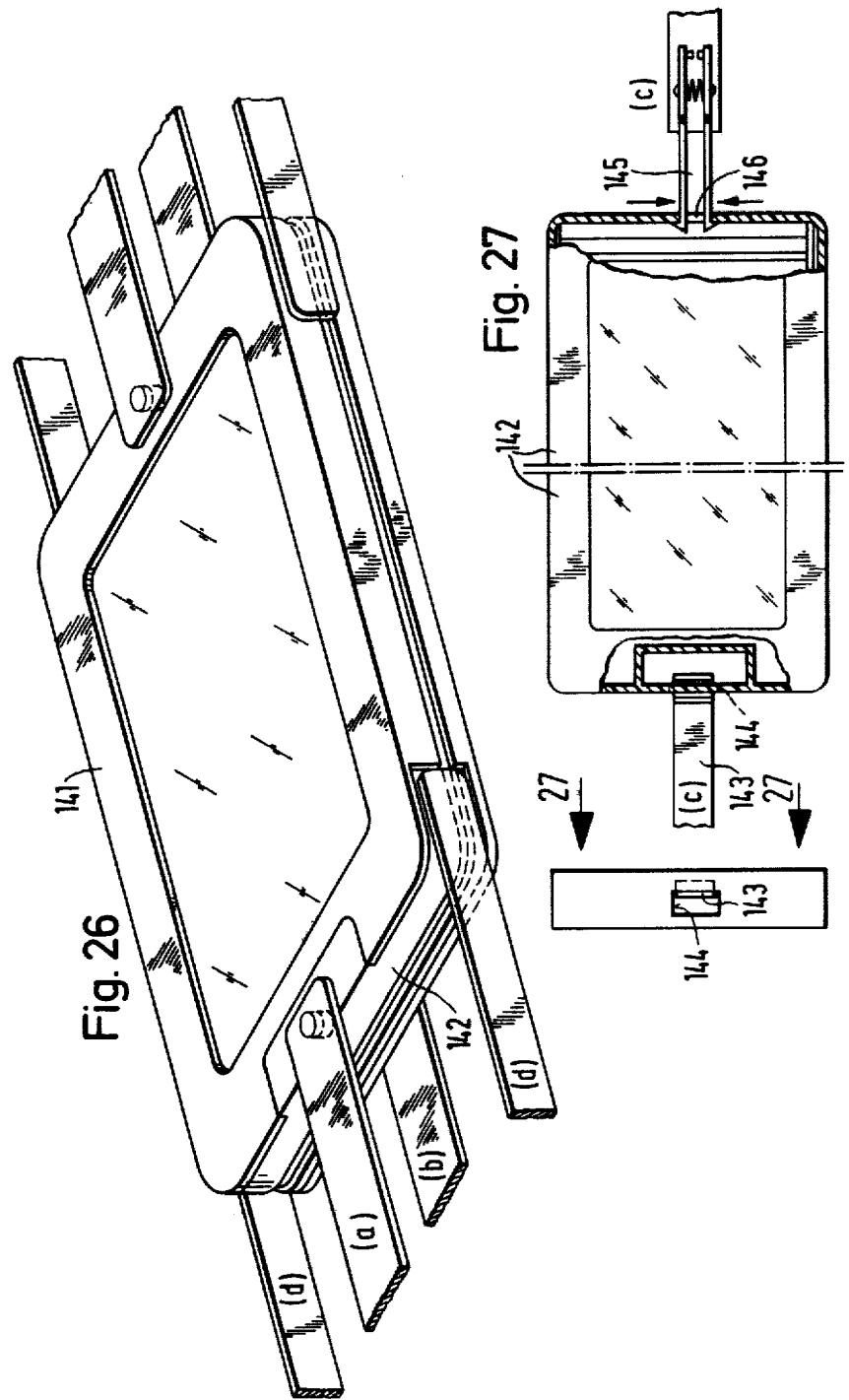

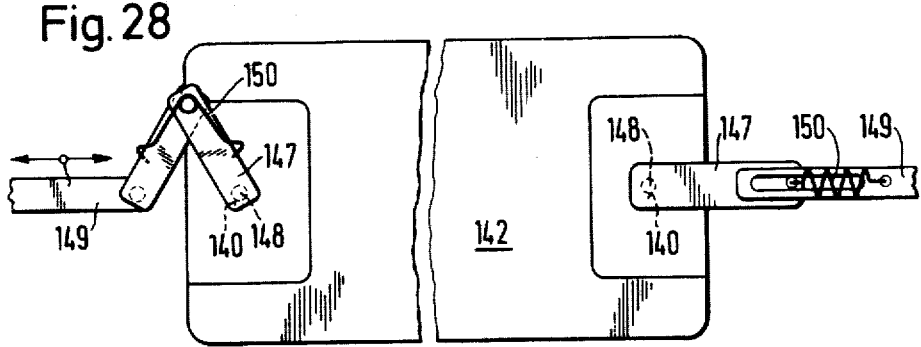
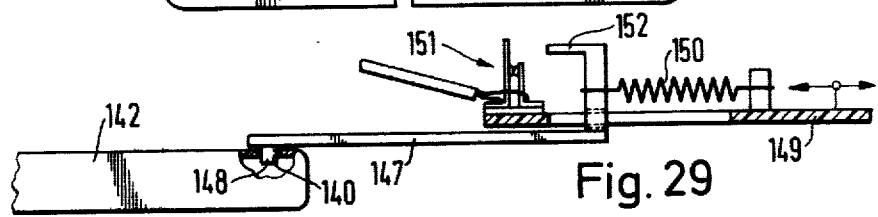
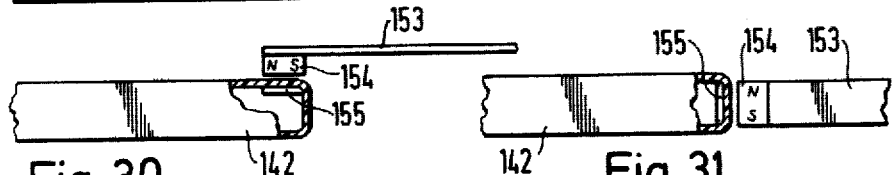
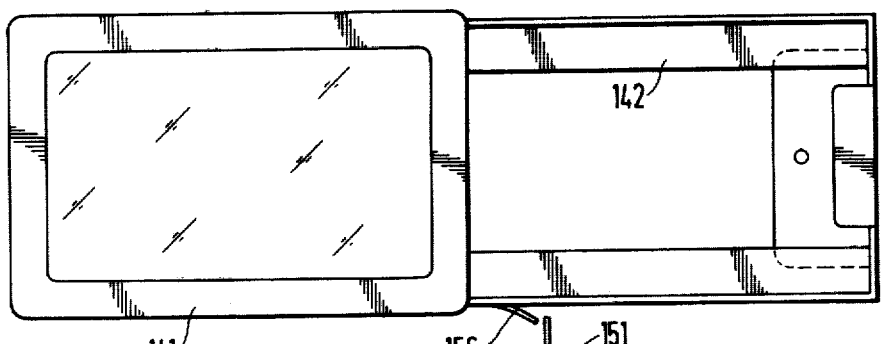
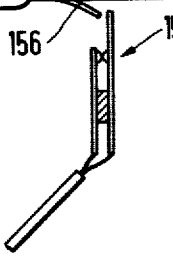

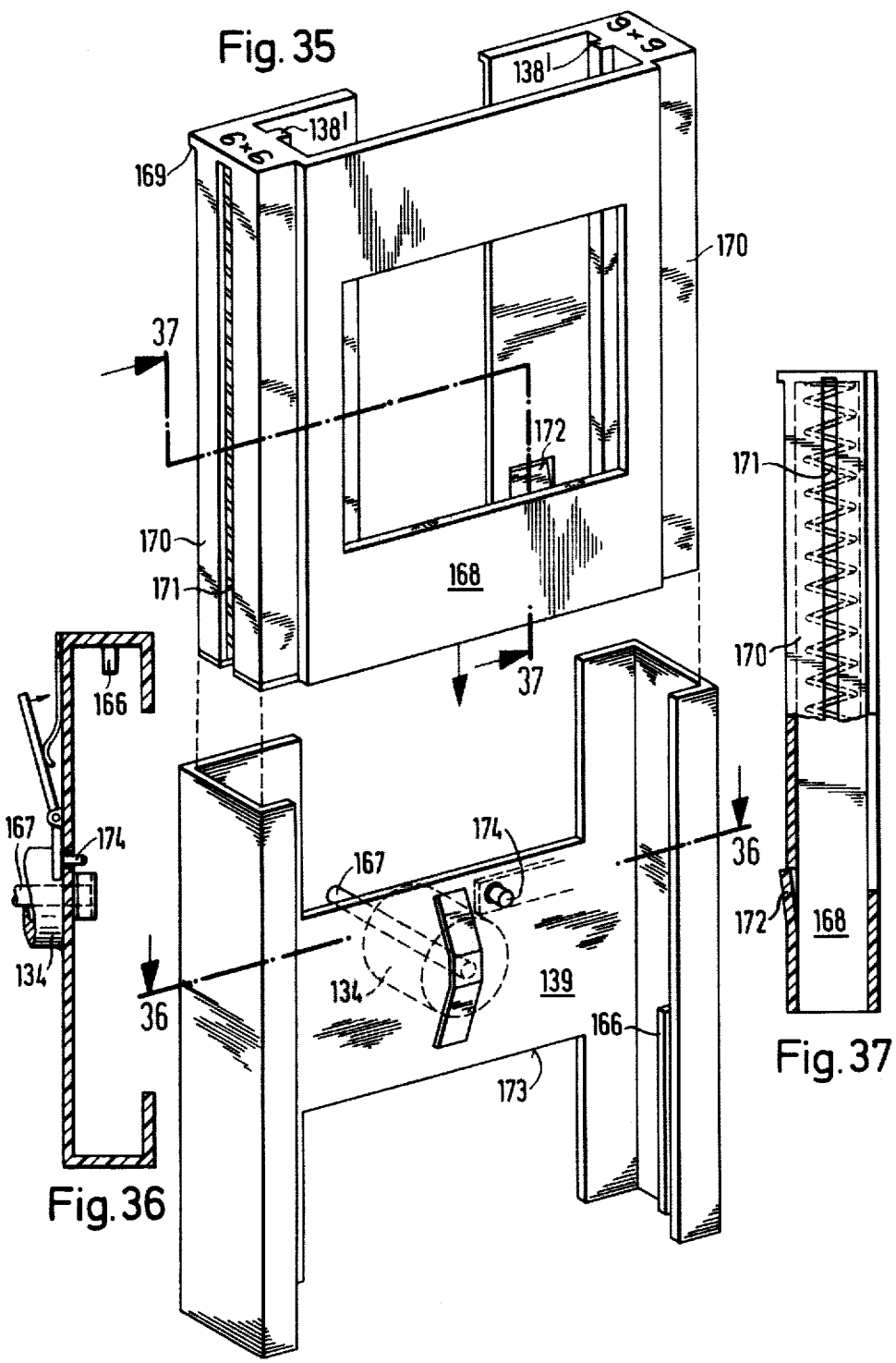

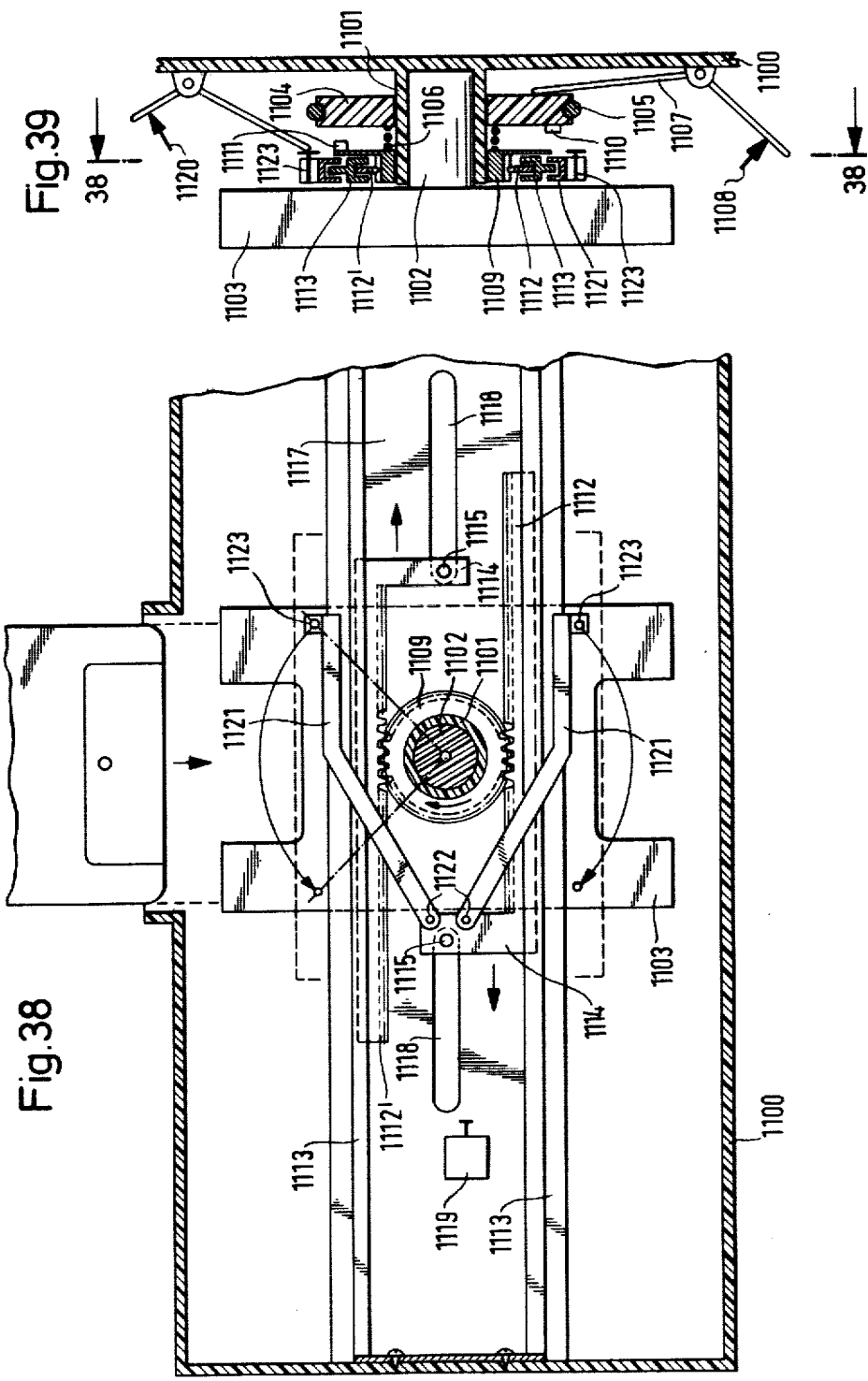

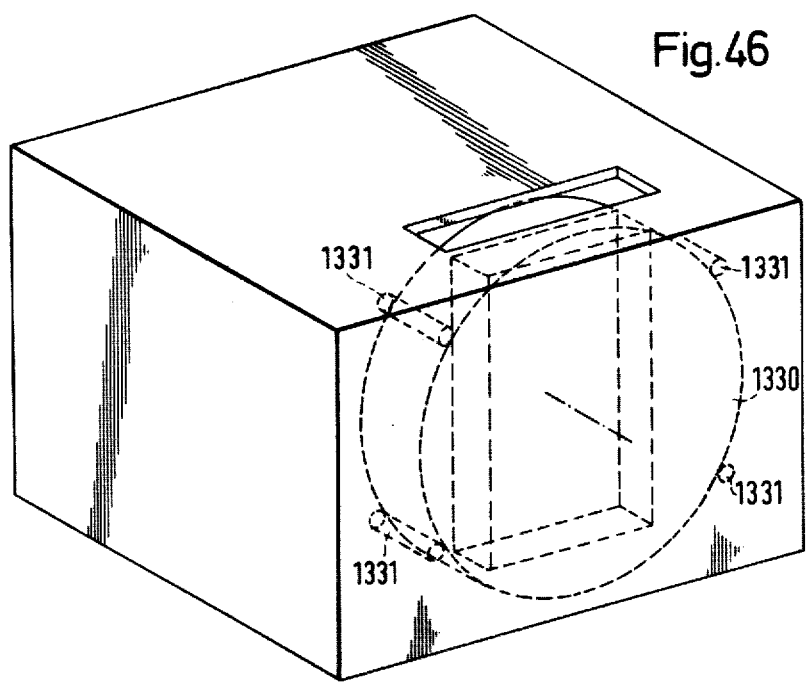
Fig.46
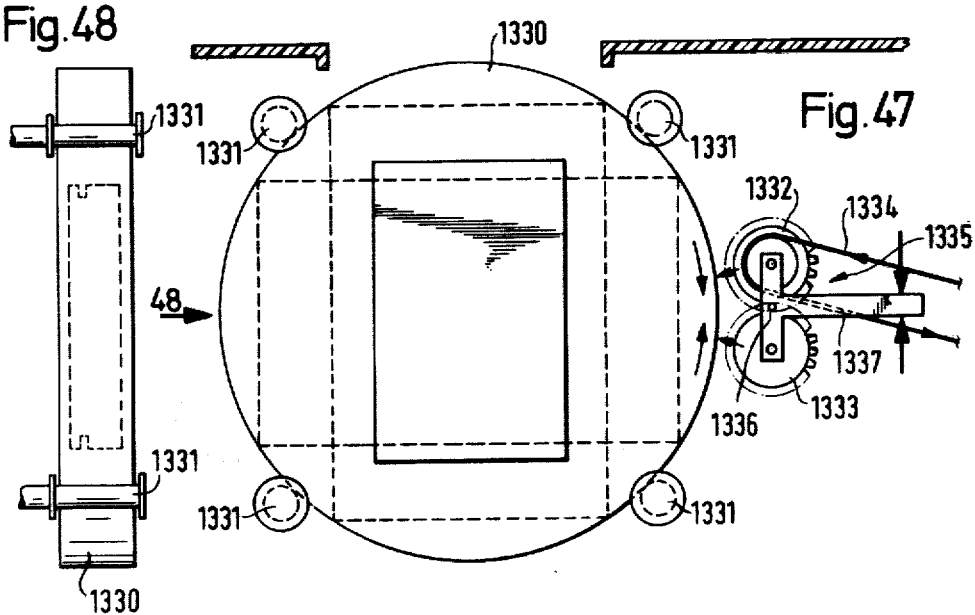
Fig.48
Fig.47

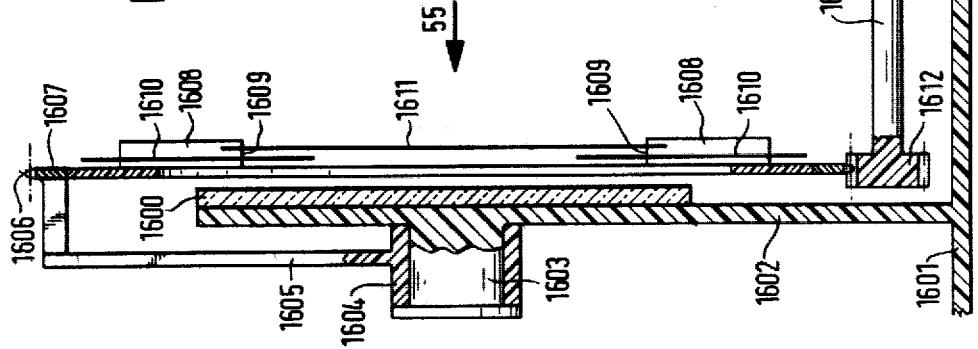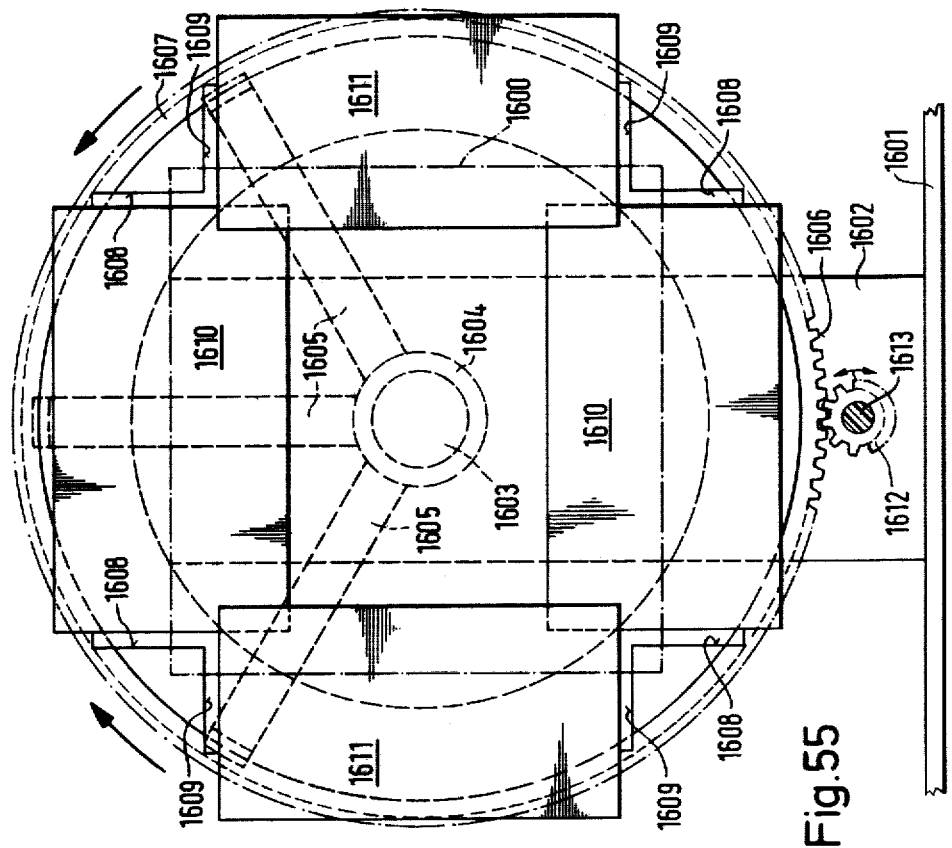

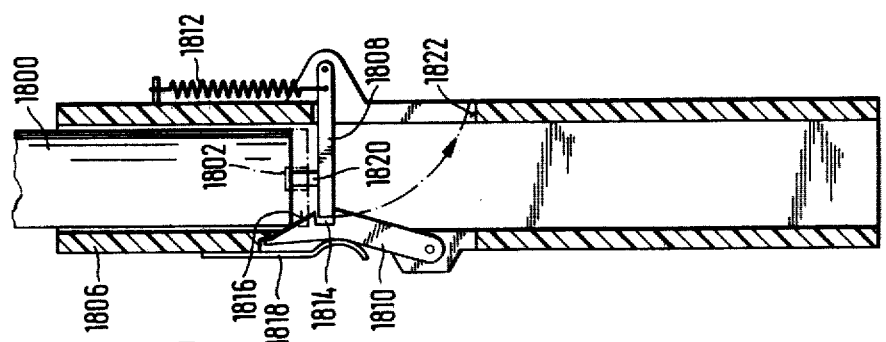
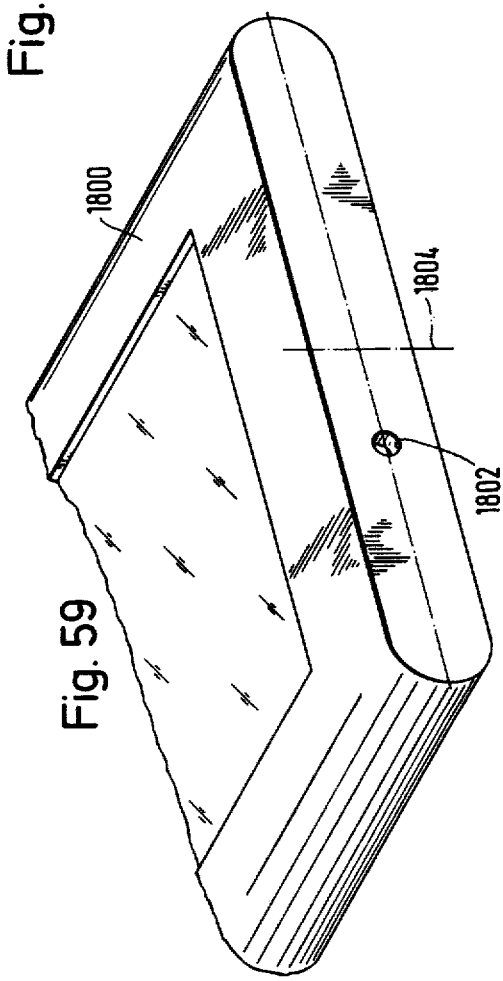
Fig. 60
Fig. 59

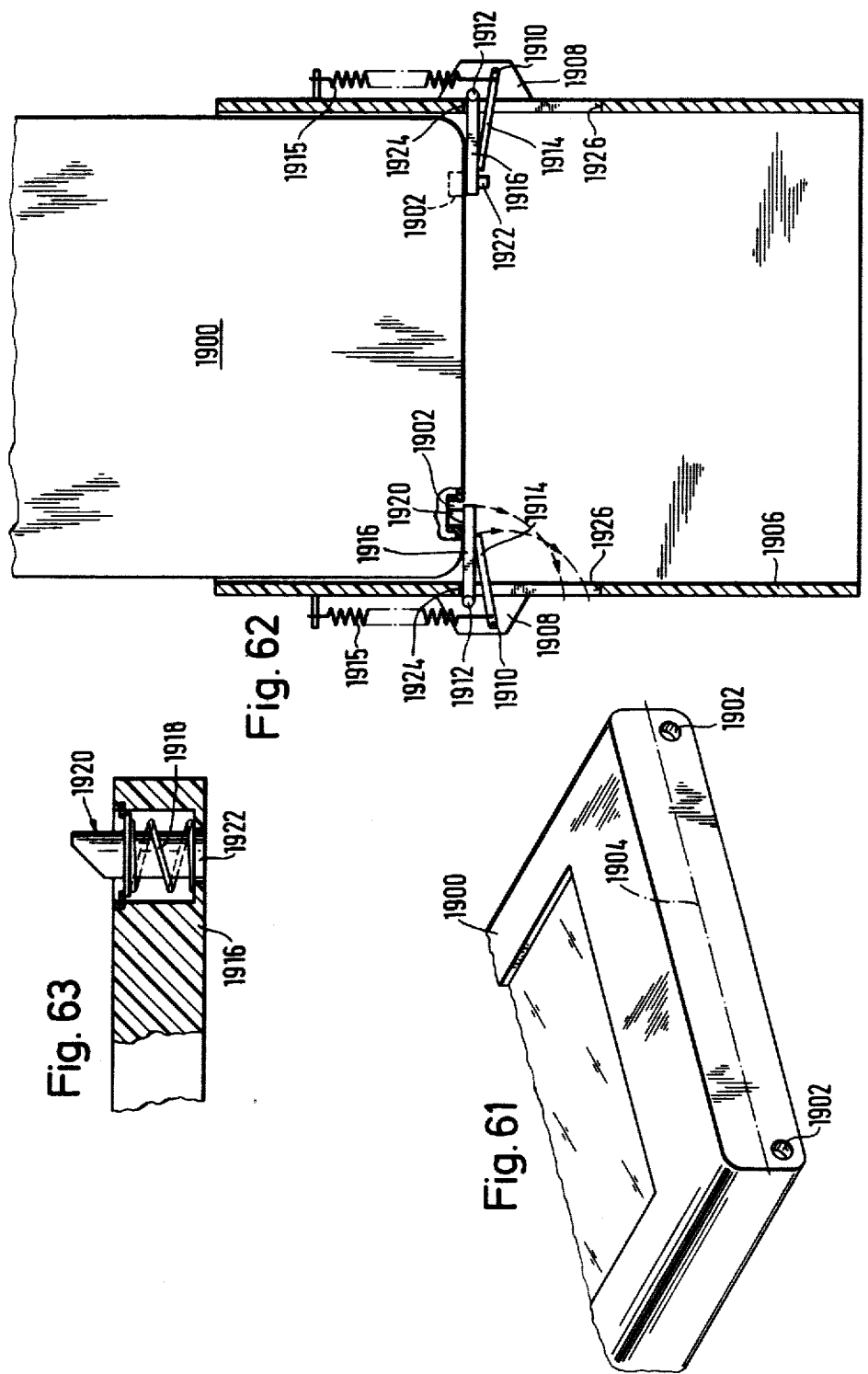

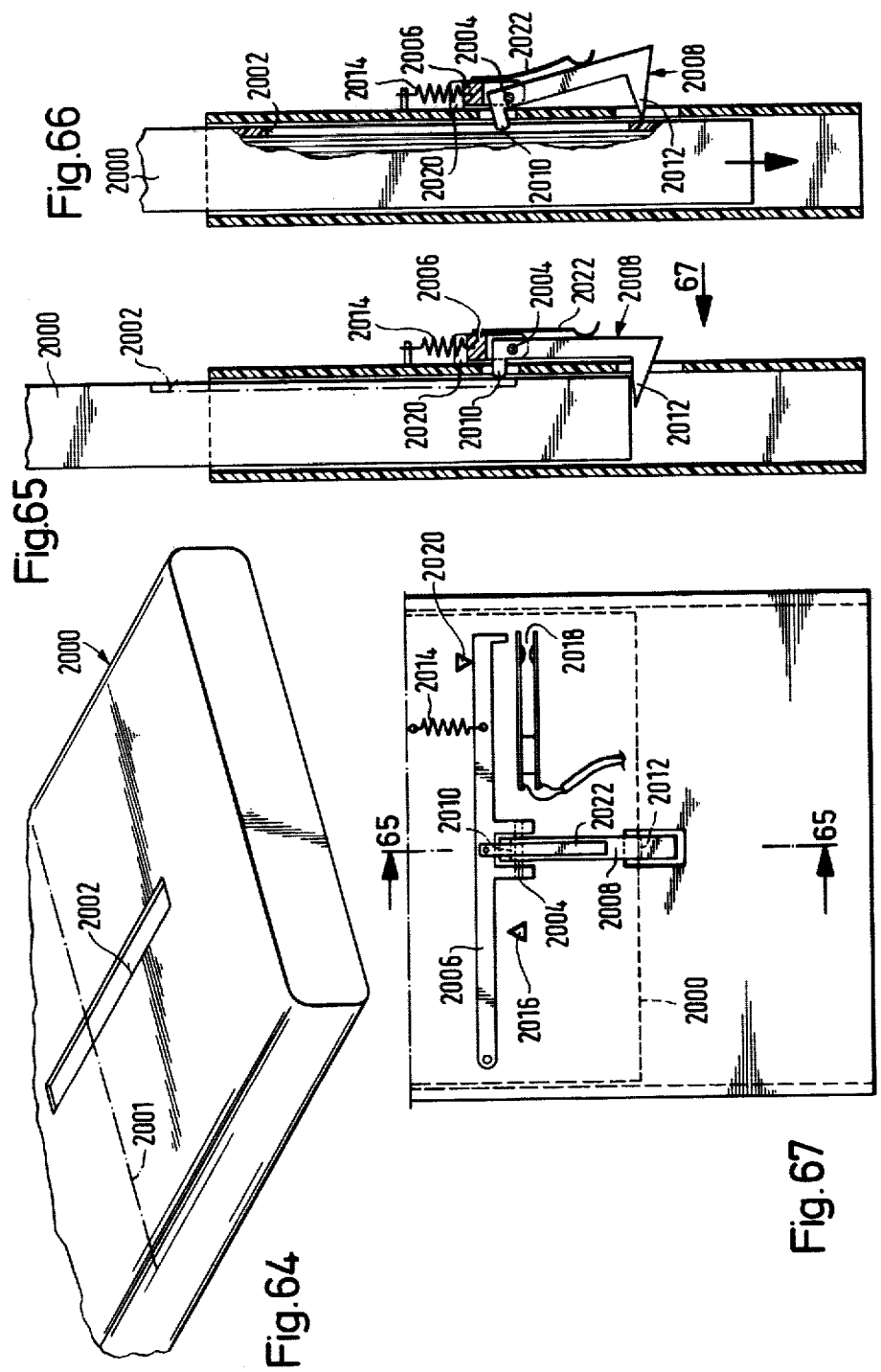

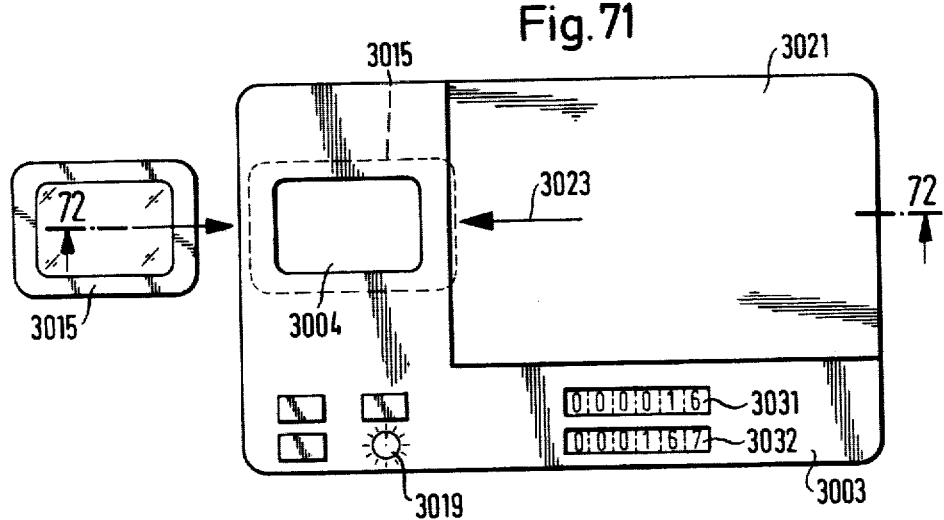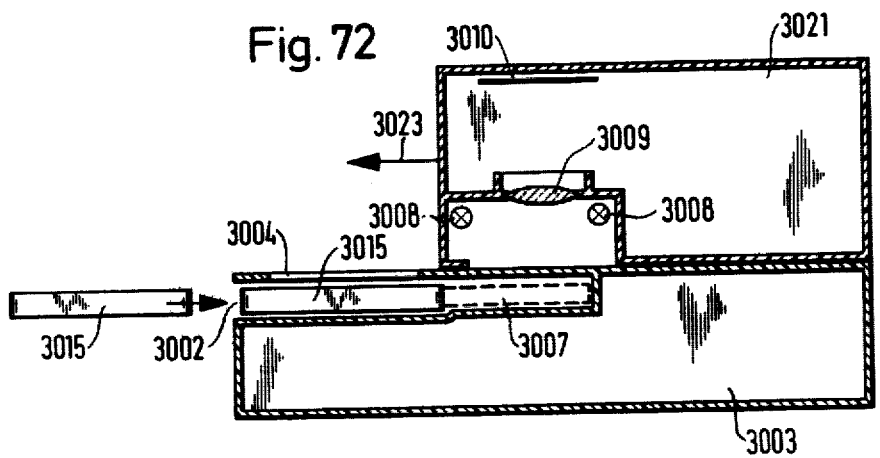

EPISCOPE

The present invention relates to an episcope or, in general terms, to an apparatus wherein a non-transparent picture is subjected to top illumination for the purpose of projecting an image, for direct view, or for reproduction.

DEFINITIONS

The term "picture" as herein used designates the visual information physically present on a sheetlike carrier, as, e.g., a photographic print.

The term "image" as herein used designates the appearance of a visual information on a screen or a board in result to an optical projection.

The term "picture scene" as herein used designates that plane in a projection apparatus ("episcope") onto which, in use, the projection optics is focussed; this plane may physically be defined by the surface of a glass plate or the like but this is not compulsory.

Further definitions will be given in context with the respective parts of the following specification.

BACKGROUND OF THE INVENTION

Top illumination projectors or "episcopes" have been known for decades. The picture to be projected is illuminated by a powerful light source and its image is formed on a screen or board or wall by means of a deflecting mirror system and a projection optic system. In conventional episcopes, the picture is disposed on or beneath the episcope's picture scene and remains accessible to the user. After projection, the picture is manually exchanged, and this handling is difficult and complicated.

Therefore, a previous attempt has tried to mechanize the exchange of the pictures. West German Patent DE-PS No.162 085 describes and illustrates a design wherein the pictures are piled in a compartment and are conveyed by an endless transporter chain individually from the picture scene into a collecting container. This episcope is intended to be used as a movie projector. In the design disclosed in West German Patent Publication DE-OS No. 21 28 117 pictures wound on a drum are projected, or card-shaped pictures are transported by means of a revolving conveyer belt across the picture scene.

In the first-mentioned design it is assumed but not expressively said that the individual pictures which all have the same dimensions are sufficiently thick and stiff to be engaged by the transporter chain and pushed away from the picture scene, and that with a speed sufficient for movie projection. The pictures must be rearranged after the projection so that they will lay in the initial sequence in the pile again. The last-mentioned drawback is inherent to the second design mentioned above, too, in case of loose cards being processed, and the cited publication does not disclose how to solve the problem of removing individual pictures from the pile and to convey them in an accurate position through the episcope.

SUMMARY OF THE INVENTION

It is the object of the invention to provide picture exchange means in an episcope or an on-light viewer wherein the above-mentioned drawbacks are omitted, i.e., wherein a set of pictures to be projected is inserted into the episcope as a pre-sorted entity according to the sequence of projection, is then projected without interference with the sorting and without readjustment at the episcope, and is finally removed again as such entity, whereafter the next set is processed again in the same manner. Handling of individual pictures is to be completely avoided.

The exchange magazine operates as follows:

A housing with a viewing window confines a stack of pictures of uniform size. The pictures are arranged with their image sides facing the window, and a spring urges the top picture toward the window. A drawer or slider is reciprocable within the housing, and when the drawer is pulled out, one picture is removed from one end of the stack (usually the end proximate to the window of the housing) and adds it to the stack at the other end thereof again. During the picture exchange spring pressure on the stack is relieved, and when the exchange is completed spring pressure is applied again to press the top picture against the window.

Such picture viewers are disclosed in U.S. Ser. Nos. 943,364; 943,365; 943,366; 943,369; 943,368; and 943,471, all filed Sep. 18, 1978.

The pictures collected in a magazine all have the same format but the holder in the episcope may, of course, be designed such that magazines having different size can be inserted and actuated. In the most simple case, the reciprocation of the drawer is effected manually even with the magazine inserted into the holder; however, the episcope or a supplemental mechanism may provide motor drive means for this purpose.

The episcope according to the invention fundamentally distinguishes over the two known designs which, in this respect, are comparable with the known diapositive exchange projectors, in that the exchange mechanism is not allotted to the episcope itself and does not form a portion thereof but is provided in the magazines wherein the picture stack is housed and may be stored. Prima facie this may appear uneconomic. However, such exchanger magazines may be manufactured of modern materials using modern methods of manufacture in an extremely economic manner while an exchange mechanism integral to the episcope would have to comply with substantially more complex requirements in view of dust protection, temperature sensitivity, insensitivity against wear and tear, and so on. On the other hand, with the exchange mechanism contained in the magazine the magazines may be removed and operated a number of times to visually check the orientation and sequence of the pictures therein without the need to use the episcope or viewer. This solution, further, has the advantage that episcopes or episcope designs which already exist may be transformed with little effort.

For sake of completeness it may be mentioned that, whereas the episcope usually incorporates a projection screen in the form of a mat screen plate illuminated from the backside onto which the image is project which is in the form of a mat screen plate which is illuminated from its rear side, the episcope may also employ a reproducing apparatus in place of the screen as the image forming portion of the episcope so that a stack of pictures may be automatically copied. Also the device is suited for use as a direct viewer.

Each magazine contains pictures of the same format. The magazines themselves, however, may have different size because they are filled with pictures of different format. These assumptions are applicable in particular to photoprints, however, the number of different formats being relatively small. Preferably, therefore, the episcope is designed such that magazines of different size may selectively be inserted and the projection may occur without further adjustments. When projecting pictures of different size the projected images will have correspondingly different sizes unless additional measures are taken. Therefore, it may be that the optics and the projection screen or mat screen plate size are at first adjusted to accommodate the largest magazine format, and that upon insertion of a magazine having smaller format, the optics may be manually or automatically changed in order to project a smaller picture also in maximum size. In this case the projection screen or mat screen plate will be designed in square format, the edge length of the square being adapted to the largest edge length of an image to be projected.

Non-square or rectangular images may be projected in high format or transverse format onto such a square screen. In a magazine, however, at least sometimes transverse pictures will alternate with high format pictures. Therefore, in a further development of the invention the episcope will have a device by means of which, the transfer from high format to transverse format or vice versa will be effected, by rotating the magazine, or by rotating the entire projecting portion of the episcope, or by optical rotation of the image by each 90°. The pictures to be projected may be provided with a code or marks or such coding may be also provided at the outside of the magazine to be scanned within the episcope so as to cause automatically a necessary transfer from the high to transverse format or vice versa.

Since the picture exchange mechanism is housed in the magazine, at least that portion of the magazine must be accessible for the user during the projection, while accommodating rotation of the magazine for properly projecting images from picture with high format or transverse format. In some embodiments, the episcope will be provided with motor drive for the exchange drawer actuation. If then rotation of the motor drive magazine is provided to change from high to transverse format, it is necessary that the motor drive the magazine in at least two 90° from each other and positions, preferably, in all four possible positions. The predescribed functions, of course, may also be actuated by means of remote control.

In order to have the picture to be projected always flush in the plane of the picture scene, the picture preferably is urged by a pressure plate housed in the magazine and subjected to spring bias. This pressure device suitably is designed such that it is substantially independent of the height of the picture stack in the magazine, and that nevertheless during the picture exchange the pressure is released so to assure the best possible protection of the pictures.

The exchange drawer of the magazine during the exchange motion will exert a pull upon the magazine itself which therefore is engaged in the episcope sufficiently rigidly that it will not change its position during the exchange motion neither in a direction perpendicular to the projection scene nor in a direction parallel thereto.

Upon change of the picture size and consequent change of the magazine dimensions preferably the magazine holder of the episcope will adapt itself to the size of the magazine. The magazine holder may simultaneously be designed as diaphragms panels which prevent that the area of the picture scene juxtaposed to the picture from being projected.

The magazine may be provided, for the purpose of immediate viewing of the pictures without projection, with a window covered by a transparent disc made for example of transparent plastics. The episcope may in this case be designed such that upon insertion of the magazine said disc is pushed away or flipped away so that the picture to be projected will abut immediately at a glass plate having good optical qualities and forming the picture scene of the episcope. Scratches on the plastic window of the magazine eventually caused by the handling thereof will not adversely affect anymore the projected image.

Finally, the pictures in the magazine may be provided with sound recordings either outside the magazine or preferably in the magazine itself. For the use of such sound recordings in this case the episcope will be provided also with sound reproducing means. The picture exchange and sound recordings exchange will preferably be actuated by the actuation of the magazine exchanger drawer. Again, the production of the sound recordings may be implemented by remote control.

The preceding features may be used individually or in combination, in relatively small, simple and inexpensive on-light direct viewers as well as in complex semi- or completely automatic episcopes, which may incorporate a mat screen plate or being designed for projection of the image onto a large projection or being switchable between these two functions.

While it is preferred to actuate the exchange of the magazine by motor drive means, such that the picture exchange can occur in any rotational position of the magazine holder, such a mechanism will result in a generally large apparatus including a complex mechanism. Therefore, a considerable simplification may be provided if the motor drive means are stationary in the episcope housing and may be coupled to the magazine only in one preferred rotational position of its holder; this preferred position will, for reasons to be explained hereunder, be the transverse format projection position. This design is particularly intended to be used with photographic prints.

Experience confirms that almost without exception all transverse format pictures have the same orientation because the photographer has no reason to use his camera "upside down". For photographs in high format, experience demonstrates that the camera will be pivoted about a quarter revolution normally in one direction by right-handers and in the other direction by left-handers. The right-handers prevail. Moreover high format pictures are rarer than transverse format pictures just because they require an unusual operation of the camera. Regarding square format the statements made above with respect to the transverse format will apply.

Thus, when pictures are received in a cassette from the developer and printer firm, most of the pictures will lay in a common "correct" orientation and that further most of the high format pictures are disposed in a second common "correct" orientation. Accordingly, if the cassette is a magazine fitted to the holder most of the picture exchange operations may be made without a necessity to rotate the magazine. Therefore, it will not be inconvenient to require picture exchange in only in one preferred position and that for each other position of the magazine to project pictures with other formats, the magazine must be returned to the preferred position to effect and exchange. If the user further is cautioned that all high format pictures in the magazine must assume only one of the two possible orientations in order to be correctly projected, there are only two rotational positions of the magazine necessary: A preferred position in which the picture exchange may be effected and a position for projecting high formate pictures. It may be assumed that only the small number of left-handers wil be forced to reorient a few high format pictures.

It will be seen that it is not a draw back but on the contrary even advantageous for the user if the holder after each picture exchange will return into the preferred position.

Accordingly the motor drive need only be related to the magazine for this preferred position.

Since no portion of the motor drive will turn together with the holder, the size of the housing may be made accordingly small, which is agreeable to the user and will reduce the expenses of manufacture.

It is a prerequisite for easy use, of course, that the magazine may be introduced into the holder only such that it will lay correctly oriented with respect to the projection plane and that no upside-down projection will occur. In other words, the magazine on the one hand and the holder on the other hand must fit together in but one of the eight possible magazine positions.

Most all photo prints have one of these popular sizes: 9 cm×9 cm, 9 cm×11,5 cm, 9 cm×13 cm. Each size or format requires another exchange stroke of the magazine. Normally, for each picture format a device adapting to the size would have to be provided. Since, however, the manufacturing expenses will be relatively reduced with increasing batches, it is preferred to design the magazine and/or the exchange drive such that they will match at least for a certain number of formats or may be made matching by exchange or adaptor pieces without further amendments at the episcope. This has also some importance for the stock holding of the retailers.

Further preferred or suitable features of the episcope of the invention are defined in the subclaims, the significance of the majority of these features being derivable from the following description of embodiments.

Figure 2:
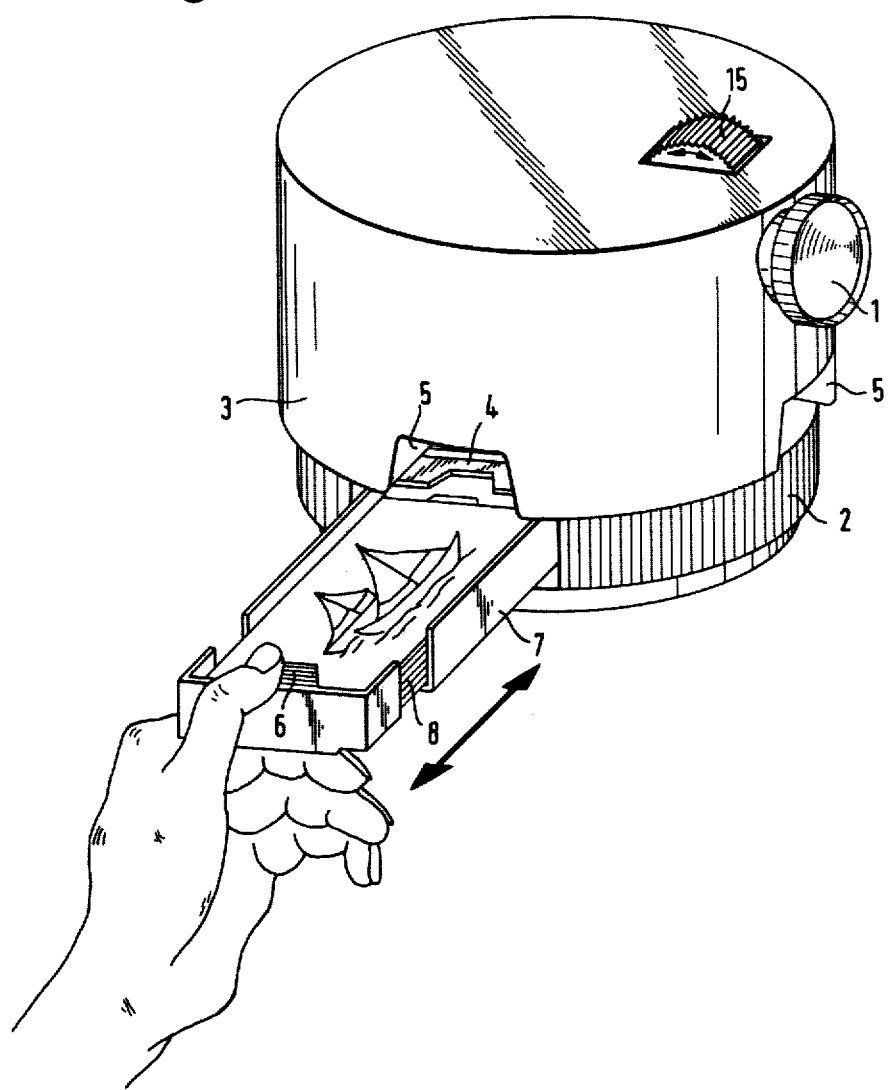

FIG. 1 shows isometrically an episcope according to the invention, an exchanger magazine being just in course of insertion, FIG. 2 shows similar to FIG. 1 the picture exchange with inserted magazine, FIG. 3 is a schematic plan view of such episcope, FIG. 4 illustrates schematically the adaption of the holder to different magazine sizes, FIGS. 5 and 6 illustrate schematically the holder shown in FIG. 4 with magazines of different size inserted thereinto, FIG. 7 is a schematic partial longitudinal section view through an alternative embodiment of the holder, FIG. 7.1 is a somewhat diagrammatic horizontal section view taken at 7.1—7.1 in FIG. 7.2, FIGS. 7.2–7.5 are longitudinal section views taken approximately at 7.2—7.2 in FIG. 7.1 and respectively showing different faces of the operation of the device, FIGS. 7.6–7.9 are longitudinal section views similar to FIGS. 7.2 and 7.5 but with piles of pictures illustrated, FIGS. 7.10–7.13 are longitudinal section views of the device of FIG. 7.1, but on a plane approximately midway between the sides thereof and showing the device in different phases of operation, FIGS. 7.14–7.17 are longitudinal section views similar to FIGS. 7.10–7.13, but including piles of pictures shown somewhat diagrammatically, FIG. 7.18 is a transverse section view taken approximately at 7.18–7.18 in FIG. 7.15.

FIG. 7.19 is an enlarged detail transverse section view through the device,

FIG. 7.20 is a detail perspective view of the housing with portions broken away for clarity of detail, FIGS. 7.21–7.24 are longitudinal section views of a modified form of the picture viewer and showing the viewer in different phases of operation, FIG. 7.25a is a detail horizontal section view taken approximately at 7.25a—7.25a of FIG. 7.21, FIG. 7.25b is a detail section view taken at 7.25b—7.25b of FIG. 7.21.

Figure 10:
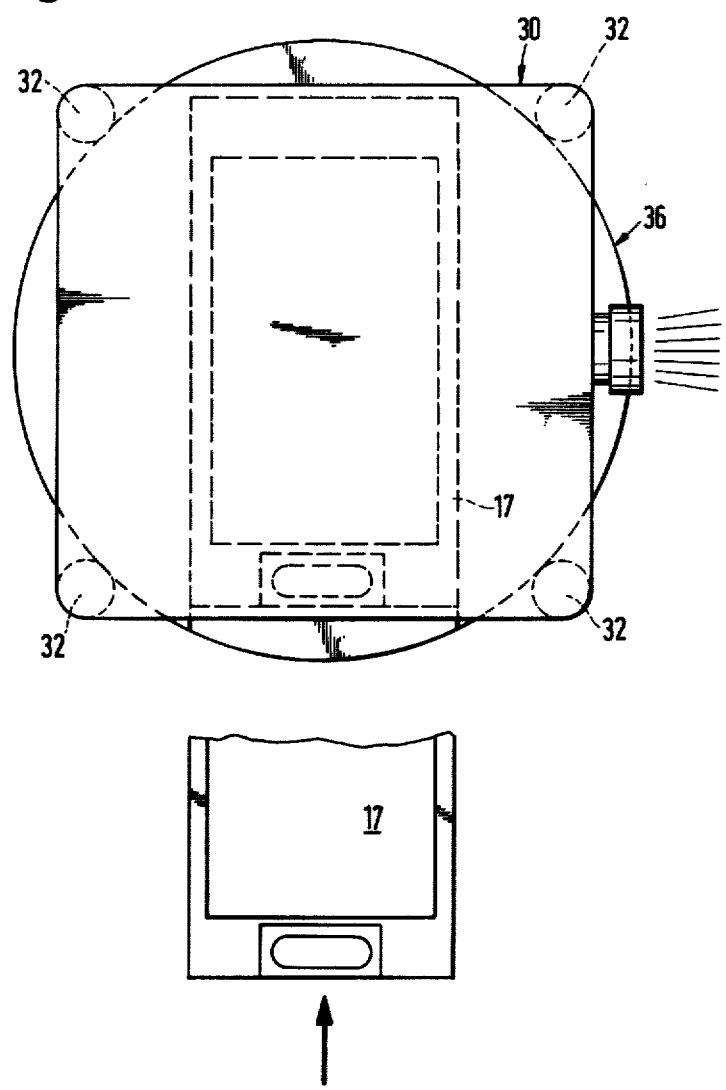
Figure 14:
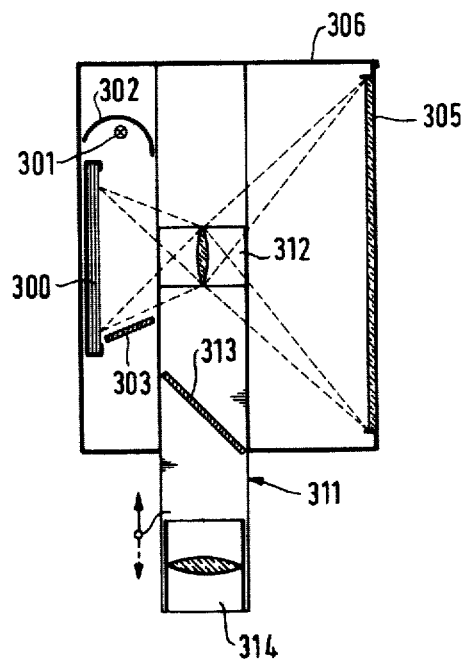
Figure 15:
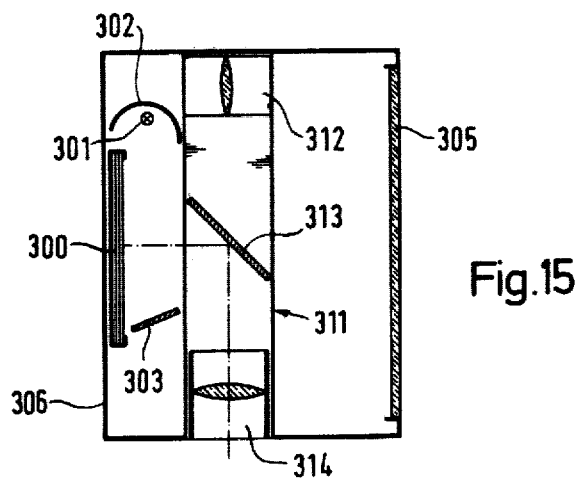
Figure 16:
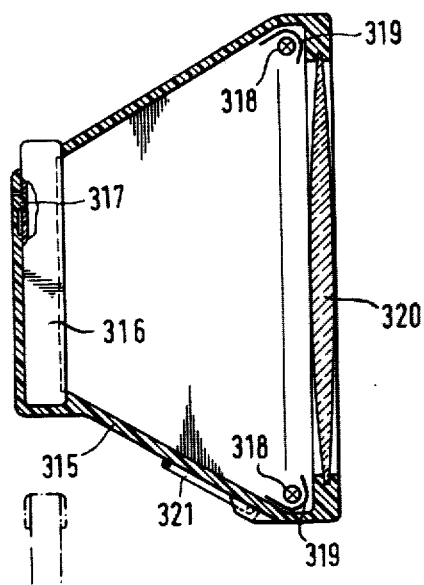
Figure 17:
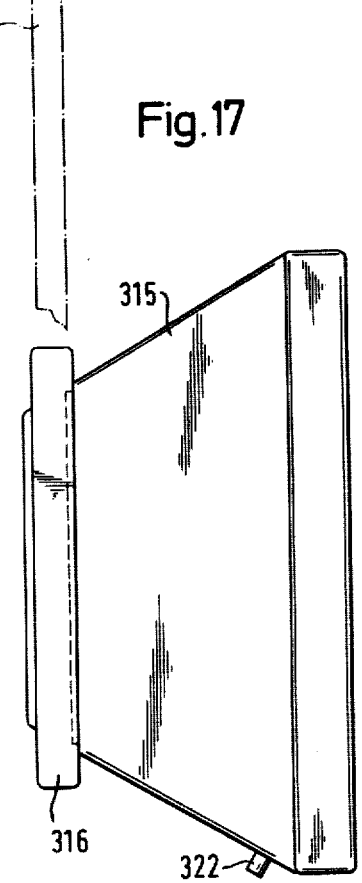
Figure 18:
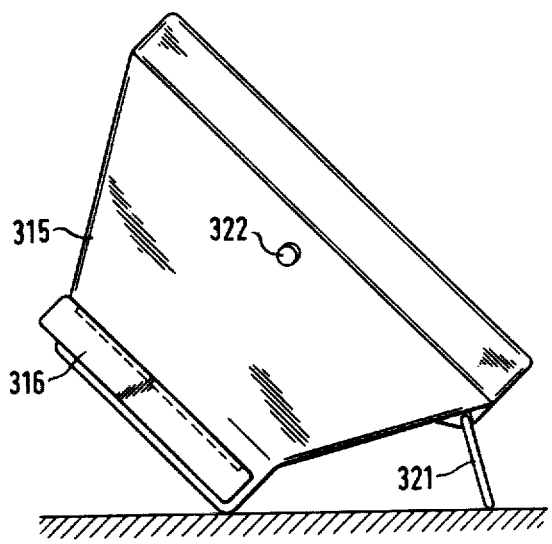
Figure 22:
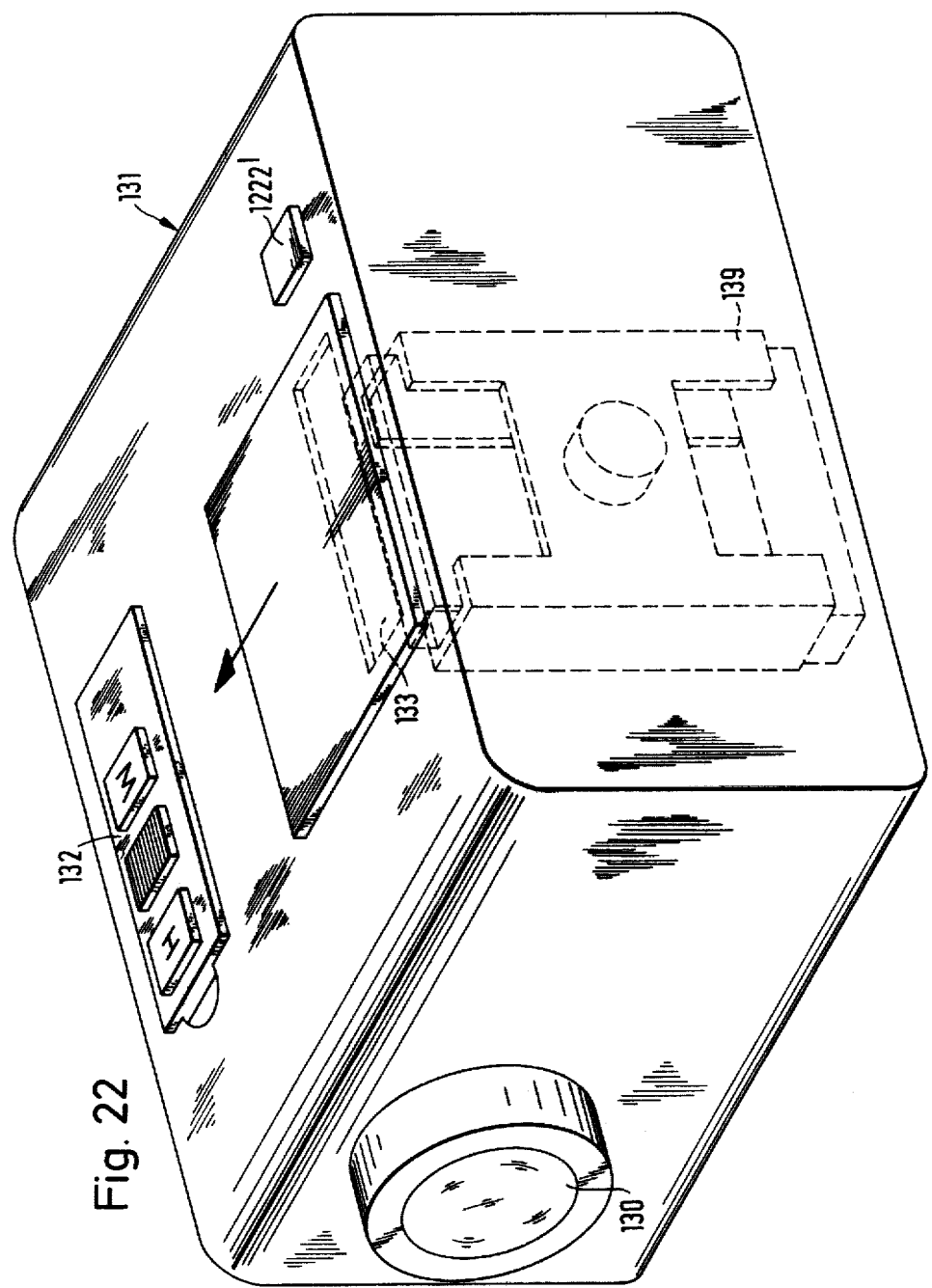
Figure 22A:
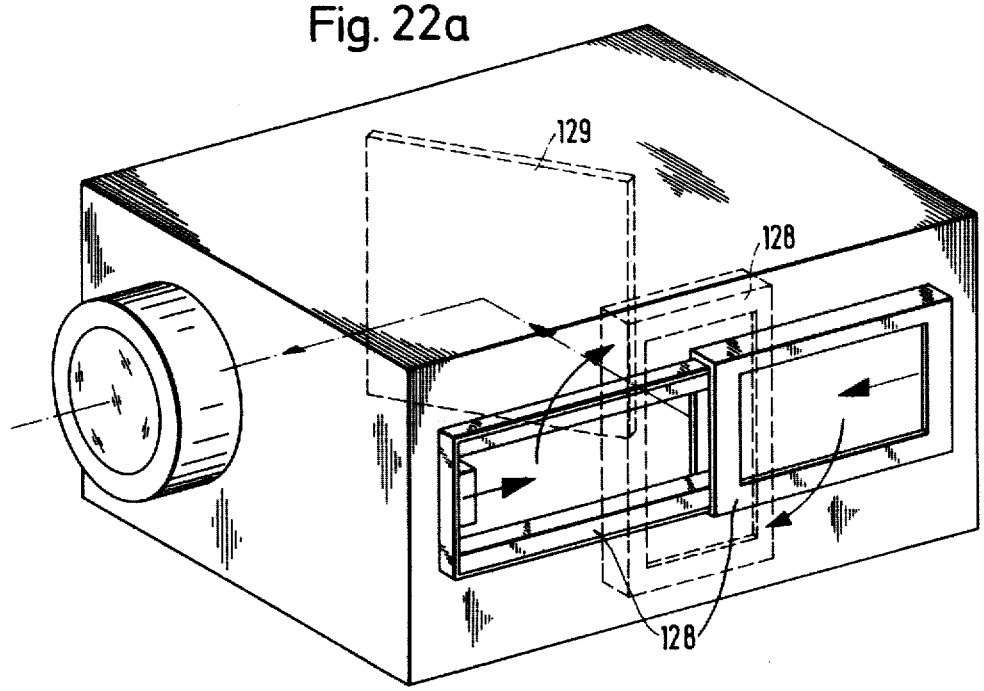
Figure 33:
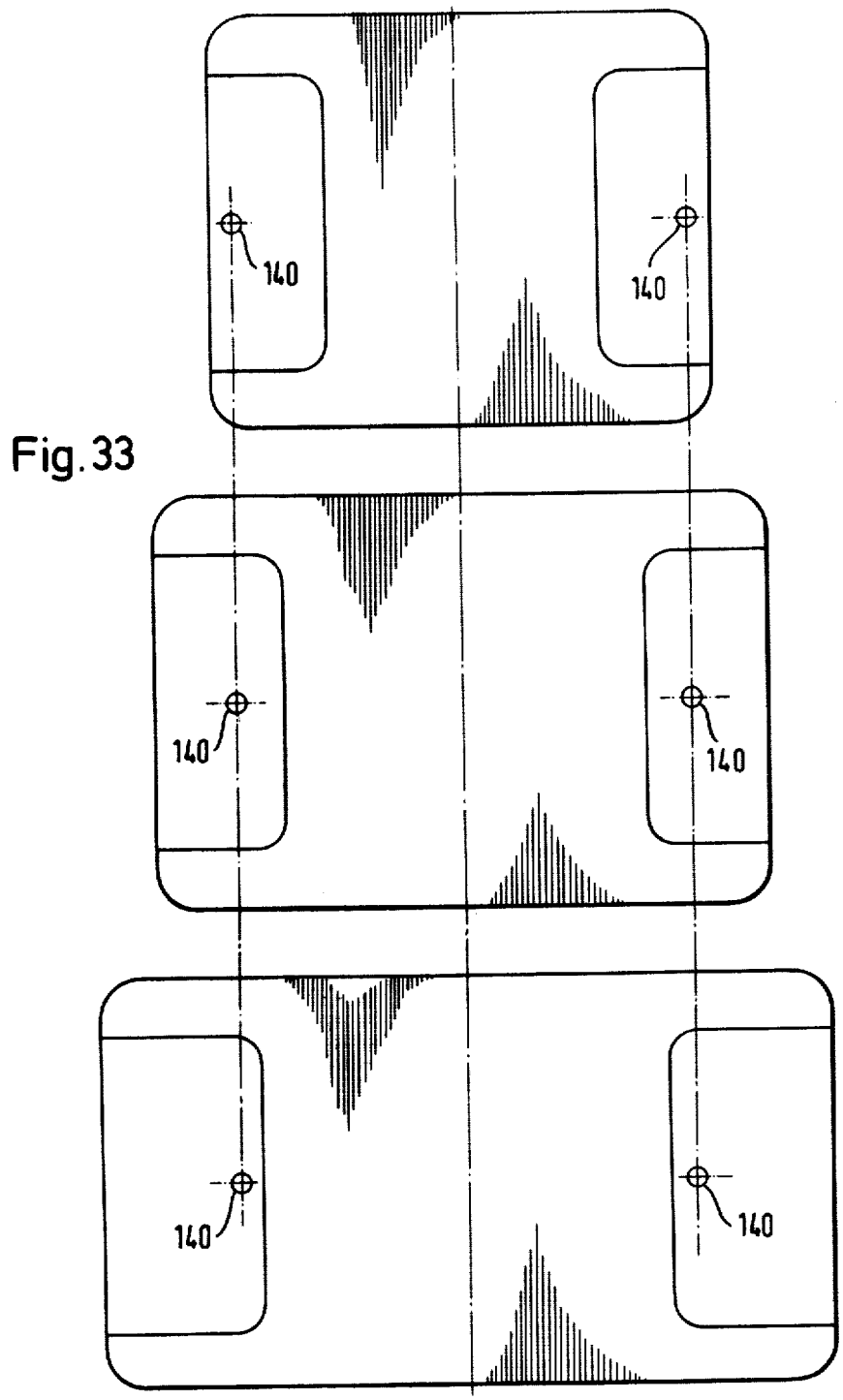
Figure 34:
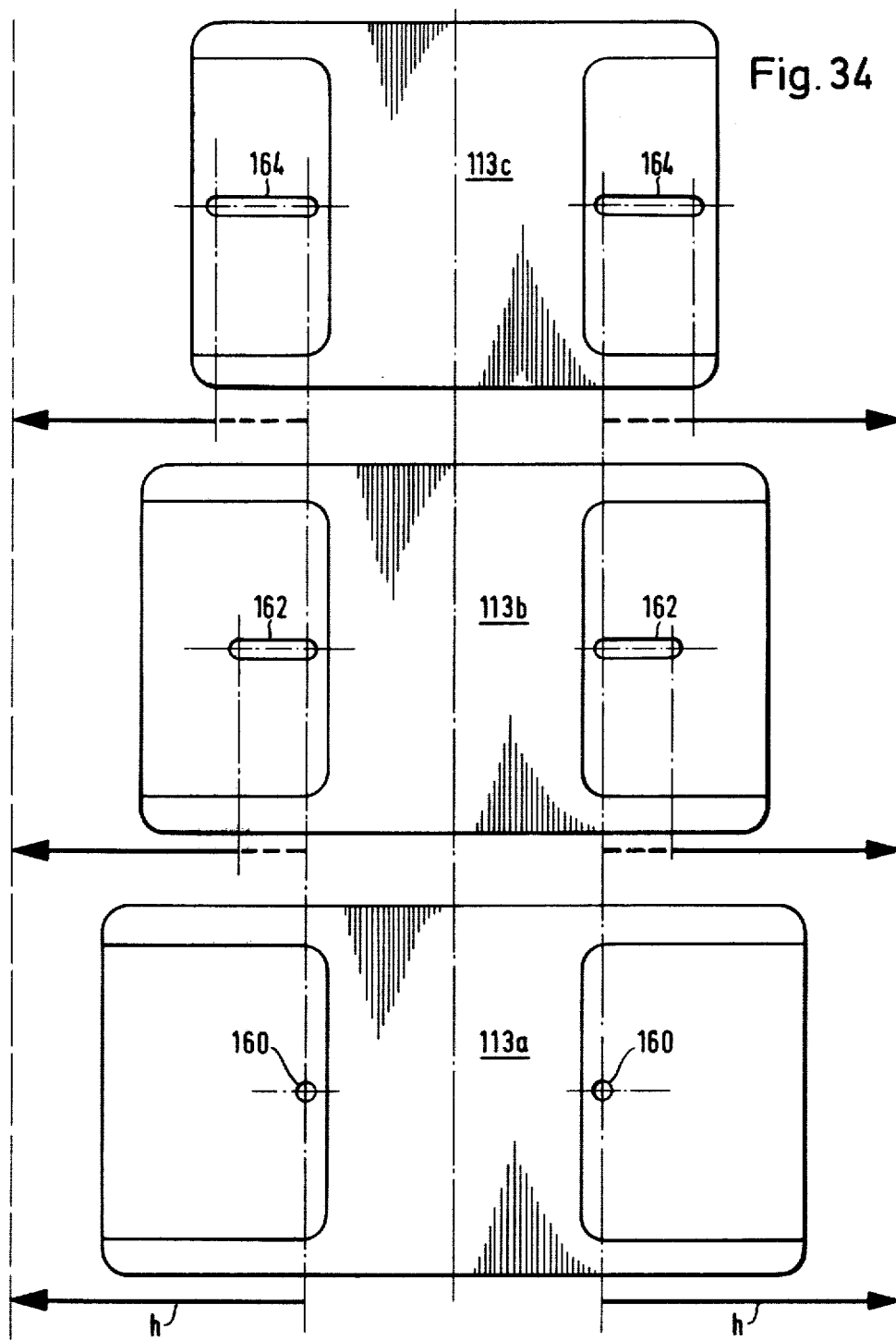
Figures 40, 41, 42:
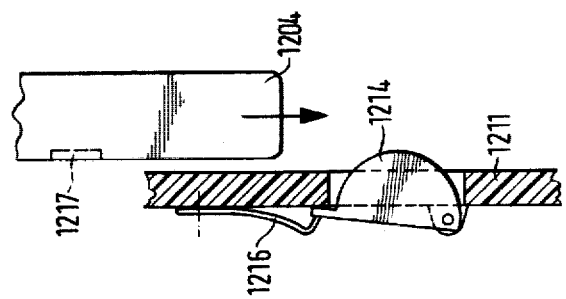

FIG. 8 is a schematic longitudinal section view through an embodiment of the episcope, FIG. 9 illustrates a detail of FIG. 8 in a modified design, FIG. 10 is a schematic plan view to the episcope of FIG. 8, FIGS. 11–15 show substantially schematized further embodiments of episcopes according to the invention, FIGS. 16–18 illustrate the design of an on-light viewer by which pictures contained in an exchange magazine may be regarded in enlarged scale, FIGS. 19–21 show in partial sections the functional elements of an episcope with respect to the magazine holder, the exchange actuation, and the rotation of the holder, FIG. 20a illustrates an alternative to FIG. 21, FIG. 22 shows isometrically an episcope with an exchange mechanism stationary with respect to the rotatable holder, FIG. 22a is a schematic sketch relating to the design of FIG. 22, FIG. 23 is a section view of the magazine holder, FIG. 24 shows an individual magazine in side elevation, FIG. 25 shows isometrically the holder with an inserted magazine, FIG. 26 shows schematically the possible couplings between magazine and exchange drive, FIG. 27 shows two alternative manners for one of the coupling possibilities, FIG. 28 shows schematically two possibilities of automatic stroke adaptation, FIG. 29 shows in enlarged scale a side elevation of a portion of the stroke adaptation, FIGS. 30–32 illustrate schematically further possibilities of stroke adaptation, FIG. 33 shows magazines having different formats for the exchange drives of FIG. 28, FIG. 34 shows magazines having different formats for an exchange drive having constant stroke, FIG. 35 shows a device for the adaption of different formats, FIG. 36 is a section view according to line 36—36 of FIG. 35, FIG. 37 is a section view according to line 37—37 of FIG. 35, FIG. 38 is a detailed section view taken at approximately 38—38 in FIG. 39 and FIG. 39 an axial section view through an exchange and rotational drive, FIG. 40 is a detail section view taken at approximately 40—40 in FIG. 41.

Figure 43:
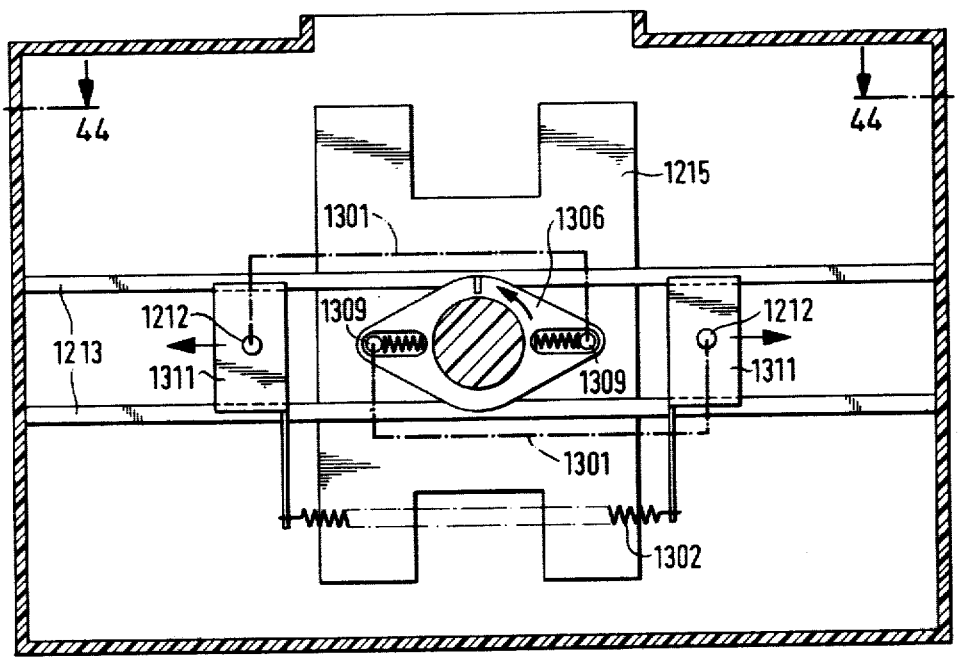
Figure 44:
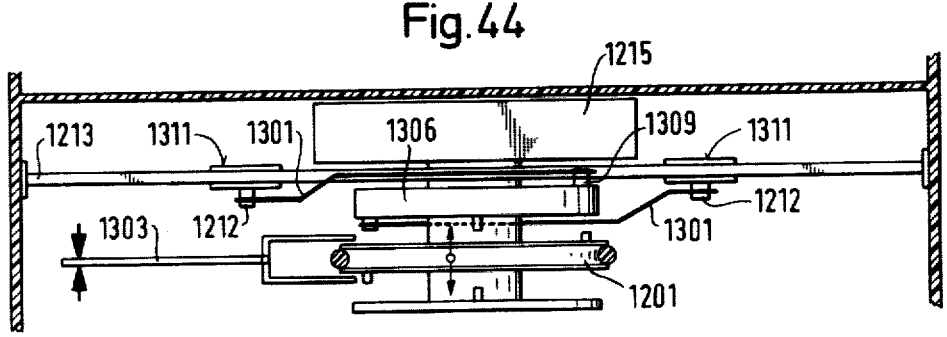
Figure 45:
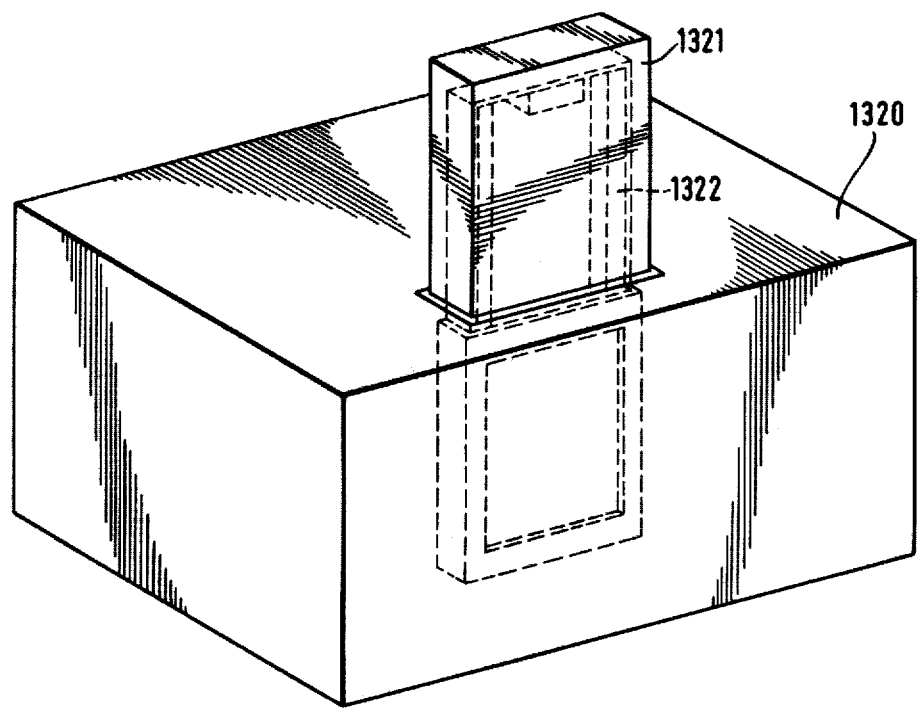
Figure 49:
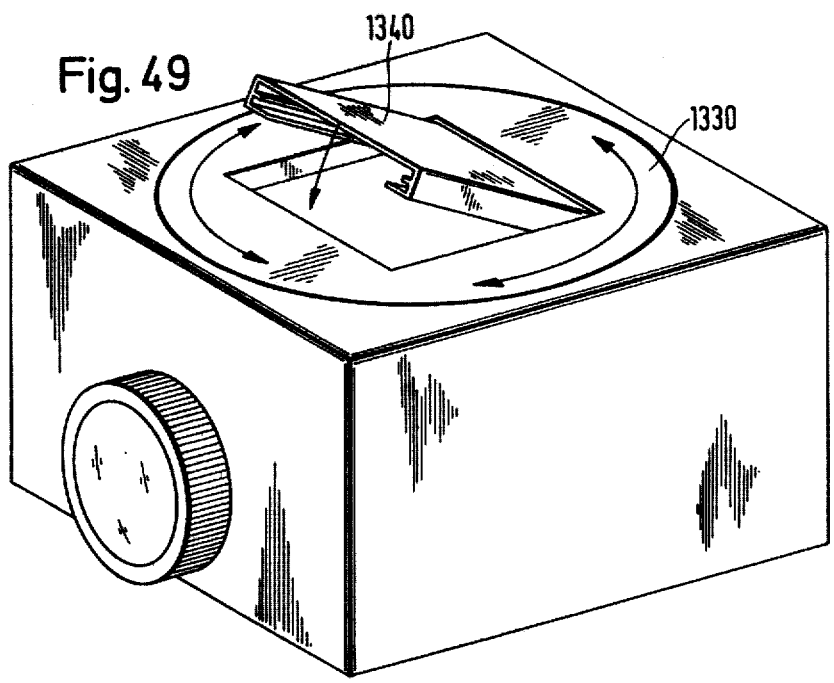
Figure 50:
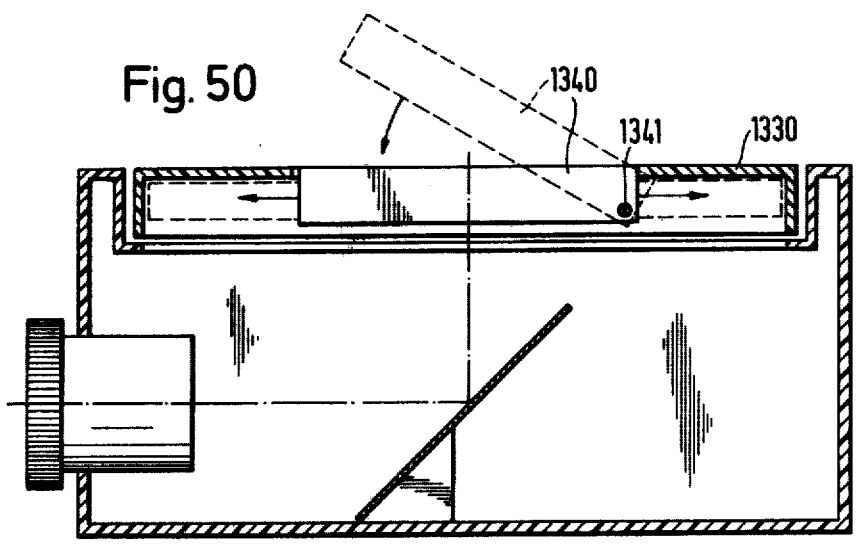
Figure 51:
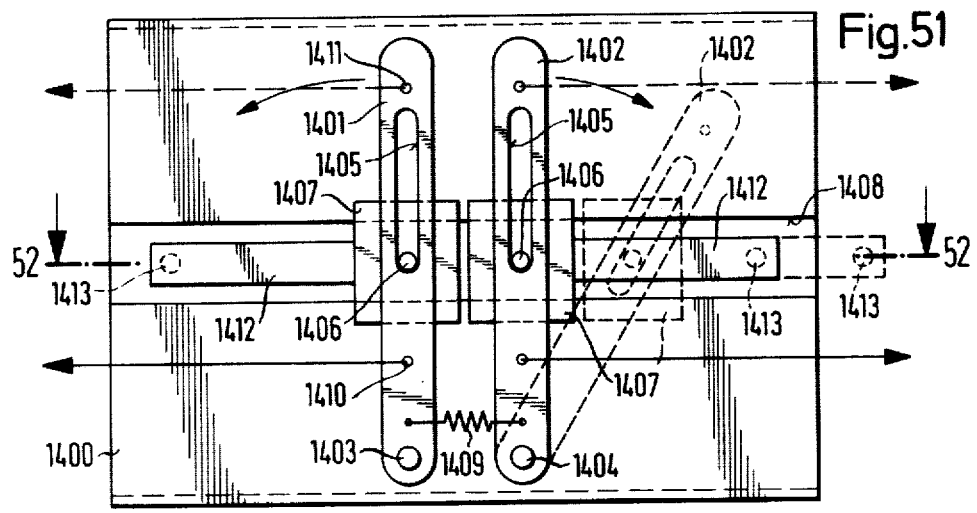
Figure 52:
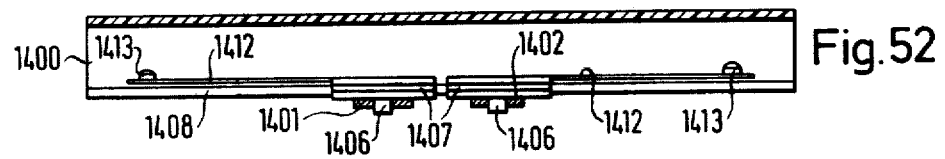
Figure 53:
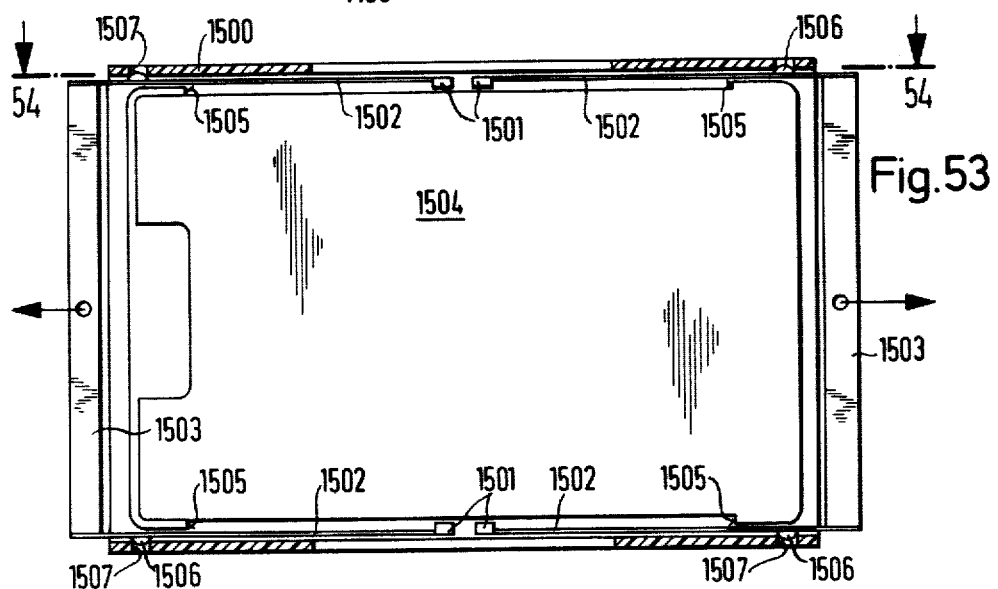
Figure 54:
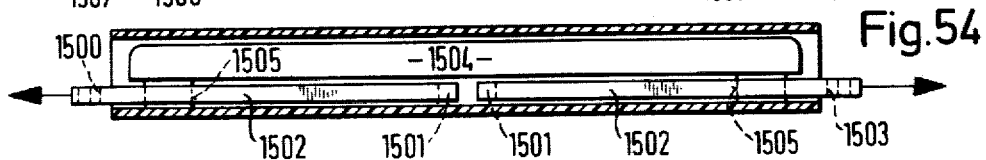
Figure 57:
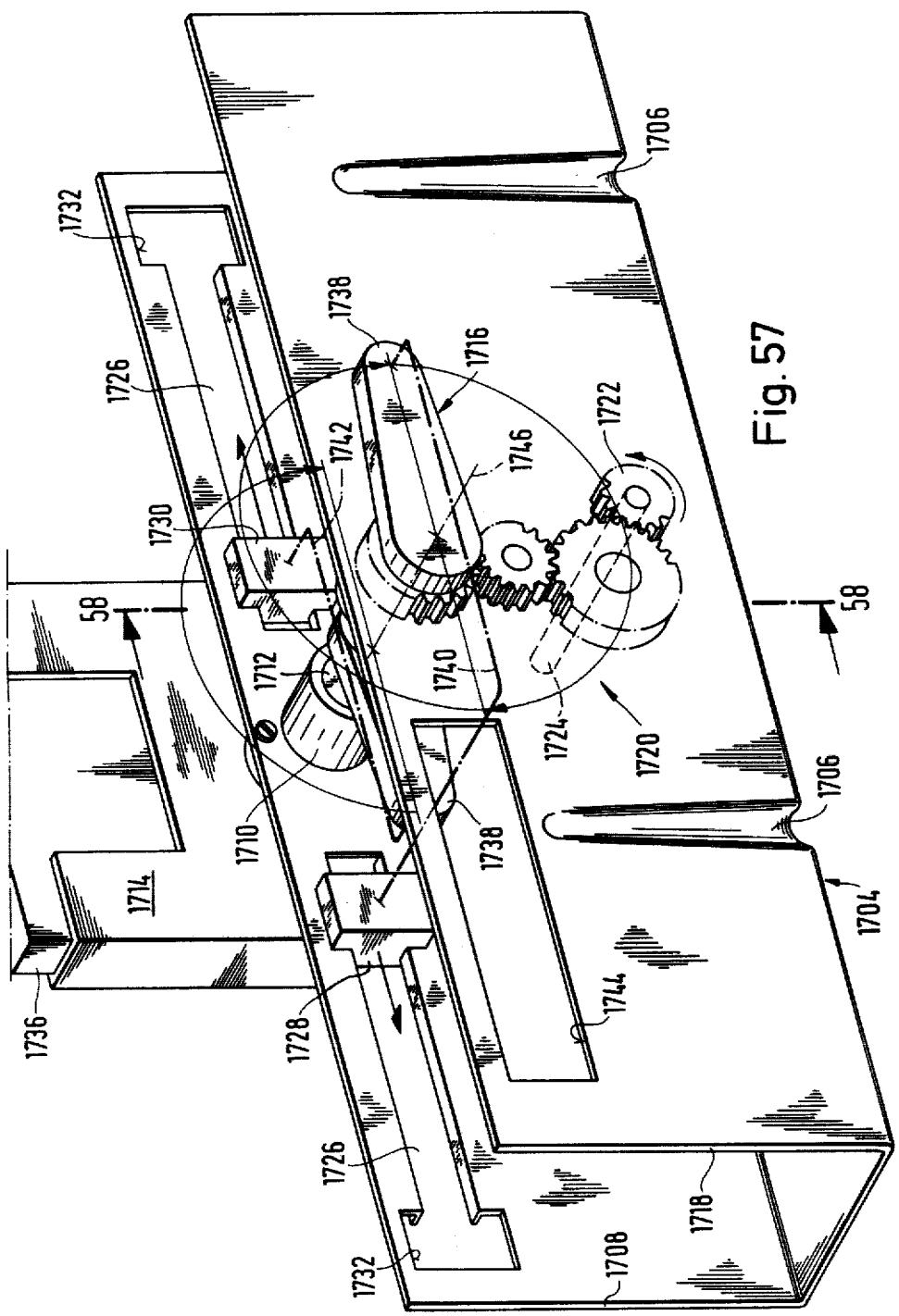
Figure 68:
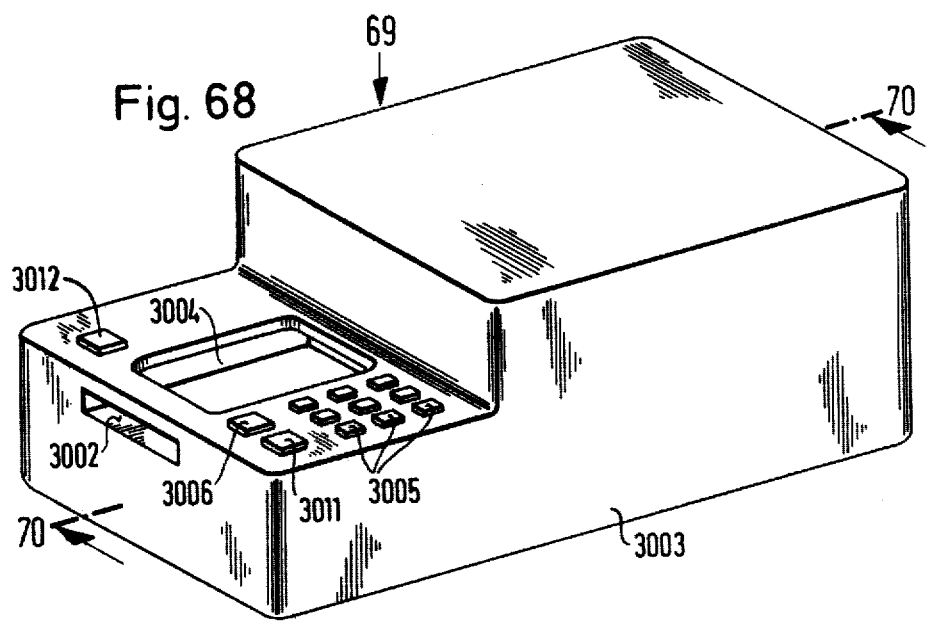
Figure 69:
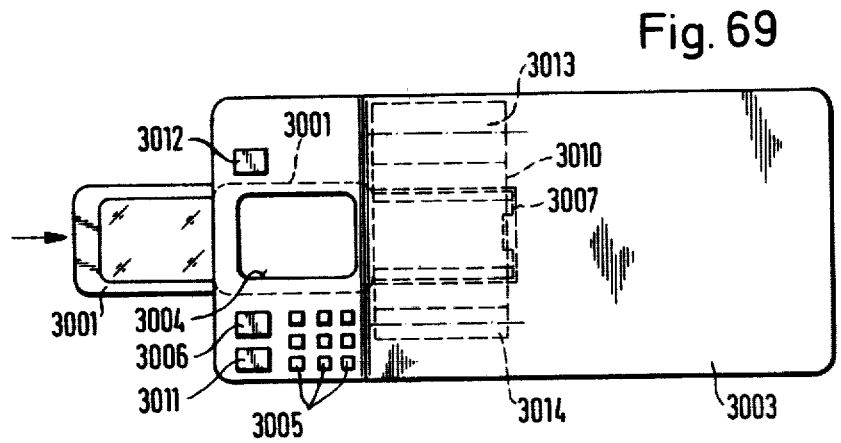
Figure 70:
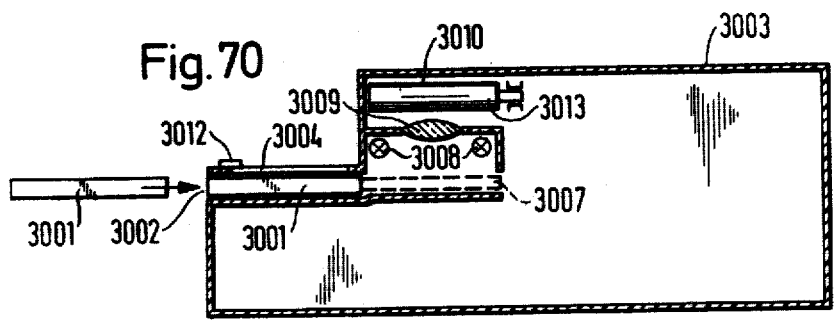
Figure 73:
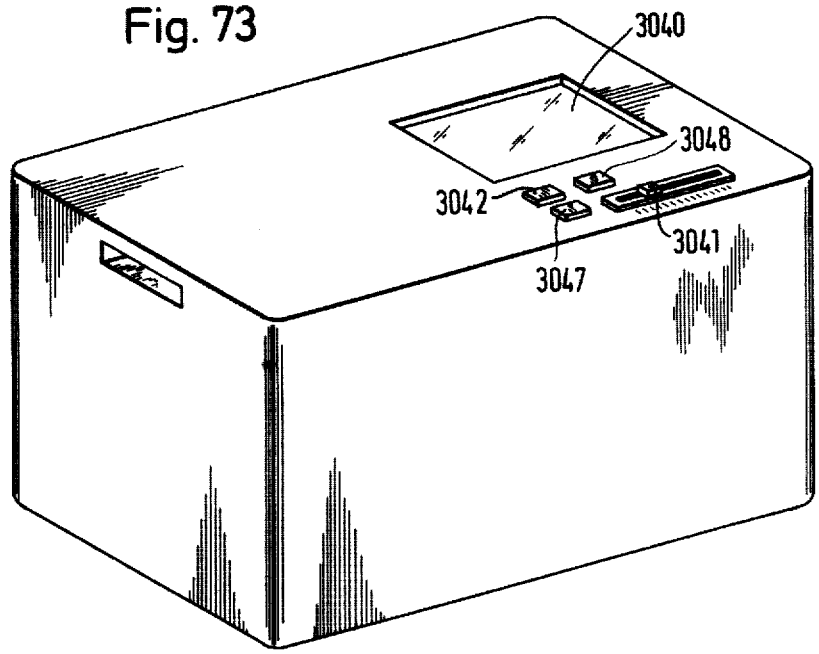
Figure 74:
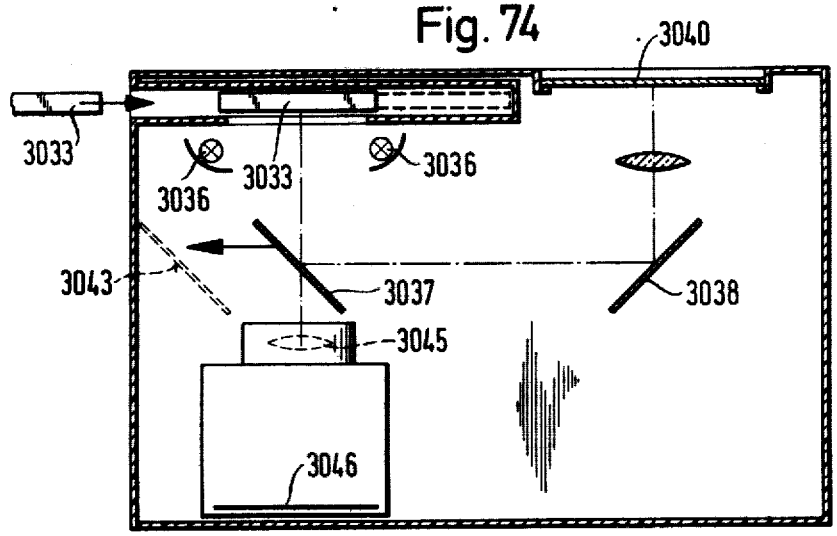

FIG. 41 in axial section view a second embodiment of an exchange and rotation drive, FIG. 42 is an enlarged illustration of the coupling mechanism between drive and magazine for the embodiment for FIG. 40 and 41, FIG. 43 is a section view showing a third embodiment of the exchange in rotation drive and FIG. 44 a detail section view taken at approximately 44—44 of FIG. 3 of the third embodiment of the exchange and rotation drive, FIG. 45 shows isometrically an embodiment which can be designed very small in particular for square pictures only, FIG. 46 shows isometrically and schematically an embodiment having a holder supported at the circumference of a rotating dish, FIG. 47 shows schematically the device for the apparatus of FIG. 46 in plan view, FIG. 48 is an elevation view of the apparatus of FIG. 47, FIG. 49 illustrates an embodiment having a flap mechanism for the insertion of the magazine, FIG. 50 is a schematic longitudinal section view to FIG. 49, FIG. 51 shows in plan view a mask device by which simultaneously a stroke variation for the exchange operation is caused, FIG. 52 is a section view along line 52—52 in FIG. 51, FIG. 53 shows an alternative coupling system for the motor driven exchange, FIG. 54 is a section view along line 54—54 in FIG. 53, FIG. 55 shows in front elevation and FIG. 56 shows in side elevation, partly in section, a diaphragm device in the beam path of the episcope moving simultaneously with the holder, FIG. 57 is an isometric view of an exchange drive similar to that of FIGS. 40–42, FIG. 58 is a vertical section view along line 58—58 of FIG. 57 including the episcope housing portions adjacent to the drive means, FIG. 59 is an isometric view of a magazine to illustrate means preventing misoriented insertion thereof into a holder, FIG. 60 shows in section the respective latch means in the holder, FIGS. 61 and 62 show respectively analog to FIGS. 59 and 60 an alternative solution of the same problem, FIG. 63 is an enlarged section view of the stop pin of FIG. 62, FIGS. 64 and 65 show respectively analog to FIGS. 59 and 60 a further alternative solution, FIG. 66 is analog to FIG. 65 but illustrates the situation with a properly oriented magazine inserted, FIG. 67 shows substantially schematized the system of FIGS. 64–66 apt to display to the user misorientation of the magazine, FIG. 68 is an isometric illustration of a copy printer which operates in accordance with the principles of the present invention, FIG. 69 is a plan view on the printer of FIG. 68, FIG. 70 is a schematic vertical section view of the printer of FIG. 68, FIG. 71 and 72 are illustrations respectively analog to FIGS. 69 and 70 of a second embodiment of a copy printer, and FIGS. 73 and 74 are illustrations respectively analog to FIGS. 68 and 70 but relate to a third copy printer embodiment.

In the usual manner a projection optical system 1 including focus adjustment means 15 is provided in an episcope housing 3. A magazine holder 2 is rotatable relative to the housing 3 by up to 360° as indicated in FIG. 3 and comprises an insert compartment 16 for picture magazines 17. The magazine is pushed in in direction of the arrow 18 in FIG. 1 and is held in locked manner with its housing 4 in the episcope or, precisely, in the magazine holder 2 thereof. It will be seen in FIG. 2 that with the magazine inserted the slider 7 may be pulled, by gripping handle 6 thereof, out of the magazine housing 4 which has been locked in the holder, and may be pushed home again in order to effect the picture exchange. For this purpose it is advantageous that the loading opening of the slider for the stack 8 opens upwards and that upon each exchange the last-projected picture is freely accessible on the top so that it may be removed, if desired, or exchanged against another one. For the rotation of the holder 2, the projector housing 3 may be held at handles 5 where it may also be held during the slider reciprocation unless the episcope is sufficiently heavy to rest on a table or the like. During the rotation of the holder, of course, the magazine is rotated with it so that inverted pictures may, nevertheless, be correctly projected after 180° rotation of the holder. In a similar manner the change between high and transverse format is possible.

It will be seen that instead of manual actuation of the slider or in addition thereto a drive system with preferably an electric motor may be provided in the episcope and this drive system may be remotely controlled. One form of such an electric motor drive as illustrated and described in connection with FIGS. 19–21 hereinafter. Such drive systems may rotate the holder relative to the housing 3. The latter rotating movement, in turn, may also be motor-driven and, if desired, remotely controlled.

It was indicated above that a magazine once inserted will remain in its position relative to the projection optics so that the images will appear always at the same position on the projection screen. Moreover, the exchange magazine itself will preferably be provided with a transparent window plate in its housing, said window plate facing the projection optics (the deflecting mirror in an episcope) and forming the picture support thereof. Due to the spring bias in the magazine, the pictures, thus, lie flush at this transparent window plate so that once the focus of the optics having been properly adjusted, the episcope will remain focussed for all the pictures of the magazine and upon magazine exchange in most cases slight tolerances have to be accomodated only. If the sight window of the magazine is used as the picture support, the episcope may be open in the plane of the picture scene.

Further it will be possible to provide compartments in the holder for a plurality of magazines whose pictures will be projected in sequence and eventually under the control of a program. Alternatively, a multi-magazine exchange mechanism may be assembled to the one compartment of the episcope. Similarly, picture identification and picture quick access mechanism may be implemented within the scope of the invention.

Details of the magazine holder will be explained hereunder with reference to FIGS. 4–7.

Since most different picture sizes are possible, the holder should be designed such that it will automatically adapt to the respective magazine dimensions. Most have one of the popular sizes 9 cm×9 cm, or 9 cm×11.5 cm, or 9 cm ×13 cm, and magazines for these sizes will be accommodated in the episcope. However, even for photographic prints, different formats exist and it cannot even be predicted whether or not still other sizes will become customary.

Therefore, the holder shown in FIGS. 4–7 is designed such that it will infinitely adapt itself to the magazine sizes within a given range of sizes. The holder comprises, two lateral diaphragms or rigid panels 9, 10 which may be spread apart against bias springs in direction of the arrows 20 upon insertion of a magazine housing 4 in direction of arrow 21 into channels (not shown) at the underside of the diaphragms or panel. A transverse diaphragm 11 overlies panels 9, 10 and may be pushed back against the bias of springs 22 once the magazine has been introduced into a facing channel or transverse diaphragm 11. The position of two magazines of different size and the allotted positions of diaphragms 9, 10, and 11 are indicated in FIGS. 5 and 6, respectively. FIG. 6 further illustrates schematically a locking lever 14 engaged into a lock indentation 23 of the magazine housing 4; this lock indentation 23 is provided at magazines of different formats always at this point, e.g. spaced the same distance from the front wall 24 of compartment 16. Upon release of locking lever 14 the magazine is ejected by action of the springs 22 or of an auxiliary spring. Suitably, the holder and the magazines are designed such that all magazines of different size will be positioned in the center of the picture scene, the position of indentation 23 being accordingly selected.

FIG. 7 illustrates schematically that a cover portion 12 of the diaphragm may engage over the frame 13 which surrounds the sight plate 25 of the magazine so that during projection the area of the window itself only with the picture thereneath will be seen on the screen while no image of the magazine frame will be formed.

In FIGS. 4, 5, and 6 one will recognize a strip 28 made preferably of felt disposed on the transverse diaphragm 11 adjacent the end edge thereof facing the magazine. This felt strip abuts at a glass plate provided in the episcope above the magazine holder and serves the purpose to remove dust from this plate during magazine exchange.

In fact it is prefered to cool the 50 above the magazine as shown in FIG. 8, because of the high output of the light source which is necessary together with the light source itself, and that, as shown in FIG. 8, from the face of the place opposite the light source:

The episcope of FIG. 8 comprises two main portions: The projector housing 30 supported on feet 32 and the holder assembly 36 disposed thereneath, rotatable about a pin 34. Pin 34 is mounted on a support plate 38 which, in turn, is rigidly connected to feet 32. The projector housing 30 has substantially square contour (cf. FIG. 10) while the holder assembly fits substantially into the spacing between two diagonally opposite feet and is therefore rotatable about 360° entirely.

The magazine including the housing 4 and slider 7 are illustrated in a first embodiment in FIGS. 7.1–7.20 and in a second embodiment in FIGS. 7.21–7.25b, incorporated by reference from copending allowed application Ser. No. 943,369, filed Sept. 18, 1978.

In FIGS. 7.1–7.20 the entire stack of pictures, except the topmost picture, is moved with the slider as illustrated in FIG. 2, and the topmost picture is stripped off the stack and returned to the bottom of the stack when the slider is pushed in again.

In FIGS. 7.21–7.25 the exchange involves only stripping off the topmost picture which moves with the slider and which is returned to the bottom of the stack of pictures which remains stationary in the housing.

FIGS. 7.1 to 7.20 relate to a first example of an embodiment.

The housing or frame 700 (housing 4 of FIG. 1) comprises a base plate 702, side walls 704, a back wall 706 and a lid 708 having a window 710. The slider member 712 (slider 7 of FIG. 1) movably guided on the housing or frame 700 to permit relative reciprocation of the frame and slider including relative obverse and reverse sliding movements in opposite direction and between stops which are constructed in the side walls 704, the slider consists of base bars 714, side bars 716, one front bar 718 and a separator bar or pile transporter 720. A pull 722 for pulling and pushing is shaped on the front bar and a holding-down lug 724, likewise shaped on the front bar, may be recognized.

In the housing there is a pair of springs 726 biased by arching upwards, one end of each of the springs being anchored in the housing base plate 702 while the other end of each spring is able to execute a restricted sliding movement along the base plate. The springs 726 press against the main limb 730 of a pressure plate 728 and urge this upwards; as indicated in FIG. 7.1, the springs 726 are integral with the pressure plate and the arms of the springs 726 facing the back wall 106 are spaced further apart than the arms facing the front bar 118 of the slider member.

The two main limbs 730 of the pressure plate 728 are joined together by a cross member 732 on which a central limb 734 is shaped. Finally, auxiliary limbs 736 extend additionally from the cross member 732. The function of these elements will be explained in detail later.

In the base plate 702 there is formed a guide 738 parallel to the direction of movement of the slider member, in which guide a button or disabling control 740 may be moved in a sliding manner. The button 740 is pulled towards the back wall 706 as far as a stop (not shown) by means of a restoring spring 742 and has a central hole into which the central limb 734 of the pressure plate projects in a sliding manner.

Control abutments 744 and 746 are shaped on the lateral bars of the slider member and their function will also be explained later.

On the main limbs 730 of the pressure plate 728 there are individual picture transporters or strips 748 attached, as by glue. The retentive strips 748 are of rubber or a commercially available plastics material which with only a slight contact pressure exerts an unusually high retentive or adhesive force.

As will be realized, the pressure plate is intended to hold fast the bottom-most picture of the pile as the slider member is pulled out, while the separator bar takes with it the other pictures. When the slider member is returned, however, the effect of the upward application of pressure by the plate must be considerably reduced. The sequence of operation will be explained first of all with reference to FIGS. 7.2–7.5, without the pile inserted.

FIG. 7.2 shows the initial state. The pressure plate lies under the influence of the springs 726 against the window 710 and the lid 708; the separator bar 720 is located between the pressure plate and the back wall 706. If the slider member 712 is now pulled, then the inclined face of the separator bar presses on the edges of the main limbs 730 that are facing it and these move downwards, as the springs 726 yield. The other end edges of the main limbs are, however, as before, pressed upwards. The control abutment 744 thus does not strike the control edge 750 of the main limb 730, which takes the form of a lateral extension thereof, because it slides away beneath the abutment 744. In the end position of the slider member (FIG. 7.4) the separator bar 720 is pressing the front edges of the main limbs 730 downwards, and because of a "rocking movement" the rearmost edges of the same are correspondingly raised. If the slider member is now pushed in again, then the separator bar presses the pressure plate further down again, but the lowest position of the plate is now near to the front edges, that is to say, nearest the slider member. Therefore, the control abutments 744 now engage over the control edges 750 of the pressure plate and hold this down until the slider member has returned almost to its initial position again where the control elements disengage again and the pressure plate moves rapidly upwards again (cf. FIGS. 7.1 and 7.5.), The actual picture change sequence proceeds as follows (FIGS. 7.6 to 7.9): To begin with the pressure plate is loaded with a pile 752 of, for example, twenty pictures and therefore lies lower down than illustrated in FIG. 7.2. As the slider member is pulled out, the separator bar takes with it all the pictures of the pile, since the separator bar "sweeps" over the pressure plate. The bottom-most picture 752' however, against which the retentive covering 748 on the main limbs 730 directly presses from below, is held fast by the retentive covering and remains lying on the pressure plate 728. For the rest, the procedure takes place as described above with reference to FIG. 7.3. Finally, the slider member reaches its end position shown in FIG. 7.8, in which the pictures 752 fall at the front onto the base bars 714 of the slider member whilst still lying with their rear edges on the pressure plate. As soon as the separator bar 720 has slid over the ends of the auxiliary limbs 736 that are slightly biassed in an upward direction, the picture 752' that has remained behind is pressed upwards a little by these ends at this (front) edge, so that when the slider member is re-inserted the rear face of the separator bar 720 pushes between the pressure plate and this picture 752' and raises the picture sufficiently far for it to be brought upwards over the upper edge of the separator bar. On further movement of the slider member its separator bar therefore slides below the picture 752' that positions itself in the final position as the uppermost picture on the pile 752. The insertion of the pile is thereby not hindered by the retentive covering 748 since, as mentioned above, the pressure plate is held down by the control elements 744, 750.

If the entire pile is to be removed, then the button 740 is displaced towards the front. As apparent from FIGS. 7.10 to 7.13, the central limb 734 of the pressure plate is downwardly curved so that an S-shape, which is straight when viewed from above, is produced, the lower end of which projects into the button. If the button is displaced out of the position shown in FIG. 7.10 into the position shown in FIG. 7.11, then it presses on the upper inclined face 754 of the central limb 734 and pulls the complete pressure plate 728 down against the force of the springs 726, and in fact pulls down until the upper side of the retentive covering 748 is lower than the surface of the base bar 714 of the slider member 712. Thus, when the slider member is pulled out, the entire pile 752 with it, as the pile now lies on the slider member itself. As a result of the biassing of the springs 726 and the friction contact of the central limb 734 in the button 740, the button is not pulled back by the spring 742 which is weak in comparison. However, when the control abutment 746 strikes with its sloping control face 756 on the control edge 750, the pressure plate is pressed down even further and in this manner terminates the clamping between the button 740 and the central limb 734 so that the button is pulled by the spring 742 into its rest position (FIG. 7.12). Nevertheless, the control abutment 746 holds the pressure plate below the level of the base bars of the slider member so that the pile can be pulled out unimpeded to its full extent. Near to the end of the path of movement the control abutment 746 releases the control edge 750 again; the springs 726 are able to press the pressure plate upwards again at its rear edge whilst at the front it is still held down by the separator 720.

From the above explanations the sequence can be followed again with reference to FIGS. 7.14 to 7.17 when a complete pile is to be removed; the positions of the slider member according to FIGS. 7.14 to 7.17 are analogous to those of FIGS. 7.10 to 7.13.

FIG. 7.18 shows once again the relative positions of the base bars 114 on the one hand, and the pressure plate 128 on the other hand when the button is in the removal position.

In principle, it would also be possible to return the button into the rest position by means of a control member (not shown) simply during the return of the slider member. However, it may be seen that in the embodiment illustrated there is the advantage that by holding the button firmly in the removal position, the device can be held permanently ready for the removal operation, for example in a storage position of the device in a frame or for transporting sensitive pictures.

The operations that are effected by the pressure plate will now be summarised once again.

During picture change-over, the pressure plate is always held straight with the "line" (transversely to the movement of the slider member) adjacent to the bottom-most picture, where the separator runs over. The picture to be retained is consequently clamped reliably where necessary. During the return of the slider member on the other hand the control elements 744 to 750 hold the pressure plate below the level of the base bars of the slider member (or other support means, e.g. on the base plate of the housing) so that the retentive covering 748 does not touch the underside of the pictures.

During the change-over of the pile the pressure plate is brought into the same position as during the change-over return stroke but by means of a button that can be actuated separately. This can be held permanently in the position in which the pile can be changed, but springs back automatically without further manipulation into picture change-over position. It will be seen that in this manner the device is fool-proof.

The pressure plate is so constructed that it also reliably holds fast badly curved pictures and permits the change-over and removal procedure to take place. In order to deal with such "bent" pictures, however, a series of further features is provided in order to prevent incorrect operation.

Pictures that are curved downwards about the transverse axis—at right angles to the direction of movement of the slider member—could lead during the picture change to the top-most or a few of the upper pictures not being pushed back by the end wall 718 of the slider member but being jammed between the end wall and the lid of the housing. For this reason the holding-down lug 724 is provided, beneath which the pictures can be snapped as they are inserted; further possibilities are discussed below.

Pictures that are curved in a reverse direction would not be able to allow the passage of the separator during the change-over process, but would push against this. In this case an especially low-friction material may be used for the separator, and instead of manufacturing the complete slider member in one piece in an injection-moulding process, the separator can be attached as a separate part.

Pictures that arch downwards about the longitudinal axis could admittedly lie laterally on the base bars of the slider member during the return stroke of the slider member and in this way remain clear of the retentive covering of the pressure plate, but would push centrally onto the facing edge of the central limbs 732 of the pressure plate. For this reason the relevant edge interrupted by the springs 726 and the auxiliary members 736 is designed to converge to a point, as apparent from FIG. 7.1. A reverse arching of the pictures would not lead to any disruptions.

Although the pictures must, of course, lie freely in the slider member, disruptions might occur if the pictures were to lie crookedly. For this reason stop projections 760 and 762 which project from below and from above, respectively, are shaped on the back wall 706 and project to such an extent that they extend into recesses 764 and 766 of the separator 720 when this is in its inner end position (FIG. 7.19). In this position one projection 760 in each case near to the lateral walls of the housing projects downwards from the lid thereof towards the interior and further inside a projection 762 projects upwards from the base plate towards the interior. In the direction in which the slider member is pulled out the projection is aligned with one of the retentive coverings 748, with the result that the corresponding recess 766 of the separator itself ensures that the separator cannot touch the retentive coverings. A further recess 768, which is formed in the slider member from above, leaves room for the passage of holding-down cams 770 which project downwards from the lid and may be more clearly seen in FIG. 7.20, whilst they have been omitted from the other Figures in order to keep these clear. Their function is to press down the uppermost picture so far below the upper edge of the separator when the slider member has been inserted, as to make certain that the slider member takes with it the uppermost picture. Similar holding-down cams that extend further down and are likewise indicated best in FIG. 7.20 are located near to the front edge of the lid; they have the function of pressing the pile pulled out during the change-over so far below the level of the lower side of the picture 752' lying on the pressure plate that the sliding movement of the picture 752' over the separator is effected as far as possible without any hindrance. In FIG. 7.19, the upper sides of the pictures are indicated below the cams 770 and 772 by broken lines 770' and 772'.

Finally, it is also apparent from FIG. 7.19, in which, however, this effect has been considerably exaggerated, how the picture held fast on the retentive coverings 748 is stressed by the separator 720 and thereby held so that it clings reliably.

The exact profile of the separator in the transverse direction depends on the type of pictures to be formed into a pile, on the choice of material and other components. A compromise must be made here between the space requirement occasioned by the necessarily inclined attitude of the separator, along which the pressure plate edge must slide at the slider member end, and the firmly held picture must slide at the other end, and an optimum inclination for these faces. For fairly smooth plastics material an angle of about 45° to 60° has proved successful, although this angle need not be constant, as indicated only schematically in FIGS. 7.2 to 7.17, but may also vary along the inclined faces or may be different from one face to the other.

The above-described embodiment had the separator arranged on the slider member and the transporter arranged on the pressure plate. In the embodiment shown in FIGS. 7.21 to 25 the separator is arranged in the housing and the transporter is a flattened sleeve which is caused to rotate by the slider member and pulls away the uppermost picture of the pile which is then pushed by the slider member under the pile again, the pressure arrangement being disabled.

FIGS. 7.21 to 7.24 show in substantially schematic longitudinal section, the housing, slider member, pressure arrangement and the pile of pictures in their individual operational positions during the picture change, while FIG. 7.25 shows a plan view, half cut away, of a control plate for disabling the pressure arrangement as the slider member is being reinserted, which control plate lies close above the base of the housing.

The housing 801 has a viewing aperture or a window 813 which can be closed by a transparent plate. A slider member 207 may be pulled parallel to the window 813 out of the housing through an aperture 814 in the housing, the movement being limited by stops (not shown). A pile 815 of, for example, twenty pictures, is arranged beneath the window 813 with the picture side facing the window, and is pressed against the frame parts of the housing 801 that surround the window by a pressure arrangement 803 (FIG. 7.21). The narrow side of the housing 801, on the left in FIGS. 7.21 0 7.24, is closed by a lid 802 which may be snapped in or hinged and which, when removed, allows the pile 815 to be changed.

The pressure arrangement 803 comprises a pressure plate 816 supported by leaf springs 817 which are secured to the base 818 of the housing. The pressure plate has a bulge 208 or is arched to the same effect so that there is always a gap between the lower edge 819 of the pile facing the slider member and the underlying front edge 820 of the plate 816 into which gap a picture can be inserted (FIGS. 7.23 and 7.24).

A separator 806 is fixed in the housing. Above the separator the framework of the housing has an approximately rectangular chamber 821 in which a "bearing pin" 825 having an elliptical cross section is mounted in fixed position, the retentive element 823 being mounted on this bearing pin. The retentive element is a short length of tubing of layered construction of which the inner face facing the pin 825 may be coated with TEFLON, or polytetrafluoroethylene, which has a very low coefficient of friction against the rigid plastic material of which the pin is made, but of which the outer face, for example, as a result of a rubber coating, exhibits a very high static friction both to the picture support material and to the material of which the slider member consists.

The arrangement is so designed that the underside (or the lower "side") of the retentive element 823 facing the pile lies slightly lower down than the lower edge 812 of the frame surrounding the window 813 with which frame in turn the upper edge of the lateral bars 824 of the slider member 807 is flush.

The long axis of the ellipse is furthermore so long that as the retentive element rotates on the pin 825 the uppermost picture 811 is held on a part of its surface close to the slider member, and the long axis extends beyond the separator 806 so as also to convey the rear edge of the picture over this separator.

The slider member has a U-shaped outline with lateral arms 826 (FIG. 7.25) and a transverse arm 827 at the end face as well as lateral bars 824 projecting upwards from the lateral arms 826, and a front bar 227 which closes off the housing aperture at the front when the slider member is inserted. The slider member can be pulled out by the pull 829.

Arranged in the region of the base of the housing left clear by the U-shaped outline of the slider member are the springs 817, already mentioned, as well as a disabling mechanism. This consists of a rigid control plate 830 guided in guides 831 formed on the base 818 of the housing, of which the transverse member 832 in the rest position of the control plate (FIGS. 7.21 and 7.22) lies behind the leaf spring 817 that is closer to the housing aperture. Lateral projections 833 from the control plate are disposed in the path of movement of inwardly projecting abutments 834 formed on the lateral arms of the slider member.

The operation of the device is as follows:

In the closed position (FIG. 7.21) the uppermost picture 811 lies against the lower edge 812 of the window frame. It also lies against the underside of the retentive elements 823 against which in turn—at the side of the pile of pictures 815—the lateral bars 824 lie. When the pull 829 is pulled to the right, the slider member rotates the retentive element as a result of the frictional contact, which element is pliant enough to remain clinging to the elliptical shape of the pin 825 so that the picture 811 is conveyed out at the speed of the slider member. The frictional contact between picture and transporter is assisted by the pressure arrangement 803. The separator acts as a stop for the remainder of the pile since the gap between separator and retentive element 823 allows only one picture to pass through (FIG. 7.22). In the outermost position of the slider member (FIG. 7.23) the transporter has moved the picture 811 right over the separator 806. Shortly before this the abutments 834 have met the projections 833 of the control plate and have pushed this to the housing aperture 814, the transverse member 832 of the control plate sliding onto the leaf spring 817 that is closer to the housing aperture and in so doing pressing this down. As a result of the resiliency of the leaf spring, the control plate remains clamped in this position. In the course of this plate 816 is pulled down so far towards the base 818 of the housing that it is lower than the upper side of the lateral arms 826 of the slider member, on which arms the picture 811 then rests, so that this picture is safely pushed between the edge 820 and the pile edge 819 when the slider member is moved back. In the course of this the plate 816 also remains clamped down with the result that the retentive element 823 now driven by the slider member in the opposite direction of rotation, turns freely, without bearing against the now uppermost picture 811'. The return movement of the slider member is consequently unimpeded until the control plate is pushed back into its initial position by means of the inner side of the end arm 827 of the slider member 807 running onto it.

A further guide 835 is provided in the base 818 of the housing for a button 836 with which, even when the slider member is pushed in, the control plate can be shifted from the outside into the position disabling the pressure arrangement 803, the slider member being, of course, pushed out slightly; this button is operated before the lid 802 is opened so as to change the pile of pictures or, in and case, when the pictures are not to be changed but are to be stored or dispatched, so as to remove the pressure from them.

In fact it is preferred to cool the 50 above the magazine as shown in FIG. 8, because of the high output of the light source which is necessary together with the light source itself, and that, as shown in FIG. 8, from the face of the place opposite the light source:

The episcope of FIG. 8 comprises two main portions: The projector housing 30 supported on feet 32 and the holder assembly 36 disposed therebeneath, rotatable about a pin 34. Pin 34 is mounted on a support plate 38 which, in turn, is rigidly connected to feet 32. The projector housing 30 has substantially square contour (cf. FIG. 10) while holder assembly fits substantially into the spacing between two diagonally opposite feet and is therefore rotatable about 360° entirely.

Beyond the projection mirror 40 there is a radially aspirating blower 42 provided with a blower channel 44. They both serve the purpose to aspire cooling air about the light source 46 but also from the hollow space 48 between a glass plate 50 confining the projector housing to the bottom thereof and an inserted magazine 17. The air may pass through a gap 52, the hollow space being confined by felt strips 54 at the holder (or alternatively shown in FIG. 9, by means of labyrinth sealings 54' disposed at said position). These sealing means at the same time prevent penetration of ambient light.

The service time of the light source depends substantially upon the number of switching-on and off actions. Therefore it should be avoided to switch-off the light source upon each picture exchange. With the episcope according to the invention this problem is less severe because during picture exchange the respectively succeeding picture is already visible. Therefore, it is preferred to provide and displace a shielding diaphragm together with the magazine exchange drawer (or to make it move by the drawer or its drive means with increased speed), said shield diaphragm suppressing the projection during picture exchange. Such a shielding diaphragm further should prevent that an eventually necessary rotation of the magazine (transfer from transverse to high format) is displayed on the projecting screen. Finally, the opening of such a shielding diaphragm may be suppressed during an arbitrary number of picture exchanges by suitable control means.

Figure 11:
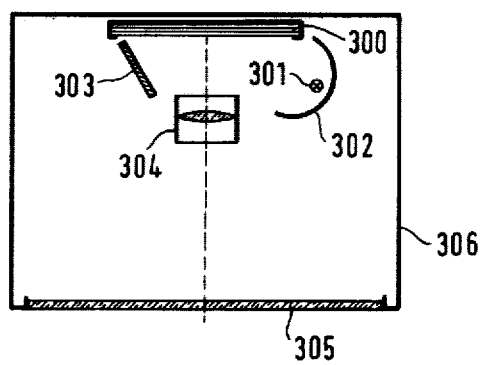

FIG. 11 illustrates the optical design of an episcope including projection onto an integrated projection screen. The picture disposed in the sight window of the magazine 300 is illuminated by lamp 301, the illumination being improved by reflector 302 and mirror 303. The objective 304 projects the image with an arbitrary enlargement ratio onto screen 305. The apparatus is confined by housing 306.

Figure 12:
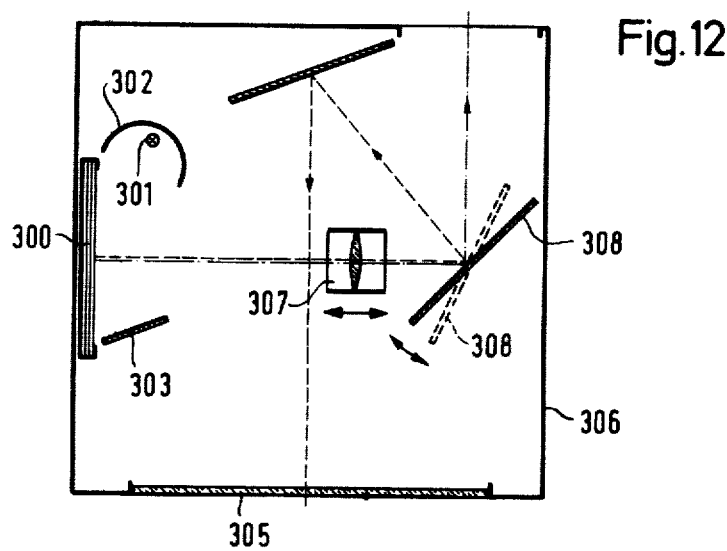

FIG. 12 illustrates the optical principle of an episcope having selective projection onto an integrated screen or, off the episcope, onto a board. The illumination of the picture in magazine 300 is analog to FIG. 11. The objective 307 may assume two different positions, one fixed position for the projection onto the screen and an adjustable one for the projection onto a board. The mirror 308 also must change its position depending upon the desired manner of projection.

Figure 13:
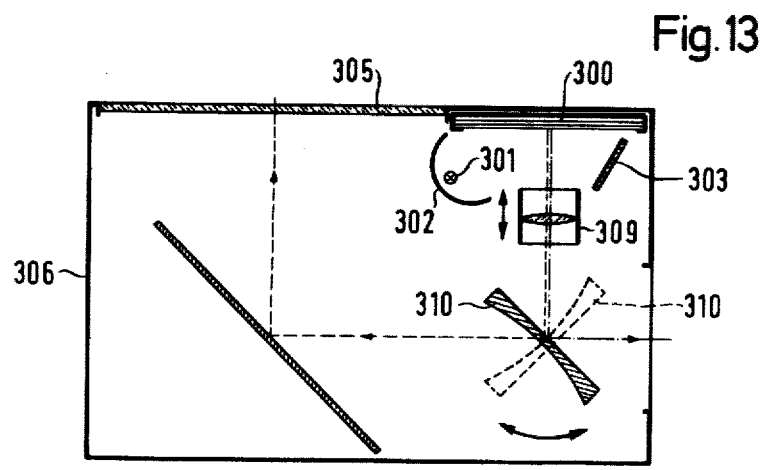

FIG. 13 shows the same optical principle as FIG. 12. There is an amendment, however, of the position of the picture negative 300 with respect to the screen. The illumination of the picture in the magazine 300 is analog to FIG. 11, and similarly displacement of the objective 309 and rotation of the mirror 310 are implemented in analog manner to FIG. 12.

Mirror 310 is designed as a plane mirror on one face (for long range projection) and as convex mirror at its other face. The convex mirror is used for projection onto the screen and reduces the focus length.

FIGS. 14 and 15 show a further optical principle for selective projection of the uppermost picture in the magazine onto screen or board, again the illumination of the picture being made analog to FIG. 11.

Depending upon the desired manner of projection an optical system 311 is displaced in the longitudinal axis. In one extreme position (FIG. 14) the objective projects the image onto the screen. In the opposite position the beam path extends via mirror 313 and objective 314 to a projection board or screen outside of the episcope housing. The objective 314 is adjustable in its spacing with respect to the mirror according to the distance episcope/projection board.

FIGS. 16-18 illustrate the design of a viewing apparatus which permits enlarged viewing of the uppermost picture in a photoprint magazine. The viewer housing 315 is designed such that it has a slot shaped opening for inserting the magazine 316, the magazine housing being sufficiently engaged by the snap mechanism 317 so that it remains fixed during drawer pulling. The viewer comprising further one or several lamps 318 which with the aid of reflector 319 illuminate the uppermost picture in the magazine, as well as a lens 320 which permits an enlarged viewing of the picture. For disposition on, say, a table a support 321 is provided which may be unfolded. The illumination is switched-on by means of push button 322.

FIGS. 19-21 show in detail the magazine holder at the wall of an episcope including means to actuate the exchange movement and rotating movement.

The magazine 339 is stuck onto two pins 340 which fit into respective openings 341 of the magazine in the apparatus shielded by the episcope housing 338. These receiving pins 340 are resiliently thickened at their ends so that the magazine will remain reliably fixed.

The pins 340 are disposed at radially moveable sliders 342 which may be displaced along slots 343. Pins 340 are guided in a guide track 344 opposite the magazine.

If now motor 345 will drive via driving wheel 346 the track disc to rotate and as long as the slot disc 348 disposed parallel thereto will remain stationary, sliders 342 and, thus, receiving pins 340 will travel radially outwards and open magazine 339, i.e. they initiate the outwards movement of the exchange drawer.

As soon as the pin extensions 348' will reach the half axes of the elliptic track 344 sliders 342 and, respectively, receiving pins 340 will move radially inwards again and the magazine 339 will be closed again, i.e. a picture exchange has been implemented.

The slot disc 348 is locked and unlocked, respectively, by means of a detent 349 which is pivotably journalled and may be actuated by—for example—a solenoid or by means of a pulling line 350.

If the magazine 339 is to be rotated—because a picture was inserted upside down or because of the different viewing position of high format and transverse format pictures, respectively,—the slotted disc 348 is unlocked by means of detent 349 so that it may rotate together with track disc 347 driven by motor 345. Therefore, no exhange motion of the magazine will occur.

Because the two rotatable discs 347 and 348 must have a central opening 351 in order to make the uppermost picture in side-window 352 of the magazine visible for the episcope optics, the discs are supported at their outer contour 353; each three rollers 354 serve this function.

Sliders 343 are designed such that cassettes or magazines having smaller sizes, too, may be clamped by means of receiving pins 340. For this purpose the slider is pivoted about 180° such that the second pin 355 will be disposed closer to the disc center because of the eccentric supporting and the spacing pin will be reduced. Since the stroke (half axis of ellipse groove 344) is dimensioned for the magazine of greater dimension exceeding that of the smaller magazine, the second pin 355 is mounted such that a lost motion stroke will result due to the rod 356. The stroke motion will become active only once the slider will abut the rod end 357.

The slider surface 358 engaging the smaller magazine prevents the pivoting away of pin 355 upon the return push in radial direction.

FIGS. 19-21 show the disc 347 in the course of rotation and disc 348 in fixed position. The magazine, therefore, is partly opened. FIG. 20a shows the pin support in the inversed position, i.e. for receiving of a smaller magazine.

FIG. 22 illustrates an episcope provided with the features of the invention. The conventional projection optics 130 are mounted in a narrow front wall of the episcope housing 131 which also carries a user-operated key board 132; the key board may be pulled off for remote control as in conventional for TV sets. The key board comprises a conventional on-off-switch, a W-key which may be depressed to command picture exchange, and a H-key which upon depression causes transition from transverse format projection to high format projection. Adjacent the top surface of the housing there is, laterally, the insert compartment 133 for a magazine is provided. In the out-of-operation status, the compartment may be dust-protected by a lid. FIG. 22a shows schematically the projection mirror 129 and the position of the magazine 128 during insertion and exchange.

Preferably, the magazine will be disposed in the housing such that its window will extend parallel to the optical axis of the projection optics because this design requires only one single mirror. It is, however, not compulsory to provide lateral insertion of the magazine: The insert compartment may be provided in a flap pivotably connected to the housing, or there may be just a lid which, once opened, permits access to the magazine holder.

It will be understood that the episcope housing of FIG. 22 must have certain minimum sizes for its length and width. The length must at least slightly exceed the length of the magazine in direction of its exchange motion plus the stroke necessary therefore and the width is at least equal to the diagonal dimension of the magazine to permit its rotation. If it is intended to design even more compact, it must be admitted that during the exchange operation and/or the rotation parts pivot outside of the housing. For obvious reasons for the closed design is preferred. If the apparatus is intended to be usable for magazines having different format, the above considerations, of course, apply to the maximum formats. However, it is to be noted that although the holder must have a predetermined width (for example for pictures having a width of 9 cm) that, however, the magazines may have different lengths (for example for pictures having 9 cm, 11.5 cm and 13 cm respectively), because the picture alignment is provided independent of the magazine length.

In FIG. 23–25 the embodiment of the holder is rotatable about a pin 134 aligned with respect to the center of the magazine window. The coupling of the rotation drive via a pin disposed at the rear with respect to the magazine although resulting in a simple design, will increase, however, the space requirements. Therefore, it may be preferred to provide the holder with a circular flange and to make the rotational drive act thereupon at the circumference. In this case, the holder 139 has an H-shaped contour and a profile into which the magazine may be inserted in one "correct" orientation only. This is assured in that the magazine has a guide groove 135 asymmetrically disposed with respect to the magazine thickness, said groove having an insert stop 136'; to define the insertion depth an indentation 136 is provided at the bottom of the guide groove, a locking detent 137 engaging thereinto and being liftable by for example a control magnet (not shown). Side webs 138 in holder 139 are inserted into groove 135 (see FIGS. 23–25).

There are different possibilities to execute the exchange movement of the magazine frame members: One may retain one frame member stationarily in the holder and move the other one only; one may retain the holder stationarily and make the frame members move relative thereto by each one half of the stroke; and one may let go along with each moved frame member a corresponding part of the holder. It is preferred to leave the holder stationary and to move the frame members symmetrically with respect thereto, because then in the projection position the magazine will assume with respect to the episcope housing a position favorable for illumination. This embodiment is shown herein; both frame members have each an engagement hole 140 for coupling with the motor drive.

At first with reference to FIG. 26 different possibilities are to be discussed to couple the motor drive to the magazine. In FIG. 23 the first frame member (in the following "housing") is designated 141 and the second frame member (in the following "drawer") is designated 142. Although it is not compulsory it is for reasons which are not interesting in this context suitable to guide the drawer in the housing and to fit it into the contour of the latter. At least that part of the drawer where the motor drive acts upon must remain accessible.

In principle, the window side (a) and the rear side (b) surface of the drawer, its front wall (c) and its narrow edges (d) are to be taken into consideration. (Respective considerations apply, of course, for the housing also.) If a press fit coupling is elected of the type of a chuck, each two opposite positions must be accessible and the drawer must have an accordingly high pressure resistance. If a form fit coupling for positive coupling is elected, in turn, a window-facing surface is unfavourable because this would increase the space requirement. Therefore, a front wall or rear side form fit is preferred. Two examples for the front wall form fit according to FIG. 27 (c) are schematically illustrated in FIG. In the left portion of the figure a double hook 143 engages through a rectangular opening 144 sufficiently large to permit disengagement by elastic bending of the hook 143 (e.g. by means of a control magnet); in the right portion of the figure the double anchor 145 engages into a front sided aperture 146, said anchor being disengageable by compression in the direction of the arrow.

The coupling by means of a pin, however, is preferred, the pin being coupled into the engagement hole 140 because simple and space-saving designs will result which, moreover, permit an automatic adaptation to different required strokes in convenient manner.

This is schematically illustrated in FIG. 28. The link 147 engages with pin 148 into the hole and it is, in turn, elastically moveable with respect to a lever 149 which implements a stroke dimensioned for the maximum magazine format. The inter-engaging ring 150 assumes the overstroke. Link 147 and lever 149 may be slideably moveable relative to each other (right portion of the figure) or pivotable (left portion of the figure). The provided elastic coupling has the further advantage that it is able to balance manufacturing tolerances. If it is intended, however, to make this stroke different in function of the format, the design shown in FIG. 29 may be elected: A switch actuating protuberance 152 is disposed at link 147 and the lever 149 carries the respective switch 151 for inversing the stroke direction. The lever 150 is dimensioned such that it is rigid relative to the counter-acting force due to friction between drawer and housing and occuring during the exchange, however, resilient with respect to the holding force of the holder which becomes effective upon the drawer reaching its outer end position.

FIGS. 30 and 31 show schematically a magnetic coupling. The link 153 in any case exerts the maximum stroke and the magnet 154 mounted on the link acts upon the soft iron member 155 in the front wall (FIG. 31) or the rear side (FIG. 30) of the drawer. The magnetic force is sufficiently great to overcome the friction between drawer and housing, however, insufficient to pull the entire magazine off the holder or to damage the magazine. The stroke adaptation is analogue to FIG. 28.

According to FIG. 32 the stroke inverter switch 151 may be alternatively actuated by an actuating member 156 which upon reaching the full drawer stroke off the housing operatively interacts with the stationary switch.

FIG. 33 shows three magazines having different format wherein the engagement holes are spaced by the same distance from each other and are disposed schematically with respect to the centre of the picture. These three different magazines may be used with the coupling system of FIG. 28. It is to be noted that the coupling occurs suitably in the centre of drawer and housing across the magazine width so that, if at all possible, during the exchange motion no tilting torques which would cause jamming or at least frictional motion will act upon housing and drawer.

One may, however, alternatively operate with a given invariable stroke dimensioned for the greatest magazine if the tolerance problem is of no importance, provided that at the magazine itself the engagement points are designed such that a stroke adaptation will take place. An example is shown in FIG. 34: Only the longest magazine 113a has engagement holes 60 while the two smaller formats 113b, 113c have engagement slots 162 and 164, respectively, having a length corresponding to the respective half difference of the stroke relative to the stroke h of magazine 113a. A respective lost motion will result at the begin of the drawer pull and push.

Alternatively, one may provide the coupling positions and magazines having different size at different points, too, and the exchange drive will engage respectively geared-down links. A manual adaptation, too, is possible. Further, it is not compulsory that a motor drive is provided for the pull as well as for the push motion; one of the motion directions may be implemented by a spring to be stressed during the respective other direction by the motor.

The very coupling or engagement may be controlled in different manners. The coupling may occur automatically upon insertion of the magazines, one may provide it by actuation of the key "Exchange" and immediately disengage thereafter, or one may insert the magazine in one projection position (preferably in the high format position) and initiate the coupling with the exchange drive by rotating the holder; if then during the operation a variation of the format occurs, automatically disengagement and engagement again will take place.

So far it was assumed that all magazines have the same width and therefore fit into the holder. It is, however, also possible to provide an adaptation to smaller widths by means of an insert mask. This is illustrated in FIGS. 35 to 37. One will recognize in FIG. 35 the holder 139 again which, in this case, however, has webs 166 of reduced length. A control rod 167 for a switch to interrupt the circuit for the illumination in case of no magazine being inserted extends through the centre of its journal bearing hub 134.

A mask 138 fits into the holder, the end position of the mask being defined by the stop 169. In the thickened lateral brackets 170 helical springs 171 are housed which may be compressed under the pressure of the webs 166. Their bias serves the ejection of the mask upon release of a locking system. The latter comprises a resilient tongue 172 integrally formed with the mask of plastic, said tongue engaging behind the edge 173 of the holder which serves as locking member.

The rear side of the mask is open so that the magazine may be coupled to the elements 174 and 167. The webs 138' serve the positioning of the magazine in the mask. The aligning indentations 136 could not become effective, however, in this case because they would be covered by the brackets 170. Therefore, the holder has here an alignment pin 174 engageing at the rear side of the magazine and falling in an alignment indentation (not shown) there provided, said alignment pin being disengageable against spring bias for the purpose of removal of the magazine or, alternatively, apt to be used for ejecting the magazine. For this purpose the mask is open at at least one of its sides.

When the mask is disposed in the holder it will turn together therewith. However, the ambience of the projected picture may be shielded in another manner, too, if a magazine is used having dimensions smaller than the maximum format. Such shields could be disposed somewhere in the beam path of the projector; however, the solution by means of the mask is the preferred one.

The mask also can be used to achieve a stroke adaptation. All masks will then have—seen from the drive—the same design and require all the same stroke, however, depending upon the magazine fitting to the mask, the stroke will be geared down correspondingly by means of, say, a linkage system. It may be preferred to allocate to each episcope a reservoir for the most common masks.

In the three embodiments described hereunder for the exchange drive, the insertion of the magazine takes place in the "high format position", however, the exchange will be made in the "transverse format position". The means for ejecting the magazine are not illustrated here, but have been explained previously herein. There may be accommodated stationarily in the housing, namely, opposite to the insertion compartment where, as may be seen from the following figures, the necessary space is available.

One will recognize in FIG. 38 the housing 1100 of the episcope. From housing 1100 a hollow cylindrical hub will extend, a shaft 1102 freely rotatable being journalled in the interior thereof. The shaft carries the magazine holder 1103 and is rigidly fastened thereto. On the outer wall of the hub or the hollow shaft 1101 a pulley 1104 is journalled and freely rotatable, too. The pulley is rotated in one and the same direction via belt 1105 by means of a motor rotating in the respective one direction, the motor being preferably a split pole motor; this motor preferably is the motor for a cooling fan. The pulley 1104 is slidably movable in axial direction along hollow shaft 1101 and is biased into the position of FIG. 39 by means of helical spring 1106. Upon pressure being exerted onto the exchange key 1107, e.g. by means of a magnetic switch acting at a position indicated by arrow 1108, pulley 1104 will be shifted in direction to a gear wheel 1109. Pulley 1104 on the one hand and gear 1109 on the other hand carry claws 1110 and 1111, respectively, which are interengaged by the displacement due to the exchange key 1108 so that the gear will be taken along. Gear 1109 also is freely rotatably journalled on hollow shaft 1101. Its teeth engage toothed racks 1112, 1112'; each toothed rack is slidably guided in a rail 1113 rigidly connected to the episcope housing 1100. Each toothed rack carries an extension 1114 angularly extending into the direction to the symmetry axis. Each extension 1114 carries a knob or coupling pin 1115 which, magnetically actuated in common with the exchange key 1108, may be brought to operatively engage the engagement hole of the respective frame member of the magazine. The movement of the toothed rack with the extension 1114 is enabled because the sheet metal piece 1117 connecting the two rails 1113 with each other has respective slots 1118. About at 1119 an end switch is disposed which disables the solenoid circuit from exchange key 1107, however, does not effect that for the coupling pins 1115 so that the pulley 1104 is disengaged and the gear 1109 may revolve in the counter-direction; this return revolution occurs under the action of springs (not shown) biased by the outward movement. Two links 1121 are pivotably connected to extension 1114 at 1122 and may again be coupled with holder 1103 by means of magnetically actuated pin couplings 1123. These links serve the rotation of the holder. Upon depressing the key "H" as indicated at 1120, simultaneously and electrically locked an actuation of the claw coupling between pulley 1104 and gear 1109 will take place; on the contrary, the magnetic couplings 1115 and 1123 mutually disable each other so that only either of them may become activated. Upon actuation of 1120, thus, the motor drive is used to rotate the holder, too, the exchange drive being discoupled. The resetting occurs as before by means of spring bias; one may provide an end switch to interrupt the circuits 1108, 1123, 1120. Analogue thereto, an end switch 1119 is provided to switch off 1108, 1115.

Basically one link 1121 will be sufficient if a rotation is to be made in one direction only. An embodiment is shown wherein a rotation each about 90° occurs in two directions.

FIGS. 40, 41, and 42 show a further embodiment. The pulley 1201 has the same design and function as in the preceeding embodiment, however, it is axially displaceable in both directions. Upon displacement in direction 1202 (arrow) coupling with the rotation shaft 1203 takes place, the latter being fastened to the holder 1215 for magazine 1204. Upon displacement in arrow direction 1205 a coupling with gear wheel 1206 takes place which engages two gear crowns 1207, 1208. The gear crowns each carry an eccentrically disposed and resiliently yielding pin 1209 each of which being pivotably coupled to pin 1212 via a crank 1210 with slider 1211; the sliders 1211 are slidably movably guided along two rods 1213. Each slider 1211 carries a magazine entrainment cam 1214. Upon rotation of holder 1215 and, thus, of magazine 1204, the cam is pushed out of engagement against the bias of a bias spring 1216 until a slot shaped indentation 1217 gets over the cam so that the cam 1214 may engage into slot 1217. Upon reciprocation of the sliders the magazine will then be opened and closed under drive by the motor. The bias spring 1220 for the crank pin 1209 is sufficiently long to not only absorb tolerances but also to absorb different strokes for different formats. The return of holder 1215 may take place either under spring force, the spring being biased by the motor driven forward rotation, or by means of a changer gear system which inverts the rotation direction, or in similar manner. The ejection of the magazine 1204 from holder 1215 occurs by depressing of ejector key 1222 (Actuation key 1222' in FIG. 22).

The next embodiment is illustrated in FIGS. 43 and 44. The difference over the preceding embodiments consists in that only one entrainer 1306 is provided having two eccentrically disposed cranks 1309 with pins from which the knee-shaped crank rods 1301 act upon the slider 1311. Since the crank rods cannot pass by the bearing of the gear which carries the eccentric pins, only a half revolution is provided and the return of the exchange drive occurs under the action of a tension spring 1302 biased during the extension. In FIG. 44 one will recognize the different design of the switch fork 1303 for switching between exchange drive and rotational drive.

FIG. 45 shows schematically how a very compact apparatus could be designed. The block 1320 which indicates the contours of the episcope in its out-of-service status is increased for the operation only by an attached guide member 1321 which when the episcope is out of service may be arranged within the contours of the episcope. The guide member shields the respectively extending frame member 1322 of the magazine during the exchange operation and simultaneously serves its guiding.

FIGS. 46–48 show a further embodiment of an episcope. The holder is connected to a rotatable dish 1330 or forms a part thereof. The rotatable dish is supported by four bearing and guiding rollers 1331 at its circumference such that the frame members of the magazine remain accessible for the exchange operation and find space to pass between each two rollers 1331. For the rotation of the holder a motor drive is provided at the circumference of the rotatable dish and that by means of friction gear 1332 in the one and by means of friction gear 1333 in the other direction. Both friction gears engage with each other via toothed crowns and one thereof is driven via a belt drive 1334 from a motor (not shown). Since both friction gears are journalled on a toggle 1335 which is pivotably supported at 1336, by exerting pressure upon the lever extension 1337 in the one or other direction the one or other friction gear may be brought in engagement with the rotatable dish. The inverting control may occur by means of end switches (not shown) as described above.

FIG. 49 shows isometrically and FIG. 50 illustrates in section view how with such a design the insertion of the magazine may occur. A flap 1340 is pivotably connected at 1341 to the rotatable dish 1330, the flap opening outwards, however, permitting after closing thereof the exchange movement of the inserted magazine. The rotatable dish may be supported either by means of the above-mentioned rollers or alternatively or supplementarily by means of a front bearing.

FIGS. 51 and 52 show schematically how by means of a mask—cf. FIG. 35—simultaneously a stroke adaptation for the exchange movement may be provided.

At the rear side of mask 1400 two pivotable levers 1401, 1402 are journalled at 1403, and 1404, respectively. Each lever comprises a slot hole 1405, a pin 1406 extending thereinto. Each pin is mounted on a slider 1407 slidably displaceable relative to the mask in a guide track 1408. A spring 1409 biases both sliders mutually against each other into a start position.

Couplings of the motor drive may engage at said levers at several points, for example at 1410 and 1411, and depending upon the spacing from the pivot points 1403 and 1404, respectively, a different pivot angle motion of the levers will result upon the same stroke of the coupling.

This pivoting is transmitted to the frame member of the magazine by means of resilient tongues 1412 carrying engagement pins 1413 and mounted at sliders 1407.

FIGS. 53 and 54 show a stroke adapting device mounted in a mask. At the narrow sides 1500 of the magazine extensions 1501 engage disposed at the distal end of each a spring joke 1502 biased in inward direction. Mutually facing spring jokes are connected with each other by means of a transverse bracket 1503. The frame members of the magazine 1504 are provided with stop shoulders 1505 onto which the extensions 1501 abut upon the opposite outward movement of the brackets and the spring jokes connected thereto. Up to the stop shoulders 1505, however, there is lost motion. The stroke patch required for each magazine is, thus, indicated at the magazine itself and will be scanned. The rest position of the spring jokes is assured by means of locking protuberances 1506 engaging into respective identations 1507 of the mask.

FIGS. 55 and 56 permit recognition of the mirror 1600 within the episcope housing 1601. The mirror is mounted at a support 1602 in a manner not illustrated in detail. On the side of the support opposite to the mirror there is a bearing hub 1603 on which a sleeve 1604 is rotatably journalled. A number of radial spokes extends from the sleeve; preferably there are three spokes 1605 extending outwards and the spokes carry a toothed gear crown 1606 on a ring 1607. On the latter guide means 1608 and 1609 are provided for two pairs of diaphragms 1610, 1611 displaceable in radial direction with respect to the hub journal, and accordingly displaced upon a change of format. Upon change from high format to transverse format, however, the diaphragms will rotate without variation of their radial position about each 90° together with ring 1607. The drive of the ring rotation is made by means of pinion 1612 whose shaft 1613 is driven by the same motor and about the same angle as that of the magazine holder.

The spokes are disposed such that the holder 1602 will not interfere with the rotation because an angle of at least twice 90° will remain free.

Figure 58:
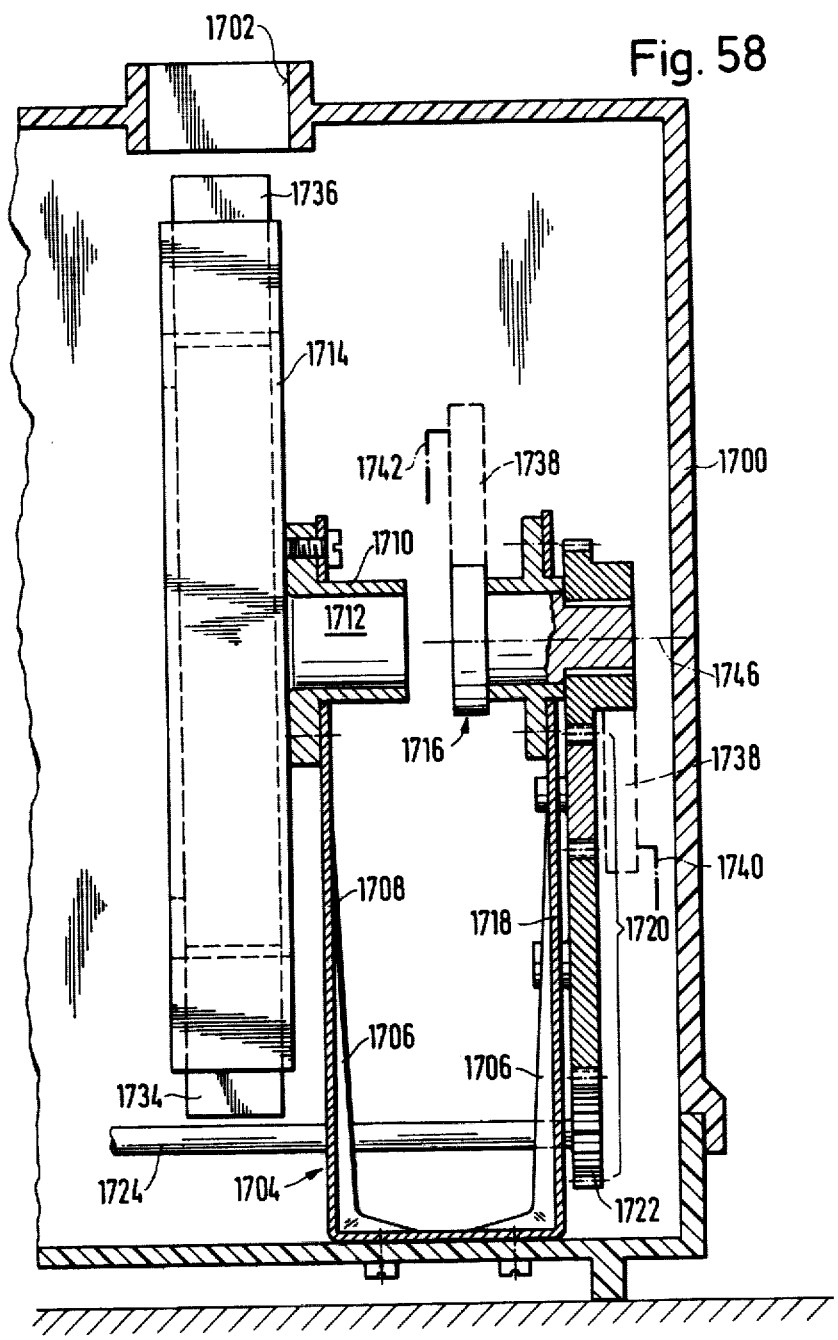

FIG. 57 and 58 illustrate in detail an exchange drive in accordance with the scheme of FIGS. 40–42.

One will see in FIG. 58 the portion of the episcope housing 1700 which receives the exchange drive, the housing having the magazine insert opening 1702. On the housing bottom, a frame 1704 is mounted in conventional manner, the frame having an approximately U-shaped section and being made of sheet metal stiffened by corrugations 1706. Frame leg 1708 innermost with respect to the housing carries a bearing 170 wherein, axially non-displaceable, a shaft 1712 of magazine holder 1714 is journalled. Coaxially aligned with this bearing, a twin crank shaft 1716 is rotatably journalled in the other frame leg 1718 and driven by means of a toothed gear system 1720 which, preferably, provides a gearing-down; the gear system is driven by pinion 1722 at the end of a drive shaft (not shown) with axis 1724. In the space between the frame legs 1708 and 1718, a gearing system for rotation of the magazine holder 1714 driven by the same drive shaft is housed and may be coupled to magazine holder shaft 1712 thereby discoupling drive gear system 1720; in order to keep the illustration comprehensible, however, the respective means are not shown here and reference may be had to FIGS. 40–42.

Entrainment sliders 1728, 1730 are slidably received in slot guides 1726 of leg 1708. For ease of assembly, the slot guides are provided at 1732 at their ends with enlarged apertures through which the respective slider may pass. The coupling of the sliders with the magazine frame members 1734, 1736 and their discoupling will occur automatically upon rotation of the magazine holder 1714 about 90° from the position shown in FIG. 57 (insertion position, and simultaneously high-format-position) into the exchange position. For this purpose the coupling means of FIG. 42 are provided which, however, cannot be seen in the present illustration. The cranks 1738 of twin crank shaft 1716 are coupled to the entrainment sliders 1728 and 1730, respectively, by means of links 1740 and 1742, respectively. These links are just indicated in the drawing by dash-dotted lines in order to keep it distinctive. An elongated aperture 1744 in frame leg 1718 permits passage of link 1740, aperture 1744 extending, of course, parallel to slot guide 1726 of slider 1728.

Upon rotation of twin crank shaft 1716 by one full revolution (360°) the entrainment sliders 1728, 1730 are moved apart through a stroke equal to twice the eccentricity, with respect to the crank shaft axis 1746, of the points where links 1740 and 1742 are are pivotably connected thereto, and thereafter the sliders approach each other again, so to execute one picture exchange operation. The possibilities to adapt a predetermined stroke—as provided in this embodiment—to variable stroke requirements of magazines having different size have been discussed above and need not be repeated.

FIG. 59 shows the front end of a magazine 1800 provided with an indentation hole 1802. This hole is laterally offset with respect to the symmetry plane 1804 of the magazine and serves the purpose to prevent misoriented insertion of the magazine into the magazine holder 1806 (FIG. 60).

A stop lever 1808 and a latch lever 180 are pivotably connected to the magazine holder. The stop lever is biased into the position shown in FIG. 60 by a tension spring 1812 so that it blocks the insertion of the magazine 1800. The stop lever is caught in an incision 1814 of the latch lever by its distal end so that the magazine will be unable to push it aside; the magazine, on the contrary, must act on the sloped cam surface 1816 of the latch lever 1810 to pivot it away against the bias of a bias spring 1818 to free the stop lever. The required movement of the magazine, however, will be enabled only if its hole 1802 is aligned with a stop pin 1820 which is mounted on the stop lever 1808. This enabling is indicated in FIG. 60 in broken lines. If, inversely, the magazine is misoriented—shown in FIG. 60—the front side of the magazine will abut the stop pin so that the latch lever cannot be acted upon.

The stop lever once unlocked may give way until it reaches an aperture 1822 in the magazine holder wall, and the latch lever, too, will yield sufficiently to permit the magazine to be pushed fully home. Upon magazine removal, the stop lever will follow due to the bias of its spring 1812 and will lock again in the incision 1814 of the latch lever which has returned into the blocking position also.

FIGS. 61–63 show an alternative design for the elements by which a misoriented insertion of the magazine may be prevented. The mark holes 1902 of magazine 1900 are offset with respect to the symmetry plane 1904 in the front side of the magazine. The magazine holder 1906 has at its two narrow sides each a lug 1908 with pivots 1910, 1912 offset with respect to each other, the pivots serving pivotable connection of a stop lever 1914 and a latch lever 1916, respectively. Stop lever 1914 is biased into its blocking position by tension spring 1915 thereby retaining the latch lever, too, at which the stop lever abuts opposite the arriving magazine. A stop pin 1920 is disposed in the latch lever and may be displaced against bias of a spring 1918 (cf. FIG. 63), the pins engaging into the mark holes of the incoming magazine unless the latter has been introduced in a misoriented fashion. Proper orientation is illustrated in the lefthand side of FIG. 62: The magazine may push away both levers 1914 and 1916 and complete its insertion path. If, inversely, the magazine is misoriented (righthand part of FIG. 62), stop pin 1920 is pushed through the latch lever downwards because the bias of spring 1918 is much smaller than that of tension spring 1916 so that, until pin 1920 has moved, the stop lever and the latch lever will remain in their blocking position. The blocking portion 1922 at the bottom end of pin 1920 extends, in this case, just in front of the free end of stop lever 1914 so that, because of the offset pivot points of the levers, they mutually block. Upon removal of the magazine the levers will return into their blocking position which is defined by a stop edge 1924 of a receiving slot 1926 for the pivoted levers.

FIGS. 64–67 again show an alternative design to prevent insertion of a misoriented magazine 2000, a mark groove providing the "information" concerning the orientation. The mark groove 2002 is "scanned" by means of a scan lever 2008 pivotably connected, at 2004, to a display lever 2006. Scan lever 2008 has a scanning arm 2010 which, if the magazine is properly oriented, may be pivoted into groove 2002 once the magazine will engage with its leading side the stop arm 2012 of lever 2008 tending to push it aside. If, however, the magazine will have been misoriented prior to insertion, scan lever 2008 cannot yield so that tension will act upon display lever 2006 tending to elongate retaining spring 2014. While the display lever may be pivoted only about a small angle because of stop member 2016, it will nevertheless actuate thereby a contact system 2018 of a display circuit permitting optical display or acoustic alarm to be initiated so to indicate to the user that the magazine in fact has to be withdrawn, inverted, and inserted again in proper orientation. The rest position of the display lever is defined by counter stop member 2020; resetting of the scan lever 2008 is effected by leaf spring 2022.

As mentioned above, the basic principle of the invention will be applicable also in case of an image not being immediately visualized but projected onto light-sensitive material in order to produce a duplicate or a copy.

Such top light projectors serving as copy printers are illustrated in FIGS. 68–74.

FIGS. 68–70 relate to a first embodiment. The magazine 3001 is pushed with its window side up into the insert compartment 3002 of apparatus 3003; the uppermost picture in the magazine is still visible via control window 3004 of the apparatus 3003. Upon insertion of the magazine, coupling elements of a motor exchange drive system—e.g. as disclosed by FIGS. 57, 58 and related description—will engage the frame members of the magazine such that, upon depression of key 3006, the magazine will be opened. The magazine is designed such that upon withdrawal of the exchange drawer 3007, the one picture of the picture stack in the magazine which was adjacent the magazine window before will now be the uppermost one in the withdrawn drawer, too. Such magazines are disclosed in the publications mentioned above.

Key 3006 commands the copying operation. Once the magazine being opened, the uppermost picture in the drawer is illuminated by lamps 3008, and an image thereof is formed bei the optical system 3009 on the light sensitive material 3010. A set of digit keys 3005 permits setting of the number of copies to be produced prior to each depression of key 3006. In case of a picture not desired to be copied, the user has to depress key 3011 thereby causing simple actuation of the motor driven exchange without copying. Upon depression of key 3012 the magazine is ejected from the compartment 3002 sufficiently to be gripped and fully removed by the user.

The light sensitive material, e.g. photo paper, is withdrawn by a stroke equal to one picture width from a storage drum 3013 and, after exposure, fed to a development system (not shown) via feed drum 3014. The embodiment shown in FIGS. 71 and 72 distinguishes over that of the previous figures in that the copier portion 3021 is housed in a moveable slider to be shifted over an inserted magazine 3015 in direction of arrow 3023, the image being formed from the picture which remains in the closed magazine. The number of copies, as desired, may be set by appropriate turning of switch knob 3019. The number as selected will appear, for check purpose, in window 3031. The count of a counter is displayed at 3032, this number representing the total of copies procured by the user. Alternatively, the total expense to be paid may be displayed immediately or, in case of a vending machine, the excess amount of inserted money.

In the embodiment of FIGS. 73 and 74 the magazine is inserted into the insert compartment with its viewing window turned down. At first, the picture adjacent the window is projected onto a check mat screen plate 3040 via mirrors 3037, 3038. Selection switch 3041 permits setting of the desired number of copies, and the copying operation is initiated by depressing key 3042. For this operation, mirror 3037 is pivoted or shifted into position 3043, and the picture—uniformly illuminated by lamps 3036—is reproduced by means of optical system 3045 on the light sensitive material 3046. In case of no copy being desired, depression of key 3047 will simply cause picture exchange. Upon depression of key 3048 the magazine is ejected from the printer.

In the last two designs it will be noted that the edges of the picture to be copied are shielded by the frame areas of the magazine so that the image will be "trimmed". With a reproduction in 1:1 scale, therefore, a sort of passepartout will appear on the copy. Alternatively, one may select a slightly increasing scale corresponding to the size of said passepartout so that the copies will have the same dimensions as the original had.

What is claimed is:

1. A device for displaying sheet shaped opaque pictures comprising
    a housing with an image transmitting means facilitating display of the image at the exterior of the housing, there being a picture scene in the housing from which the image emanates,
    a picture exchange magazine having a display window at the picture scene and means confining a stack of pictures with the top picture in the stack being disposed at the window and picture scene and the remainder of the pictures in the stack being confined behind the picture scene, the magazine including a first frame member and a second frame member which is relatively reciprocable parallel to said window and pictures scene for cyclic exchange of the top picture within the magazine, and
    a releasable holder retaining the magazine on the housing, while allowing said frame members to remain relatively movable to each other.

2. Device as claimed in claim 1, characterized in that the housing of the device includes a mat screen plate upon which the image may appear, and also includes transmissive means facilitating transmission of the image outwardly of the housing and projection means shiftable to alternately project the image to the mat screen plate or to the transmissive means.

3. Device as claimed in claim 1, wherein the holder is designed for receiving magazines of different format.

4. Device as claimed in claim 1 for non-square pictures on which the image information may be present in high format or transverse format, wherein the device includes a means for selective projection in high format or transverse format.

5. Device as claimed in claim 1, wherein the device includes a motor drive connected with the magazine for the actuation of the movable frame member.

6. Device as claimed in claim 1, wherein the holder includes locking means engageable with the magazine, said locking means retaining one of the frame members stationary against movement toward, away or parallel to the picture scene while the other frame member is reciprocated for changing the top picture at the window.

7. Device as claimed in claim 6, wherein the holder includes an ejecting device conveying the magazine upon unlocking of the locking means into a removal position.

8. Device as claimed in claim 3, wherein the holder has means automatically adjusting itself to the magazine dimensions.

9. Device as claimed in claim 6, wherein the locking means retains the magazine independent of its dimensions such that the magazine window is disposed at least substantially centrally in the picture scene of the episcope.

10. Device as claimed in claim 1, and a projection light source and an air circulation means cooling off the projection light source, and wherein a portion of the cooling air is passed across the magazine.

11. Device as claimed in claim 4, wherein the holder comprises two sliders each of which being connected to a magazine frame member, the sliders being oppositely slidable relative to the housing.

12. Device as claimed in claim 11, wherein the sliders have means for receiving magazines of different size with automatic accommodation of the various exchange strokes.

13. Device as claimed in claim 5, and means mounting the holder for rotation, the motor drive is stationarily mounted in the housing and includes coupling elements adapted to be coupled with the frame members of an inserted magazine in only one rotational position of the rotatable magazine holder.

14. Device as claimed in claim 13, wherein the coupling is a formed to fit the shape of the magazine.

15. Device as claimed in claim 14, wherein the coupling is designed to engage the magazine at the rear side thereof opposite the window.

16. Device as claimed in claim 15, wherein the frame members include indentations into which extensions of the coupling engage.

17. Device as claimed in claim 16, wherein the indentations are disposed in a central plane of the frame member displacement.

18. Device as claimed in claim 16, wherein the indentations are congruent at magazines having different size.

19. Device as claimed in claim 16, wherein the indentations are disposed symmetrically with respect to the window center.

20. Device as claimed in claim 13, wherein the motor drive is adaptable to different strokes of the relative frame member displacement.

21. Device as claimed in claim 20, wherein the coupling accommodates different strokes of different magazines.

22. Device as claimed in claim 21, wherein the motor drive is adjusted for a maximum stroke and the coupling includes a take-up element for the stroke difference for magazines requiring smaller strokes.

23. Device as claimed in claim 22, wherein the take-up element permits a lost motion stroke corresponding to the stroke difference.

24. Device as claimed in claim 1, wherein a mask to adapt the holder to magazines having a width smaller than the maximum receiving width of the holder in direction transverse to the relative displacement of the frame members.

25. Device as claimed in claim 41, wherein, the magazine is insertable into and removable from the holder in the position thereof reached upon rotation relative to the housing.

26. Device as claimed in claim 13, wherein the holder is rotatable relative to the motor drive, the non-rotated position of the holder is provided for the transverse format projection in case of non-square pictures.

27. Device as claimed in claim 13, wherein the holder is rotatable relative to the motor drive, the coupling elements automatically disengaging upon rotation of the magazine.

28. Device as claimed in claim 13, wherein the holder is rotatable relative to the motor drive, the exchange drive and the rotation drive are caused by a single motor.

29. Device as claimed in claim 28, wherein the motor simultaneously drives a cooling fan for the episcope.

30. Device as claimed in claim 13, wherein the holder is rotatable related to the coupling and the exchange drive and the rotation drive are disabled in response to operation of one another.

31. Device as claimed in claim 13, wherein the coupling elements are disposed such that the picture exchange occurs in the transverse format of the projected picture.

32. Device as claimed in claim 13, wherein the coupling elements are provided for a displacement of both frame members by each half of the stroke length.

33. Device as claimed in claim 13, wherein the magazine includes disabling means to prevent improper insertion into the holder.

34. Device as claimed in claim 1, wherein the housing is substantially block-shaped the magazine is disposed with its window lying parallel parallel to one of the housings faces, and the housing in the area of the face has a width about equal to the longest dimension of the closed magazine and has a length transverse to the width, about equal to the longest dimension of the fully open magazine.

35. Device as claimed in claim 13, and a compartment at the holder into which the magazine may be inserted.

36. Device as claimed in claim 13, wherein the coupling elements engage after or upon insertion of the magazine and disengage prior to or with the ejection of the magazine.

37. Device as claimed in claim 13, and a mask insertable into the holder and comprising a stroke gearing system for magazines requiring different strokes.

38. Device as claimed in claim 13, wherein the holder is rotatable about an axis perpendicular to the center of the window, and the holder has a hub bearing at the side opposite the window.

39. Device as claimed in claim 1, wherein the holder is rotatable about an axis perpendicular to the window center, wherein the holder includes a rotatable means with a circumference upon which it is rotatably journalled.

40. Device as claimed in claim 1, wherein a copy printer is provided to reproduce pictures housed in said magazine, the printer being provided with motor drive means to move said magazine frame members.

41. Device as claimed in claim 1, wherein the holder is rotatable on an axis normal to the picture scene to facilitate correct projection of pictures variously oriented in the magazine.

* * * * *